United States Patent
Obi et al.

(10) Patent No.: US 6,730,241 B2
(45) Date of Patent: May 4, 2004

(54) POLYMERIZABLE COMPOSITION SHOWING LIQUID-CRYSTAL PHASE AND OPTICALLY ANISOTROPIC OBJECT MADE WITH THE SAME

(75) Inventors: Naoki Obi, Tokyo (JP); Seungtaeg Lee, Sakura (JP); Hiroshi Hasebe, Ageo (JP); Tatsuo Kawara, Tokyo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 33 days.

(21) Appl. No.: 09/926,183

(22) PCT Filed: Jan. 19, 2001

(86) PCT No.: PCT/JP01/00321
§ 371 (c)(1),
(2), (4) Date: Dec. 20, 2001

(87) PCT Pub. No.: WO01/53248
PCT Pub. Date: Jul. 26, 2001

(65) Prior Publication Data
US 2003/0025104 A1 Feb. 6, 2003

(30) Foreign Application Priority Data

Jan. 21, 2000 (JP) .......................... 2000-12929
Nov. 27, 2000 (JP) ....................... 2000-359428

(51) Int. Cl.$^7$ ............................................. C09K 19/20
(52) U.S. Cl. ..................... 252/294.64; 252/299.01; 252/299.6
(58) Field of Search ............. 252/299.01, 299.6, 252/299.61, 299.63, 299.64, 299.65, 299.66, 299.67; 428/1.1

(56) References Cited

U.S. PATENT DOCUMENTS 5,560,864 A 10/1996 Goulding (List continued on next page.)

FOREIGN PATENT DOCUMENTS

DE 42 26 994 A1 2/1994

(List continued on next page.)

OTHER PUBLICATIONS

Lub, J., et al.; "The Formation of a Liquid Crystalline Main Chain Polymer by Means of Photopolymerization," *Liquid Crystals* (1998) vol. 24, No. 3, pp. 375–379.

(List continued on next page.)

*Primary Examiner*—Mark F. Huff
*Assistant Examiner*—Jennifer R Sadula
(74) *Attorney, Agent, or Firm*—Armstrong, Kratz, Quintos, Hanson & Brooks, LLP

(57) ABSTRACT

An object of the present invention is to provide a polymerizable liquid crystal composition incorporating a polymerizable liquid crystal compound which displays a low nematic phase temperature, displays excellent compatibility with other polymerizable liquid crystal compounds, and furthermore yields a product following polymerization, of good transparency and high mechanical strength. A polymerizable composition is provided which displays a liquid crystal phase, and moreover incorporates a liquid crystal backbone with two or more ring structures and a compound with a partial structure represented by the general formula $$P^1-S^1-A^1-D^1-E^1-$$

[wherein $P^1$ represents a polymerizable functional group; $S^1$ represents $-(CH_2)_w-$, $-O(CH_2)_w-$, $-(CH_2)_wO-$, $-(CH_2)_wC(=O)O-$, $-(CH_2)_wOC(=O)-$, $-C(=O)O(CH_2)_w-$ or $-OC(=O)(CH_2)_w-$ (w: 1 to 20); $A^1$ and $E^1$ each represent a hydrocarbon ring or a hetero ring, although $E^1$ is a ring incorporated within the liquid crystal backbone; and $D^1$ represents $-C(=O)-O-(CH_2)_m-O-$, $-O(CH_2)_m-O-C(=O)-$, $-O-C(=O)-(CH_2)_m-O-$, or $-O(CH_2)_m-C(=O)-O-$ (m: 1 to 15)].

11 Claims, 1 Drawing Sheet

U.S. PATENT DOCUMENTS

| | | | |
|---|---|---|---|
| 5,800,733 A | * 9/1998 | Kelly | 252/299.6 |
| 5,833,880 A | * 11/1998 | Siemensmeyer et al. | 252/299.64 |
| 5,871,665 A | 2/1999 | Coates et al. | 252/299.01 |
| 6,395,351 B1 | * 5/2002 | Benecke et al. | 428/1.1 |

FOREIGN PATENT DOCUMENTS

| | | | | |
|---|---|---|---|---|
| DE | 42 26 994 | * | 2/1994 | C08F/2/48 |
| DE | 195 04 224 A1 | | 8/1995 | |
| EP | 0 755 915 A2 | | 1/1997 | |
| EP | 0 869 112 A1 | | 10/1998 | |
| GB | 2 306 470 A | | 5/1997 | |
| JP | 7-258638 | | 10/1995 | |
| WO | WO 98/23580 | | 6/1998 | |

OTHER PUBLICATIONS

Chang–Chien et al; Journal of Applied Polymer Science, vol. 57, No. 10, pp. 1183–1204; 1995. See PCT search report.

* cited by examiner

POLYMERIZABLE COMPOSITION SHOWING LIQUID-CRYSTAL PHASE AND OPTICALLY ANISOTROPIC OBJECT MADE WITH THE SAME

TECHNICAL FIELD

The present invention relates to a polymerizable liquid crystal composition incorporating a polymerizable liquid crystal compound useful in applications such as optical phase retardation plates, polarizing plates, polarizing prisms, optical wave guides, piezoelectric elements, nonlinear optical elements, a variety of optical filters, liquid crystal pigments which utilize the selective reflection of cholesteric liquid crystal phases and the like, liquid crystal—resin composite displays, holographic liquid crystal displays, polymer stabilized liquid crystal (ferroelectric liquid crystal, antiferroelectric liquid crystal) displays, and as a coating for optical fibers or the like.

BACKGROUND ART

If a liquid crystal compound with a polymerizable functional group (hereafter referred to as a polymerizable liquid crystal compound), or a polymerizable liquid crystal composition incorporating this type of compound is aligned in the liquid crystal state, and subsequently irradiated with an activated energy beam such as ultraviolet light or the like, then a polymer can be prepared in which the aligned state of the liquid crystal molecule is fixed. Because polymers prepared in this manner display anisotropy of physical properties such as the refractive index, dielectric constant, magnetizability, modulus of elasticity and thermal expansion coefficient, they can be readily applied as optical phase retardation plates, polarizing plates, polarizing prisms, optical wave guides, piezoelectric elements, nonlinear optical elements, a variety of optical filters, liquid crystal pigments which utilize the selective reflection of cholesteric liquid crystal phases and the like, and as a coating for optical fibers or the like.

An example of a polymerizable liquid crystal composition used for such applications is provided in Japanese Unexamined Patent Application, First Publication No. Hei-8-3111, in which a polymerizable liquid crystal composition incorporating a liquid crystal compound with one (meth)acrylic group in each molecule is disclosed. The polymerizable liquid crystal composition disclosed in this application has the distinction of displaying liquid crystallinity at room temperature, although problems exist in that both the transparency following polymerization and the mechanical strength of the polymerized product are inferior.

Published Japanese Translation No. Hei-6-507987 of PCT International Publication (U.S. Pat. No. 5,871,665), Japanese Unexamined Patent Application, First Publication No. Hei-10-310612 (EP-A 869112), Published Japanese Translation No. Hei-11-513360 of PCT International Publication (U.S. Pat. No. 5,833,880), DE-A 4226994, GB-A 2306470, and Int. Pat. Application 98-23580 disclose liquid crystal compounds with two polymerizable functional groups such as a (meth)acrylic group within a single molecule, and polymerizable liquid crystal compositions incorporating such liquid crystal compounds. The compounds disclosed in these publications have a partial structural feature wherein at least one of the two polymerizable functional groups is connected to a ring A through a linking chain such as an alkyleneoxy group, and this ring A is then connected to a separate ring B, either directly, or through an ether coupling, a thioether coupling, an alkylene group, an oxyalkylene group, an alkyleneoxy group, a carbonyl group, an ester coupling, a thioester coupling, a vinyl group, a vinyl carbonyl oxy group, a vinyl alkylene group, an alkylene vinyl group, a methylimino group, an azo group or an amide group.

Of these compounds, those compounds with no ring substitution groups have a lower limit temperature for the nematic phase of at least 100° C., whereas a portion of those compounds with a substituted group on the ring such as a fluorine atom, a methyl group, a methoxy group or a methyl carbonyl group, display a lower limit of the nematic phase temperature which has been reduced to approximately 60° C. The polymerizable liquid crystal composition is aligned uniformly while in the liquid crystal state, and with this liquid crystal state maintained, is subsequently irradiated with an energy beam such as an ultraviolet light beam to effect a photopolymerization and semi-permanently fix the uniformly aligned state. Consequently, if the lower limit temperature for the nematic phase is higher than room temperature, then heating is required to maintain the liquid crystal state and ensure the uniform alignment, and as a result of this heating, unintended thermal polymerization will also be induced, in addition to the photopolymerization resulting from the energy beam irradiation, and such thermal polymerization can cause an undesirable loss of the uniformly aligned state of the liquid crystal molecules, meaning a non-uniform alignment state different from the desired state of uniform alignment will be fixed. In addition, a further problem arises in that in order to use these materials to prepare a polymerizable liquid crystal composition which displays a nematic phase within a highly workable temperature range from room temperature to approximately 40° C., where thermal polymerization is not induced, a combination of a large variety of liquid crystal compounds must be used. Furthermore, compounds with substituted groups on the ring are complicated to synthesize, and also display inferior adhesion to substrates, particularly in the case of compounds with a fluorine atom on the ring.

Furthermore, the compounds described in Japanese Unexamined Patent Application, First Publication No. Hei-10-310612 (EP-A 869112) and Int. Pat. Application 98-23580 comprise a plurality of cross-linkable intermediate phase (liquid crystal phase) forming residues within each molecule, and consequently suffer from a tendency to solidify into a glass like form. Moreover, because the molecular weight is large at 1000 to 3000, the viscosity is also high, and so these compounds also suffer from a lack of compatibility with other polymerizable liquid crystal compounds.

In addition, Japanese Unexamined Patent Application, First Publication No. Hei-9-40585 (U.S. Pat. No. 5,800,733) and Japanese Unexamined Patent Application, First Publication No. Hei-9-52857 (EP-A 755915) disclose compounds comprising a structure in which two cross-linkable intermediate phase (liquid crystal phase) forming residues are bonded to positions 1 and 2 of a six membered ring. These compounds do not display a nematic phase, and a portion of the compounds disclosed display a smectic A phase, although this smectic A phase suffers from a high viscosity and poor alignment.

Moreover, "Liquid Crystals", (Vol. 24, No. 3, pp. 375–379, 1998) discloses an impurity generated during synthesis of 2-(alkenyloxyphenyloxy)-5-(hydrothioalkyl-eneoxy phenyloxy) toluene, with a structure in which the hydrothio group of the compound and 4-hydrothioalkyl-eneoxy benzoic acid are bonded together. However in this document, disclosure is limited to the specifying of this compound as an impurity, and absolutely no comment is made regarding the use of this compound specified as an impurity for application to polymerizable liquid crystal compositions.

DISCLOSURE OF THE INVENTION

An object of the present invention is to provide a polymerizable liquid crystal composition incorporating a polymerizable liquid crystal compound which even without the introduction of ring substitution groups such as fluorine atoms, displays a low nematic phase temperature, displays excellent compatibility with other polymerizable liquid crystal compounds, and furthermore yields a product following polymerization of good transparency and mechanical strength.

On the basis of extensive research on the correlation between the chemical structure of liquid crystal compounds with polymerizable properties and the physical properties of such compounds, the inventors discovered that by using a liquid crystal compound comprising a ring (A) to which a polymerizable functional group is bonded and a ring (H) which is connected to the ring (A) through either a carbonyloxyalkyleneoxy group or an oxyalkylenecarbonyloxy group (D), the problems outlined above could be resolved, and were consequently able to complete this invention.

In other words, in order to resolve the aforementioned problems, the present invention provides (A) a polymerizable composition which displays a liquid crystal phase, and moreover incorporates a liquid crystalline backbone with two or more rings, and a compound (I) with a partial structure represented by the general formula $$P^1—S^1—A^1—D^1—E^1—$$

[wherein $P^1$ represents a polymerizable functional group;

$S^1$ represents a linkage chain selected from the group consisting of —$(CH_2)_w$—, —$O(CH_2)_w$—, —$(CH_2)_wO$—, —$(CH_2)_wC(=O)O$—, —$(CH_2)_wOC(=O)$—, —$C(=O)O(CH_2)_w$— and —$OC(=O)(CH_2)_w$— (wherein w represents an integer from 1 to 20);

$A^1$ and $E^1$ each represent, independently, a hydrocarbon ring or a hetero ring, although $E^1$ is a ring incorporated within the liquid crystal backbone.

and $D^1$ represents a linkage chain represented by —$C(=O)$—$O$—$(CH_2)_m$—$O$—, —$O(CH_2)_m$—$O$—$C(=O)$—, —$O$—$C(=O)$—$(CH_2)_m$—$O$—, or —$O(CH_2)_m$—$C(=O)$—$O$— (wherein m represents an integer from 1 to 15)].

Furthermore, in order to resolve the aforementioned problems, the present invention also provides (B) an optically anisotropic film comprising a polymer obtained by polymerizing a polymerizable liquid crystal composition according to (A) above.

In addition, in order to resolve the aforementioned problems, the present invention also provides (C) an optical low pass filter comprising an optically anisotropic film according to (B) above as a structural element.

BEST MODE FOR CARRYING OUT THE INVENTION

Figure 1:
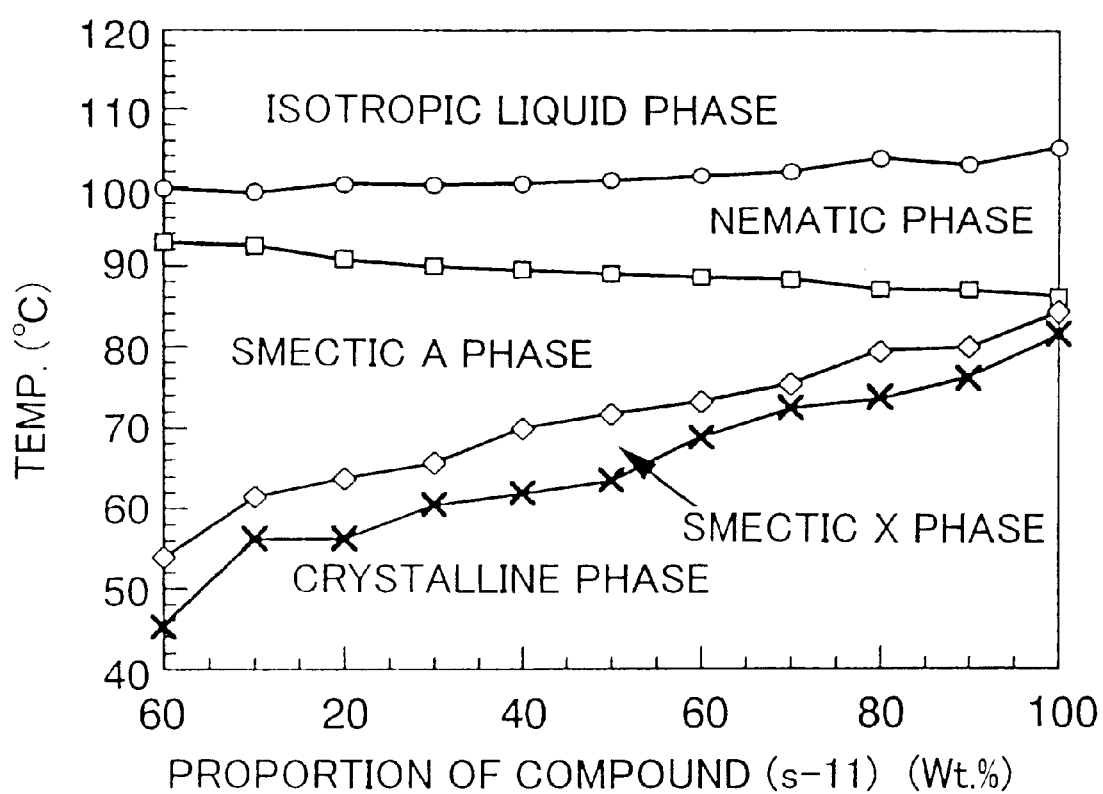
FIG. 1 is a graph showing the relationship between the proportion, within a composition comprising a liquid crystalline acrylate compound represented by the formula (s-4) and a liquid crystalline acrylate compound represented by a formula (s-11), of the liquid crystalline acrylate compound represented by the formula (s-11), and the phase which emerges.

The compound (I) used in a polymerizable liquid crystal composition of the present invention should preferably be a compound represented by the general formula (II)

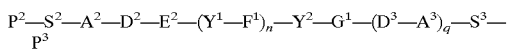

[wherein $P^2$ and $P^3$ each represent, independently, a polymerizable functional group selected from the group consisting of a (meth)acryloyloxy group, a (meth)acrylamide group, a vinyl group, an epoxy group, a mercapto group, a vinyloxy group and a maleimide group;

$S^2$ and $S^3$ each represent, independently, a linkage chain selected from the group consisting of —$(CH_2)_w$—, —$O(CH_2)_w$—, —$(CH_2)_wO$—, —$(CH_2)_wC(=O)O$—, —$(CH_2)_wOC(=O)$—, —$C(=O)O(CH_2)_w$— and —$OC(=O)(CH_2)_w$— (wherein w represents an integer from 1 to 20);

$A^2$, $A^3$, $E^2$, $F^1$, and $G^1$ each represent, independently, a ring structure selected from the group consisting of

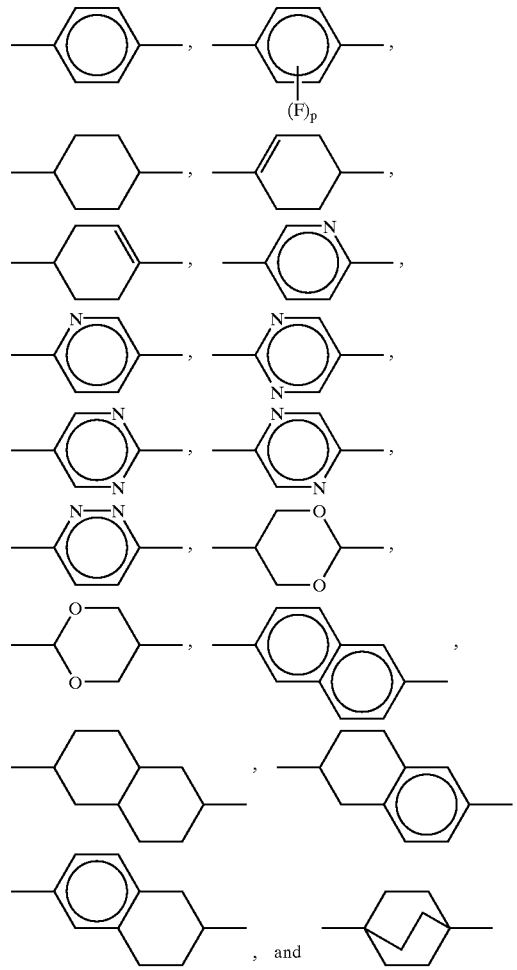

(wherein p represents an integer of 1 to 4);

$D^2$ and $D^3$ each represent, independently, a linkage chain selected from the group consisting of —$C(=O)$—$O$—$(CH_2)_m$—$O$—, —$O(CH_2)_m$—$O$—$C(=O)$—, —$O$—$C(=O)$—$(CH_2)_m$—$O$—, and —$O(CH_2)_m$—$C(=O)$—$O$— (wherein m represents an integer from 1 to 15);

$Y^1$ and $Y^2$ each represent, independently, a linkage group selected from the group consisting of a single bond, —CH$_2$CH$_2$—, —CH$_2$O—, —OCH$_2$—, —C(=O)O—, —OC(=O)—, —C≡C—, —CH=CH—, —CF=CF—, —(CH$_2$)$_4$—, —CH$_2$CH$_2$CH$_2$O—, —OCH$_2$CH$_2$CH$_2$—, —CH=CH—CH$_2$CH$_2$—, —CH$_2$CH$_2$—CH=CH—, —CH=CH—C(=O)O— and —OC(=O)—CH=CH—; and D represents an integer from 0 to 3, and q represents 0 or 1.]

In the compound (I) used in the liquid crystalline polymerizable composition of the present invention, and in the compound represented by the general formula (II), there are no particular restrictions on the polymerizable functional group, and any group which will undergo polymerization by radical polymerization, cationic polymerization or anionic polymerization is suitable, although functional groups which undergo polymerization by irradiation with an active energy beam such as an ultraviolet light beam, an electron beam, ionizing radiation such as α rays, β rays or γ rays, microwaves or a high frequency activated light beam are preferable.

Examples of suitable polymerizable functional groups include (meth)acryloyloxy groups, (meth)acrylamide groups, vinyl groups, epoxy groups, ethynyl groups, mercapto groups, vinyloxy groups and maleimide groups, although amongst these functional groups, (meth)acryloyloxy groups, vinyl groups, epoxy groups, mercapto groups and vinyloxy groups are preferred, with (meth)acryloyloxy groups, vinyl groups, epoxy groups and vinyloxy groups being particularly preferred, and (meth)acryloyloxy groups being the most desirable.

$S^1$, $S^2$ and $S^3$ each represent, independently, a linkage chain selected from the group consisting of —(CH$_2$)$_w$—, —O(CH$_2$)$_w$—, —(CH$_2$)$_w$O—, —(CH$_2$)$_w$C(=O)O—, —(CH$_2$)$_w$OC(=O)—, —C(=O)O(CH$_2$)$_w$— and —OC(=O)(CH$_2$)$_w$— (wherein w represents an integer from 1 to 20), where values of w within a range from 2 to 18 are preferred, and values within a range from 4 to 10 are even more desirable.

In the compound (I), $A^1$ and $E^1$ each represent, independently, a hydrocarbon ring such as an aliphatic hydrocarbon ring or an aromatic hydrocarbon ring, or a hetero ring such as a heterocyclic ring. These rings should preferably be 6 membered rings, or condensed rings arising from two 6 membered rings. Furthermore, the hydrogen atoms on these rings may be substituted with halogen atoms such as fluorine atoms or chlorine atoms, lower alkyl groups such as methyl groups, or lower alkoxy groups such as methoxy groups. The ring $E^1$ is incorporated within the liquid crystalline backbone. In addition, the liquid crystalline backbone in the compound (I) should be a cyclic structure with 2 or more hydrocarbon rings and/or hetero rings, and should preferably comprise from 2 to 6 of such rings. Preferred forms for this liquid crystalline backbone are those represented by the general formula —E$^2$—(Y$^1$—F$^1$)$_n$—Y$^2$—G$^1$— found within the aforementioned general formula (II).

$A^1$, $A^2$, $A^3$, $E^1$, $E^2$, $F^1$, and $G^1$ should preferably each represent, independently, a cyclic structure selected from the group consisting of

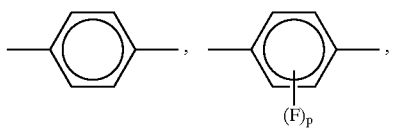

-continued

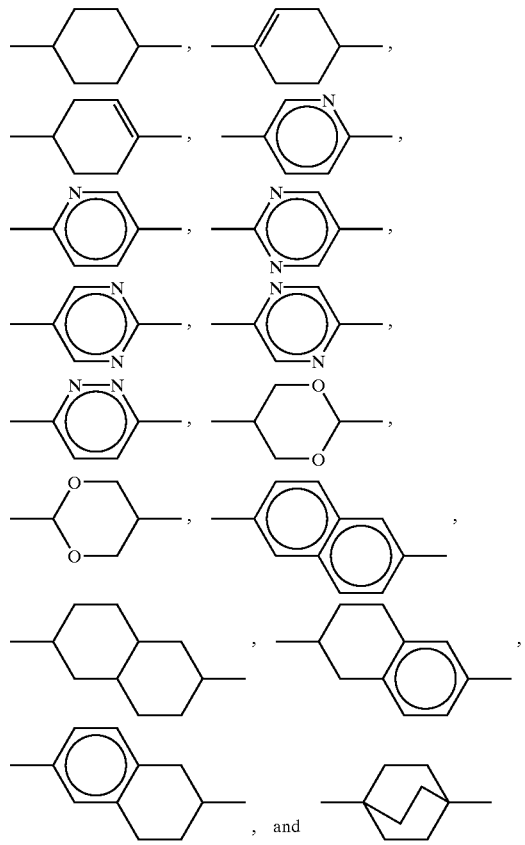

, and (wherein p represents an integer of 1 to 4). Of these cyclic structures, cyclic structures selected from the group consisting of

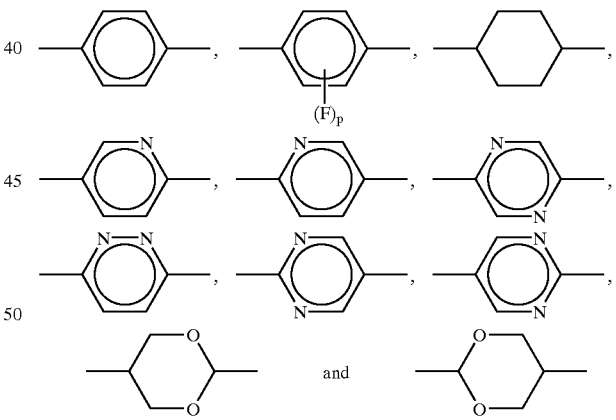

(wherein p represents an integer of 1 to 4) are preferred, with the structures

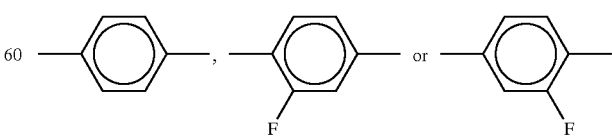

being even more desirable.

$D^1$, $D^2$ and $D^3$ each represent, independently, a linkage chain selected from the group consisting of —C(=O)—

O—$(CH_2)_m$—O—, —O$(CH_2)_m$—O—C(=O)—, —O—C(=O)—$(CH_2)_m$—O—, and —O$(CH_2)_m$—C(=O)—O— (wherein m represents an integer from 2 to 15), and of these linkage chains, —C(=O)O$(CH_2)_m$—O— and —O$(CH_2)_m$—O—C(=O)— are particularly preferred. In the case of the linkage chain —C(=O)OCH$_2$—O— where m=1, two ether groups are bonded to the same carbon atom, and so not only is the simple compound poor in terms of light resistance, but so is the resulting polymer, and as such the structure is undesirable.

$Y^1$ and $Y^2$ each represent, independently, a single bond, —$CH_2CH_2$—, —$CH_2O$—, —$OCH_2$—, —C(=O)O—, —OC(=O)—, —C≡C—, —CH=CH—, —CF=CF—, —$(CH_2)_4$—, —$CH_2CH_2CH_2O$—, —$OCH_2CH_2CH_2$—, —CH=CH—$CH_2CH_2$—, —$CH_2CH_2$—CH=CH—, —CH=CH—C(=O)O— or —OC(=O)—CH=CH—. Furthermore, n represents an integer from 0 to 3. In those cases where n is either 2 or 3, then $Y^1$ and $F^1$ may be either the same, or different.

Examples of the liquid crystalline backbone represented by the general formula —$E^2$—$(Y^1$—$F^1)_n$—$Y^2$—$G^1$— include the structures represented by the formulae (I) to (446) shown below.

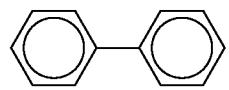
(1)

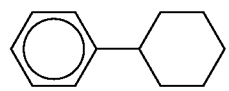
(2)

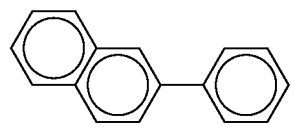
(3)

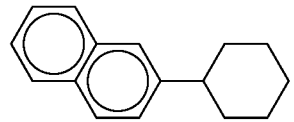
(4)

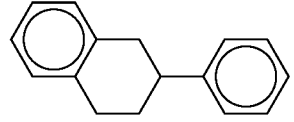
(5)

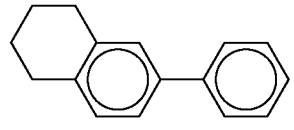
(6)

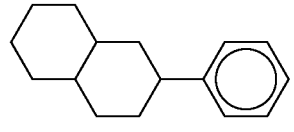
(7)

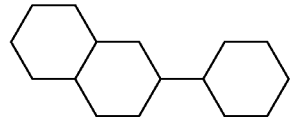
(8)

-continued

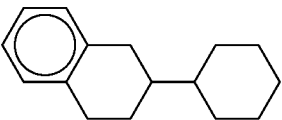
(9)

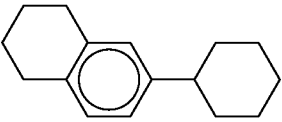
(10)

(11)

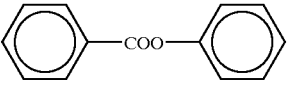
(12)

(13)

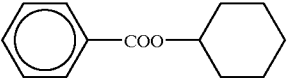
(14)

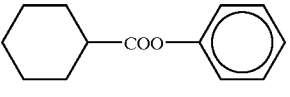
(15)

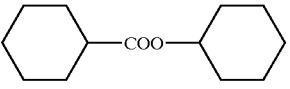
(16)

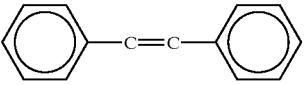
(17)

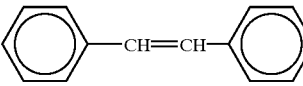
(18)

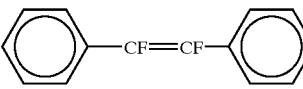
(19)

(20)

(21)

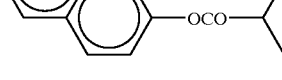
(22)

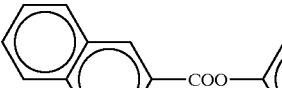

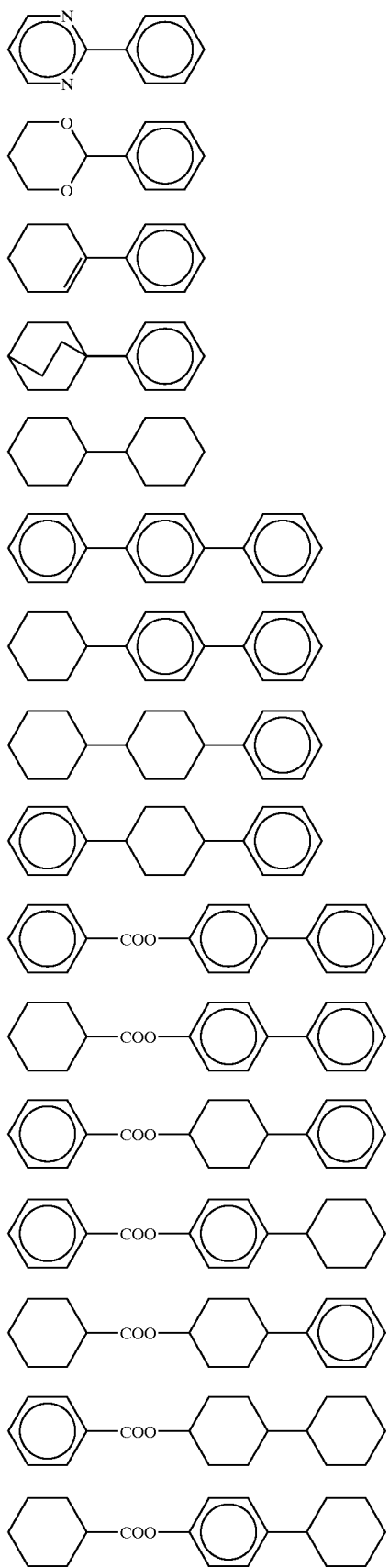
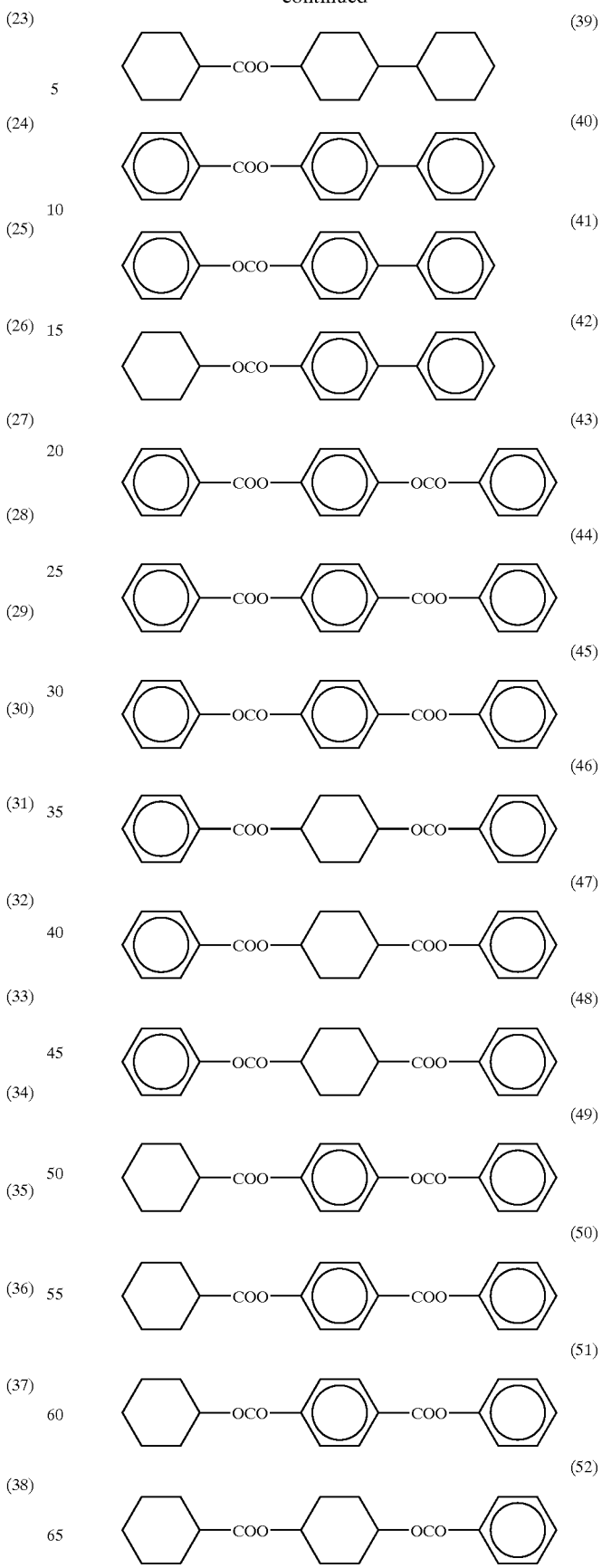

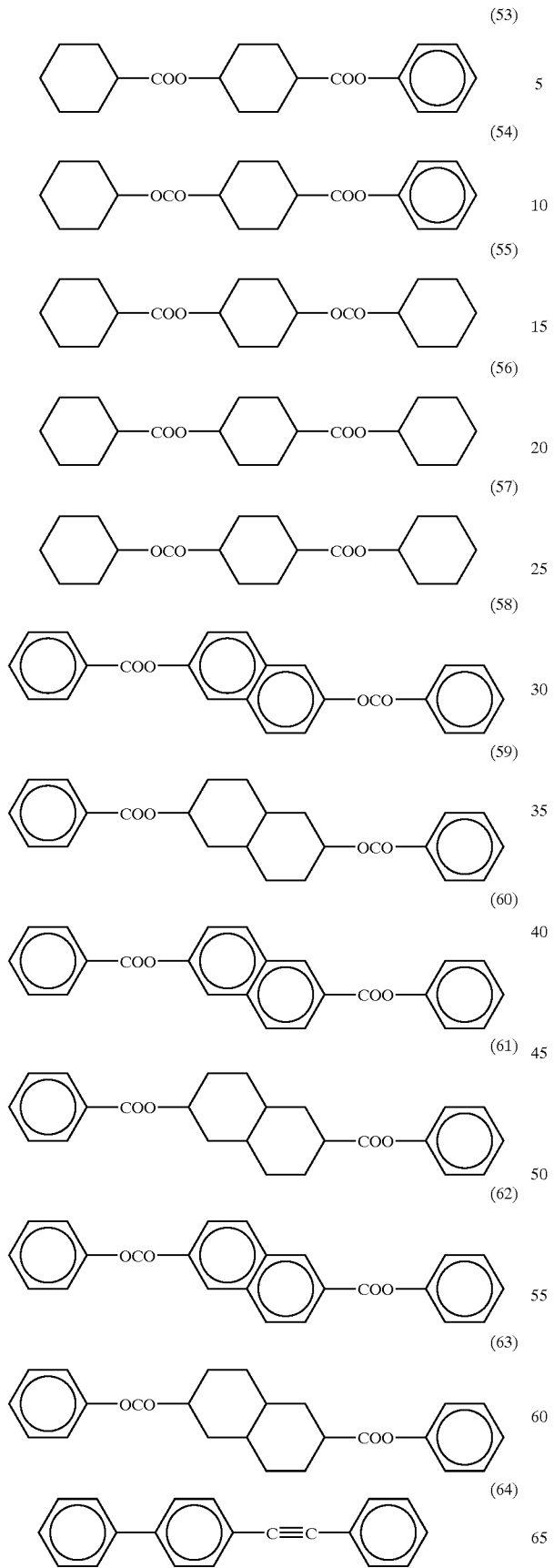
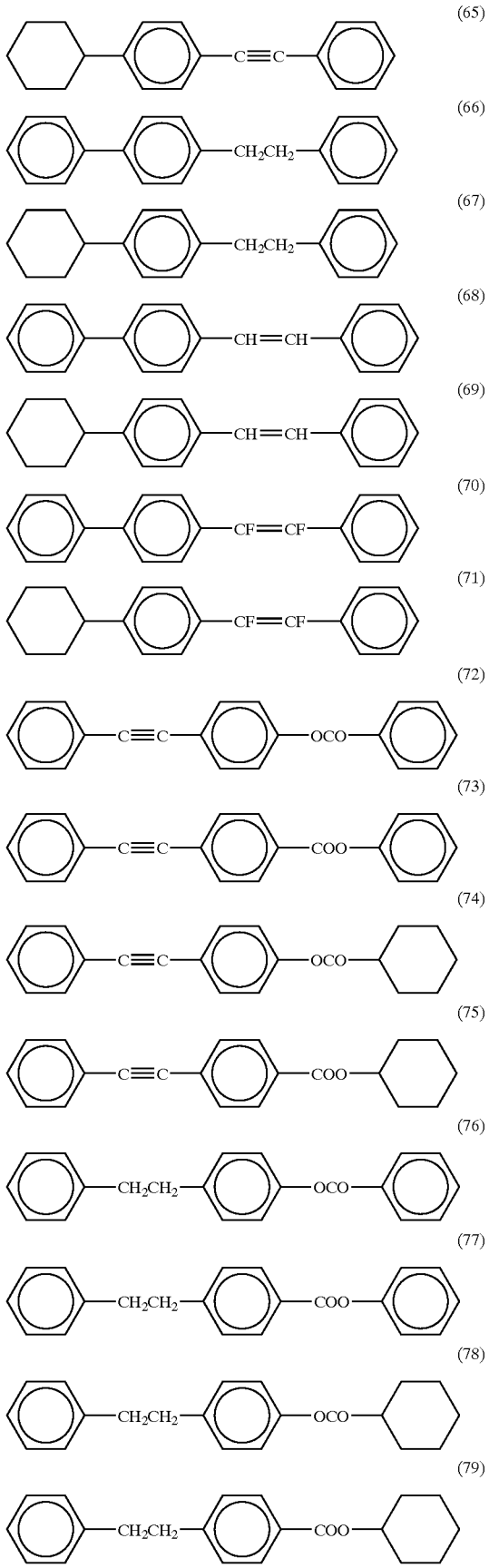

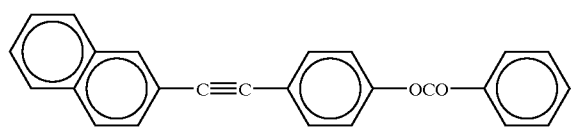 (80)
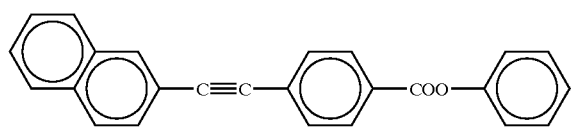 (81)
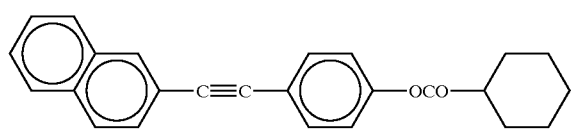 (82)
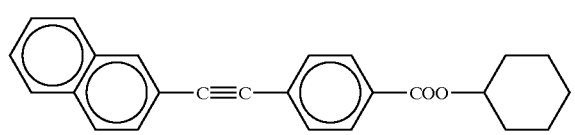 (83)
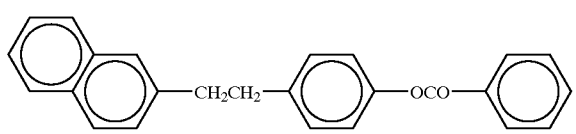 (84)
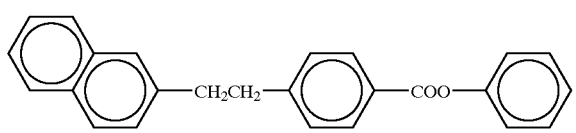 (85)
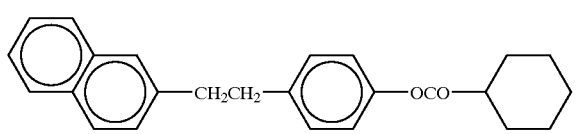 (86)
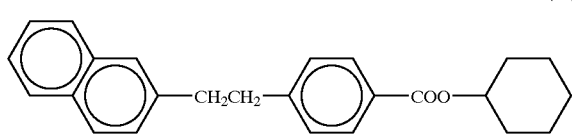 (87)
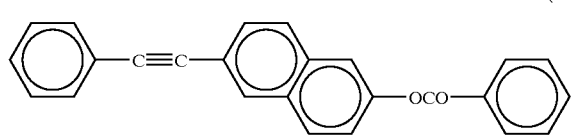 (88)
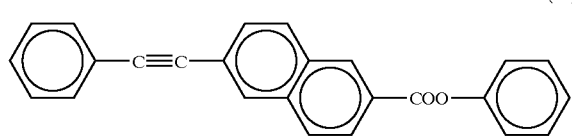 (89)
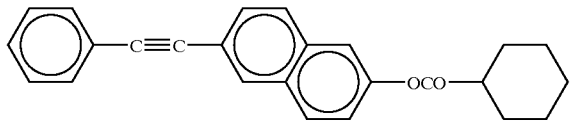 (90)
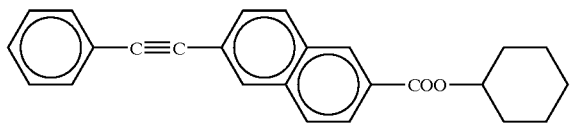 (91)
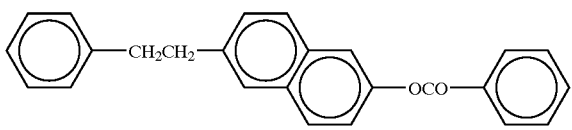 (92)
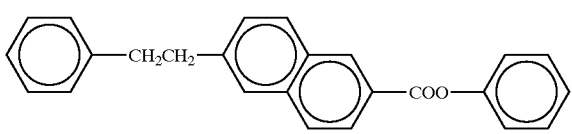 (93)
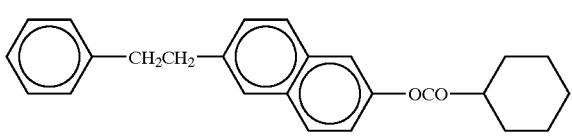 (94)
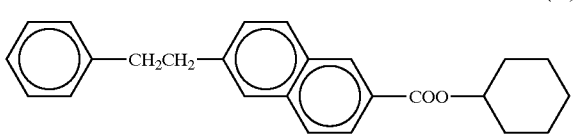 (95)
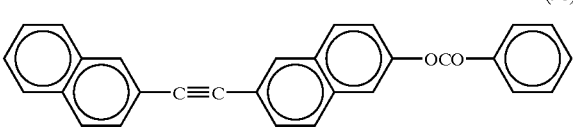 (96)
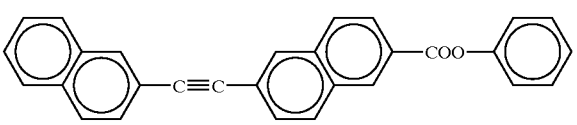 (97)
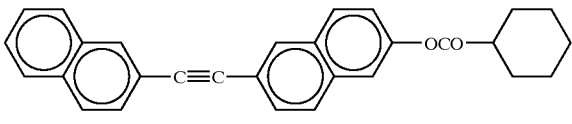 (98)
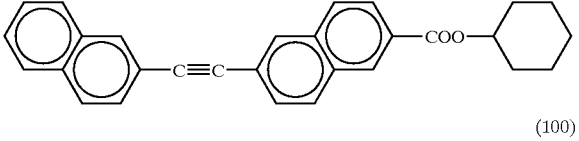 (99)
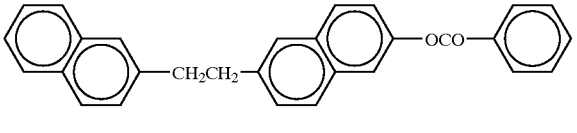 (100)

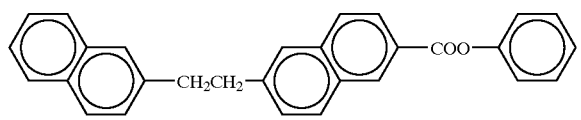 (101)
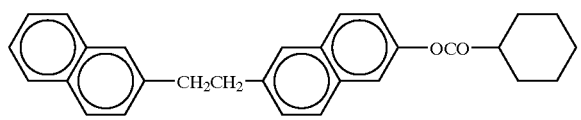 (102)
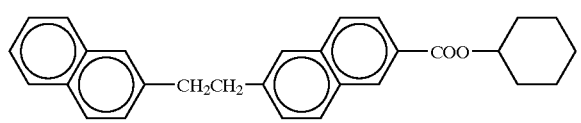 (103)
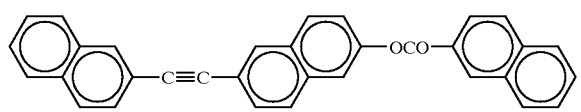 (104)
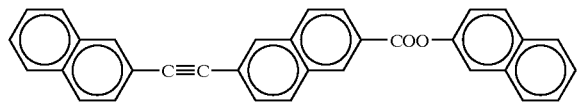 (105)
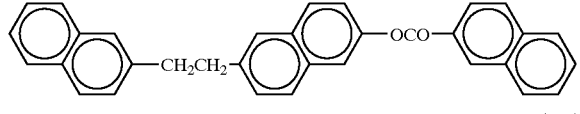 (106)
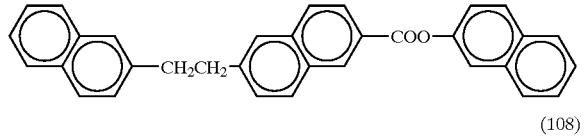 (107)
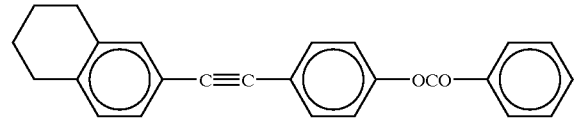 (108)
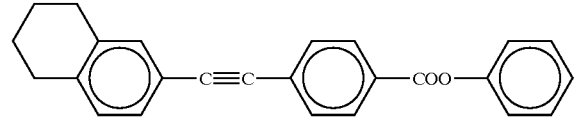 (109)
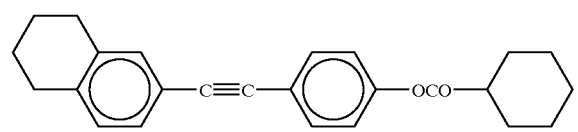 (110)
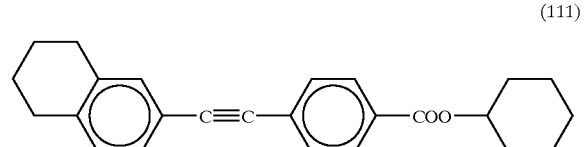 (111)
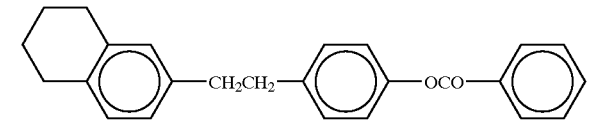 (112)
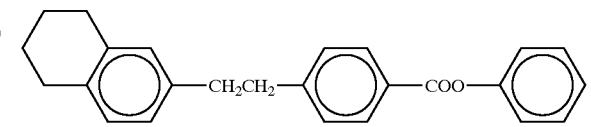 (113)
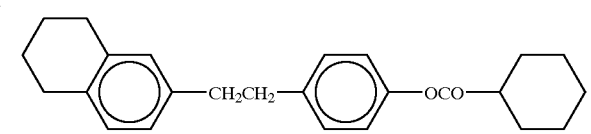 (114)
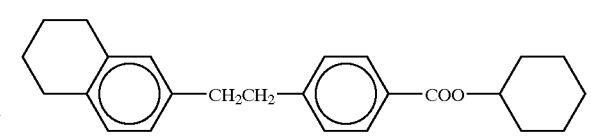 (115)
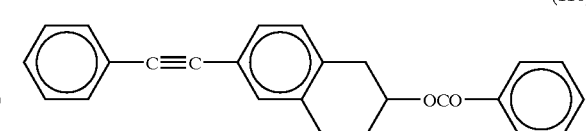 (116)
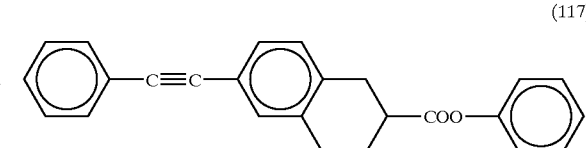 (117)
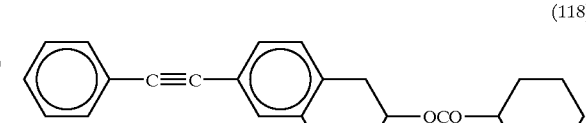 (118)
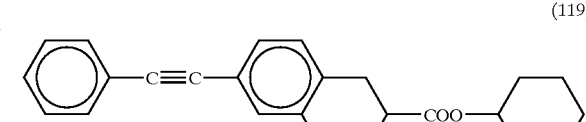 (119)
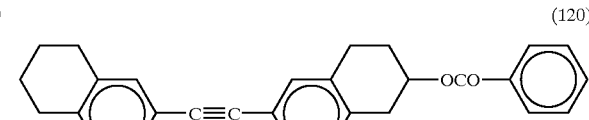 (120)
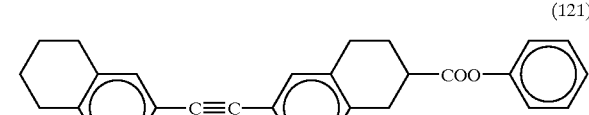 (121)
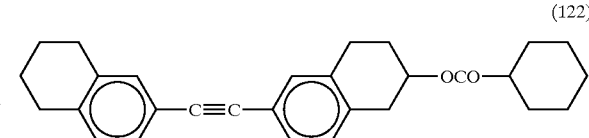 (122)

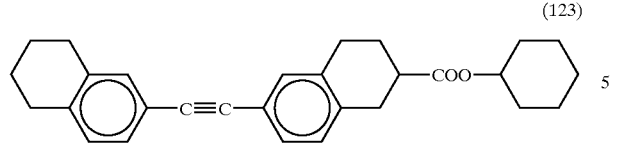 (123)
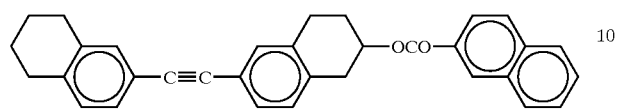 (124)
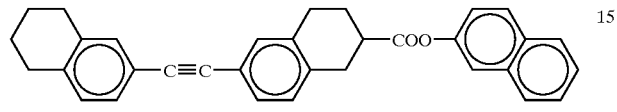 (125)
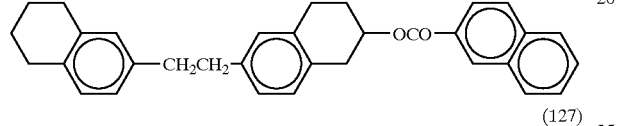 (126)
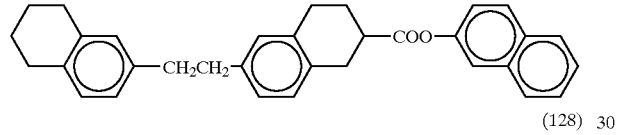 (127)
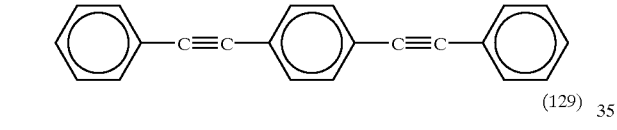 (128)
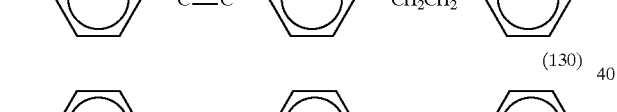 (129)
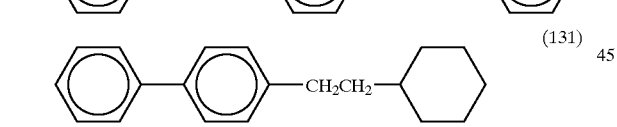 (130)
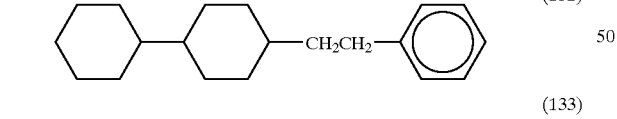 (131)
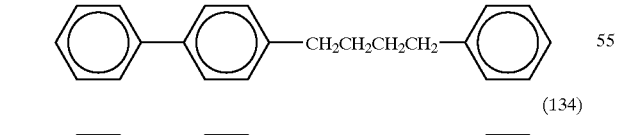 (132)
 (133)
 (134)
 (135)
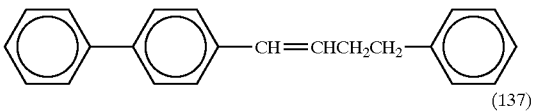 (136)
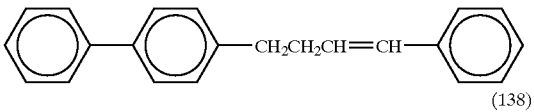 (137)
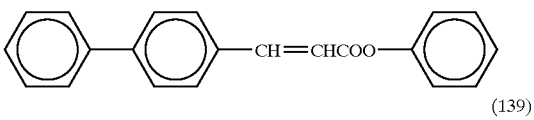 (138)
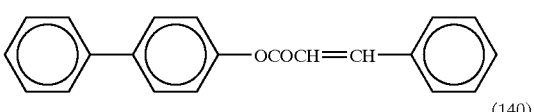 (139)
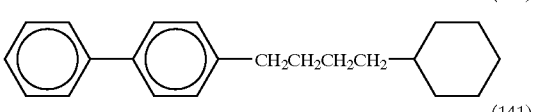 (140)
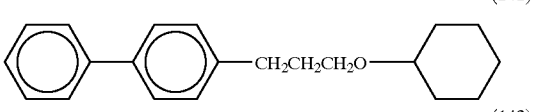 (141)
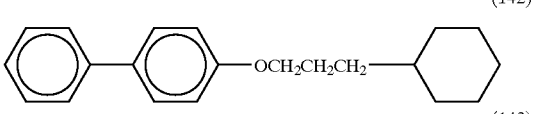 (142)
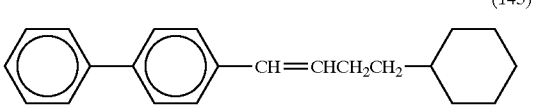 (143)
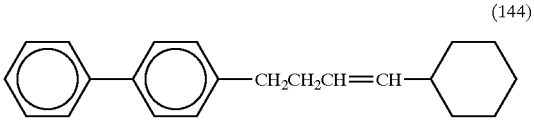 (144)
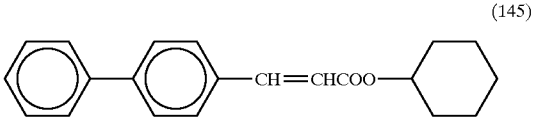 (145)
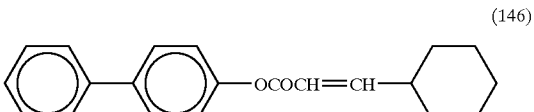 (146)
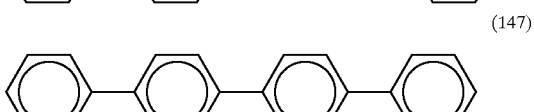 (147)
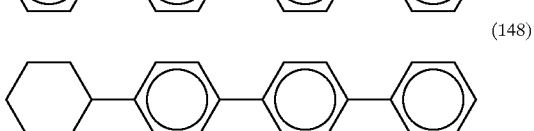 (148)
 (149)

(150)
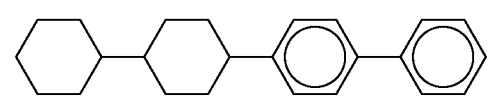
(151)
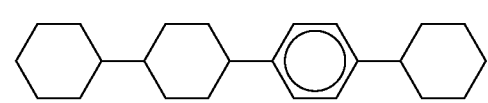
(152)
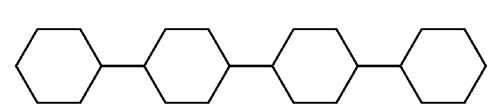
(153)
(154)
(155)
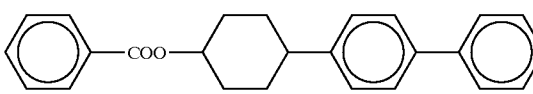
(156)
(157)
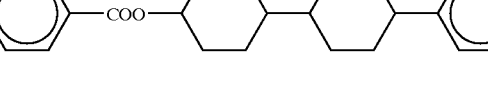
(158)
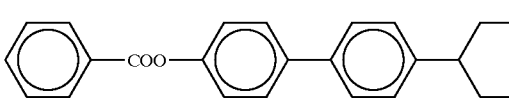
(159)
(160)
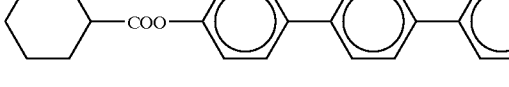
(161)
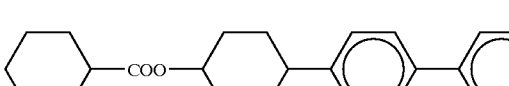
(162)
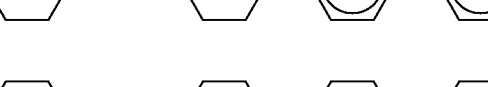
(163)
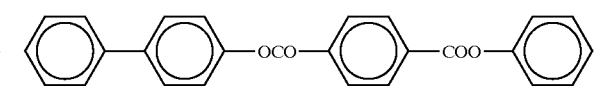
(164)
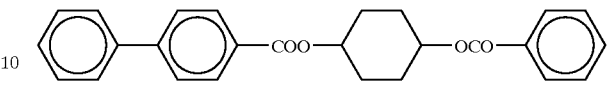
(165)
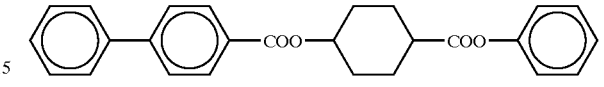
(166)
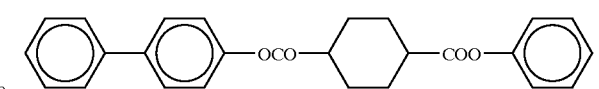
(167)
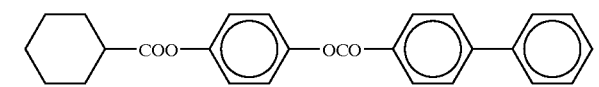
(168)
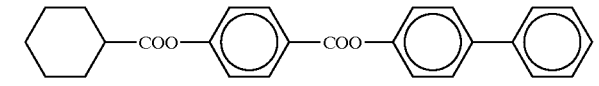
(169)
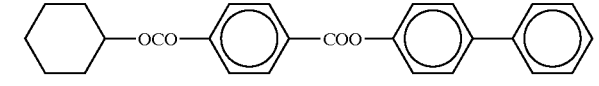
(170)
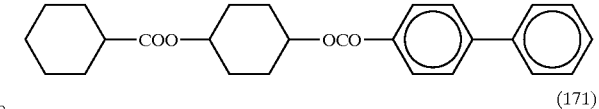
(171)
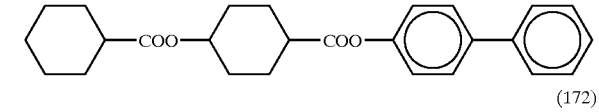
(172)
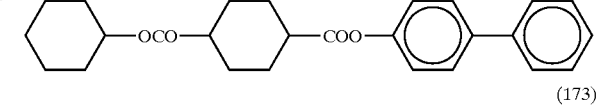
(173)
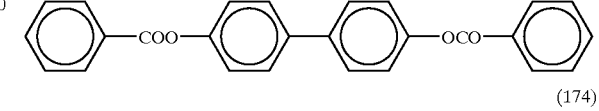
(174)
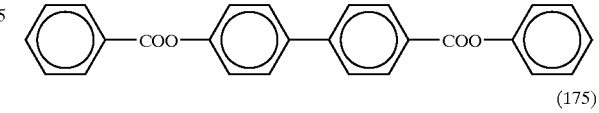
(175)
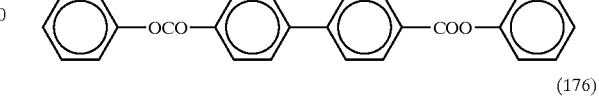
(176)

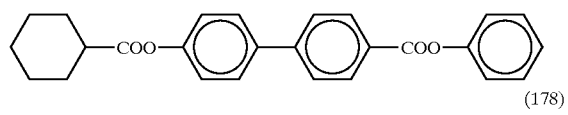
(177)
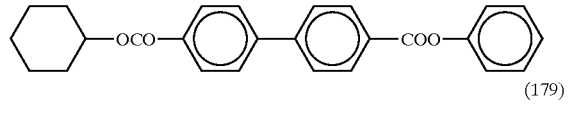
(178)
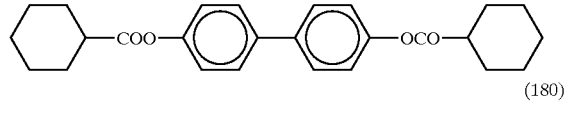
(179)
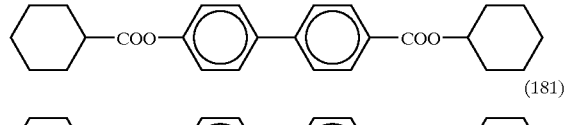
(180)
(181)
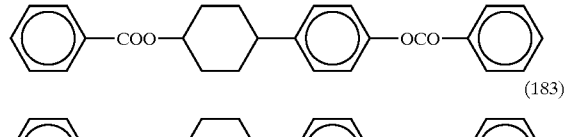
(182)
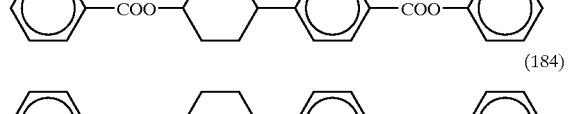
(183)
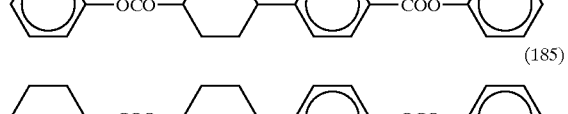
(184)
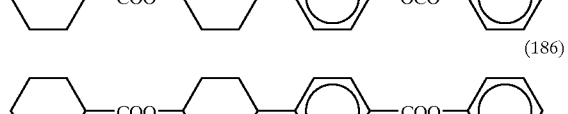
(185)
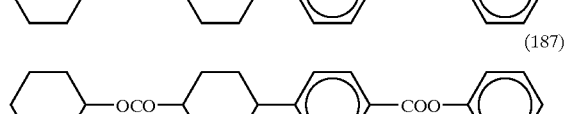
(186)
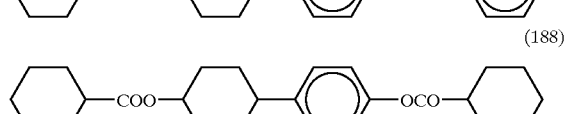
(187)
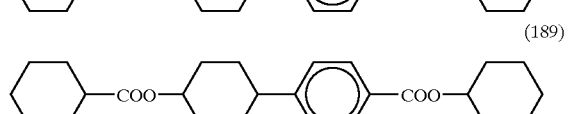
(188)
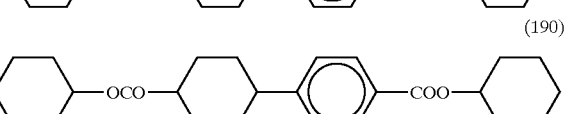
(189)
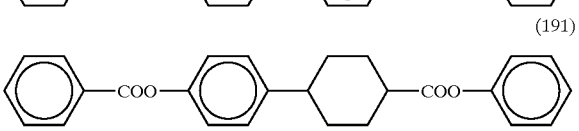
(190)
(191)
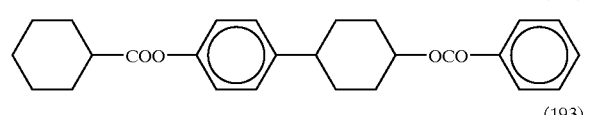
(192)
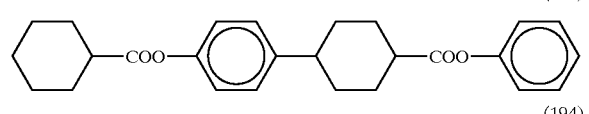
(193)
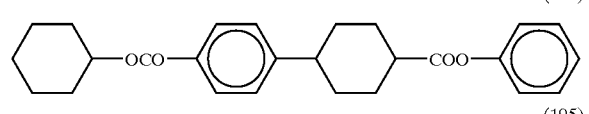
(194)
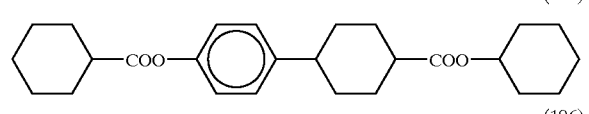
(195)
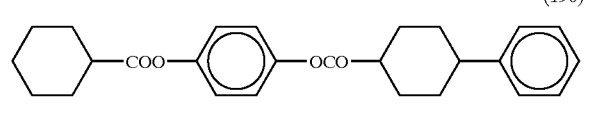
(196)
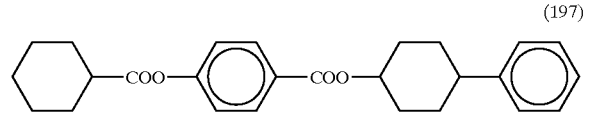
(197)
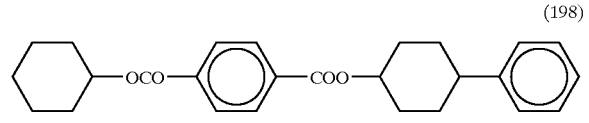
(198)
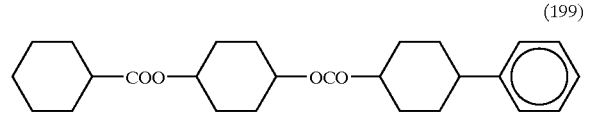
(199)
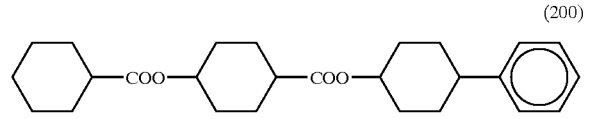
(200)
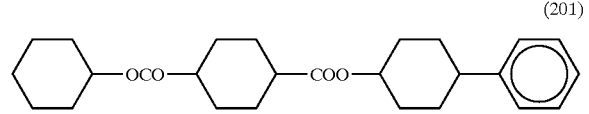
(201)
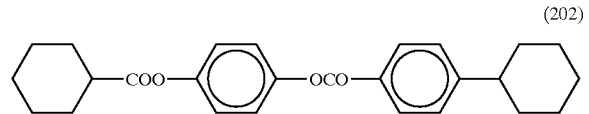
(202)
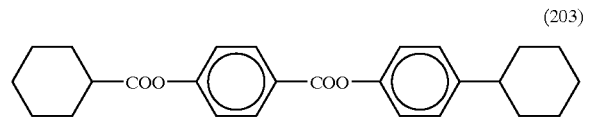
(203)
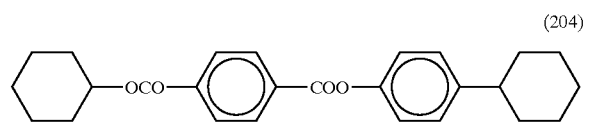
(204)
(205)

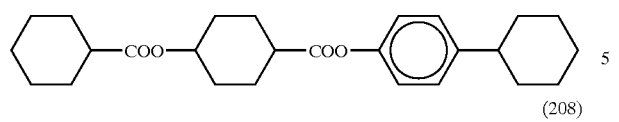
(207)
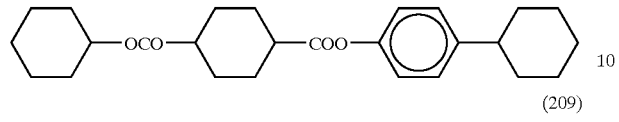
(208)
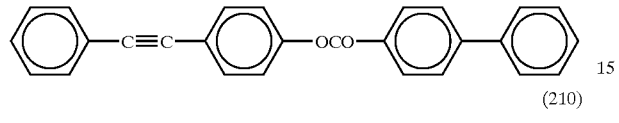
(209)
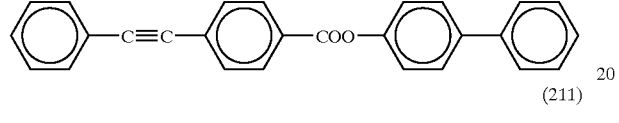
(210)
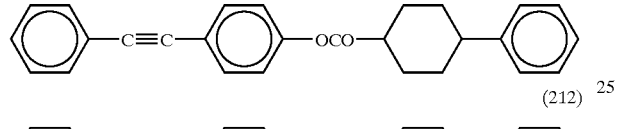
(211)
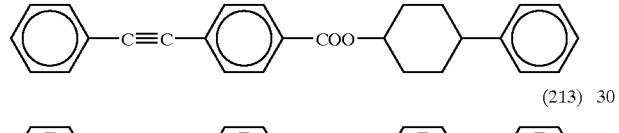
(212)
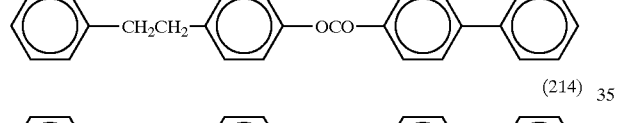
(213)
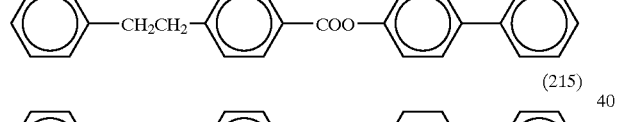
(214)
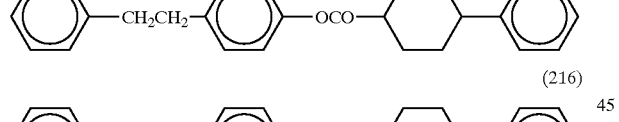
(215)
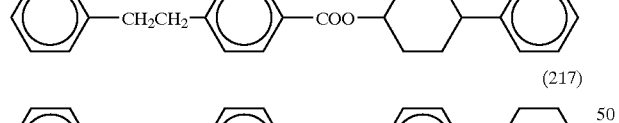
(216)
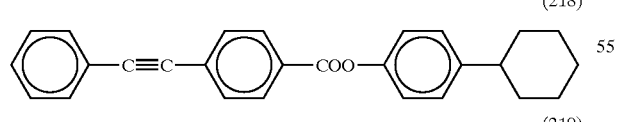
(217)
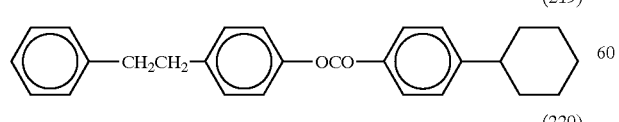
(218)
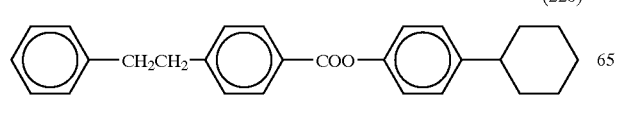
(219)
(220)
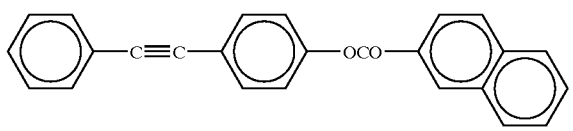
(221)
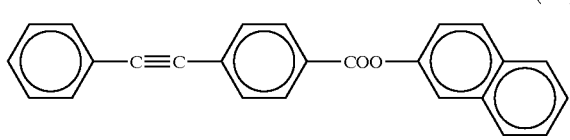
(222)
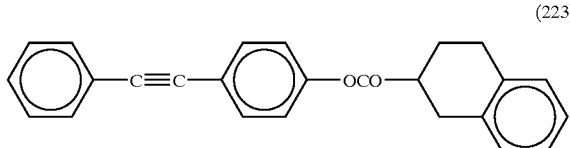
(223)
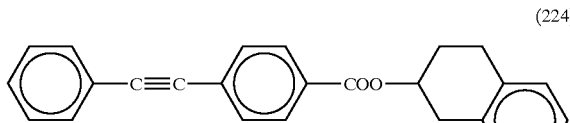
(224)
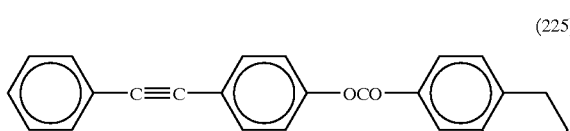
(225)
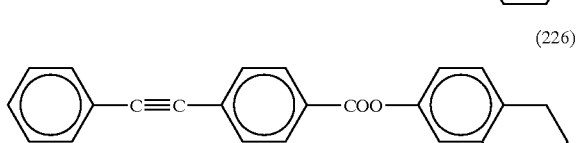
(226)
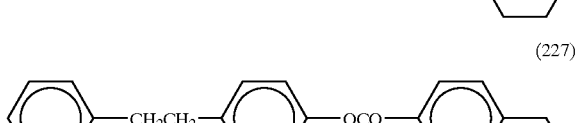
(227)
(228)
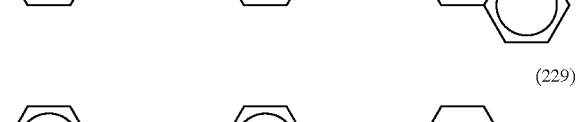
(229)
(230)

(231) 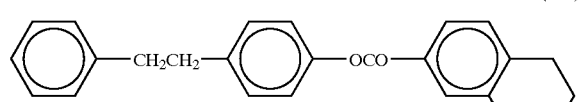
(232) 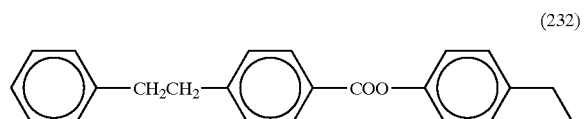
(233) 
(234) 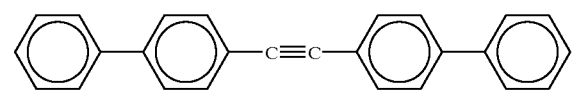
(235) 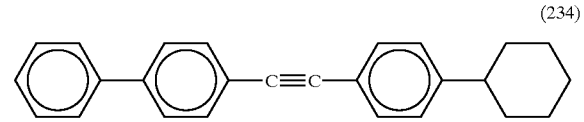
(236) 
(237) 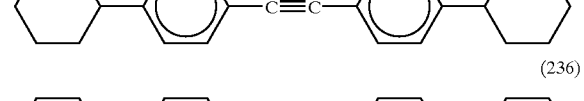
(238) 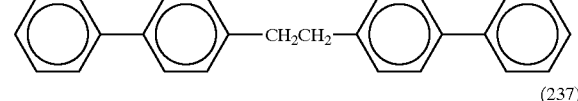
(239) 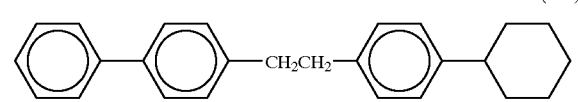
(240) 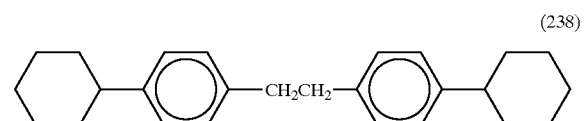
(241) 
(242) 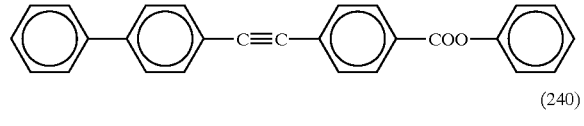
(243) 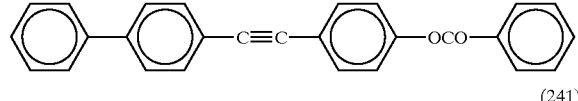
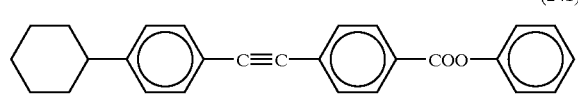
(244) 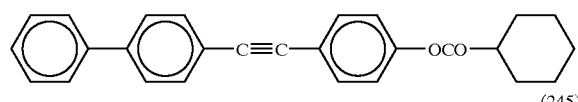
(245) 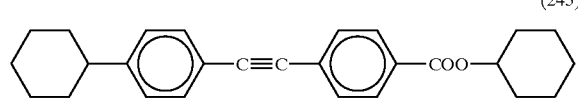
(246) 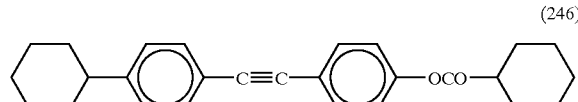
(247) 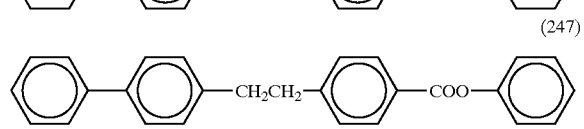
(248) 
(249) 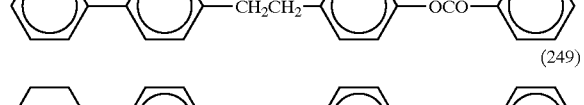
(250) 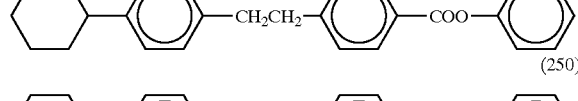
(251) 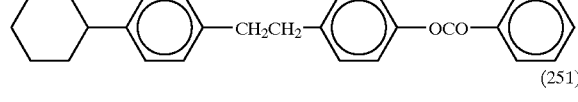
(252) 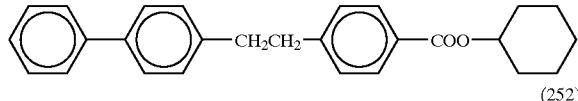
(253) 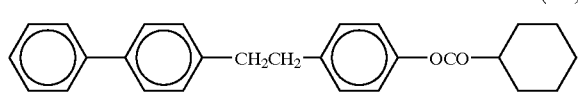
(254) 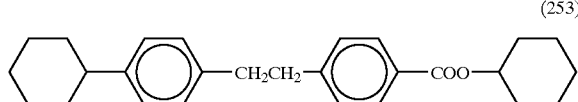
(255) 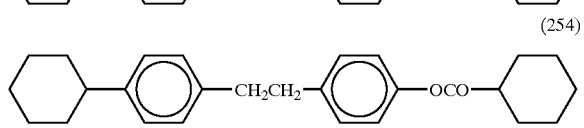
(256) 
(257) 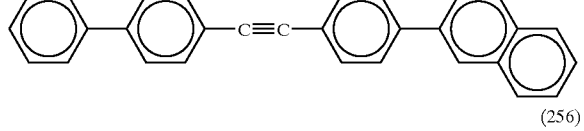

(258) 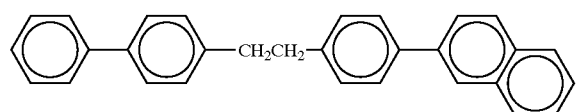
(259) 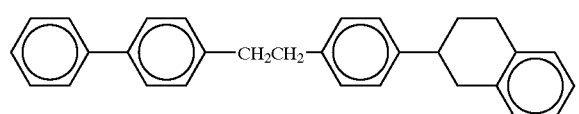
(260) 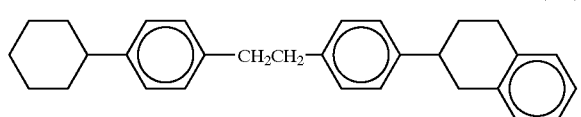
(260) 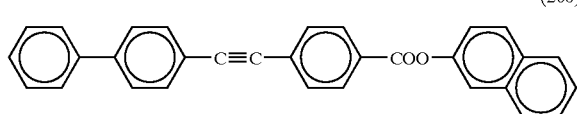
(261) 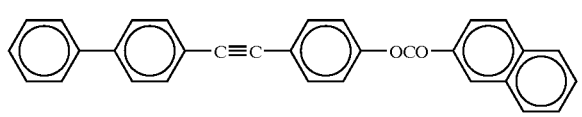
(262) 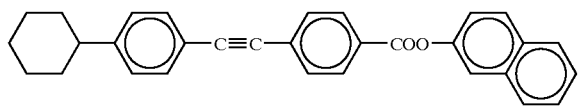
(263) 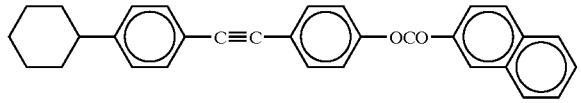
(264) 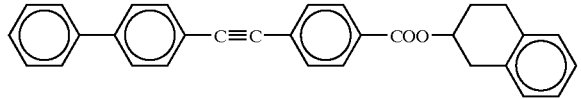
(265) 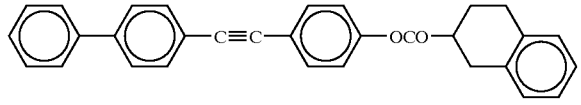
(266) 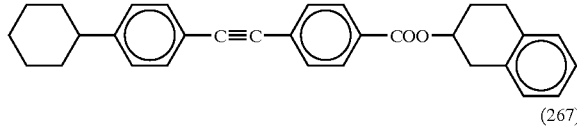
(267) 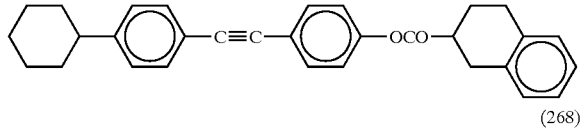
(268) 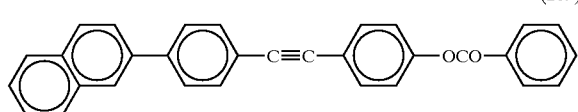
(269) 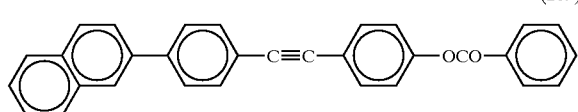
(270) 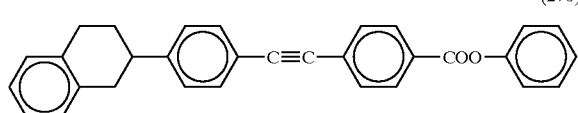
(271) 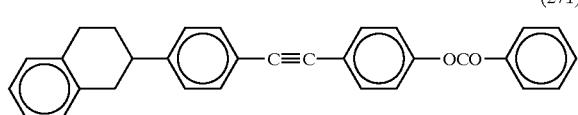
(272) 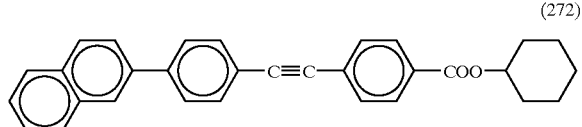
(273) 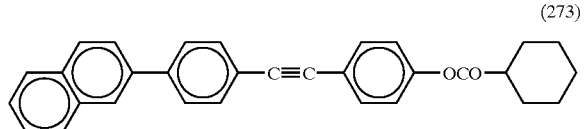
(274) 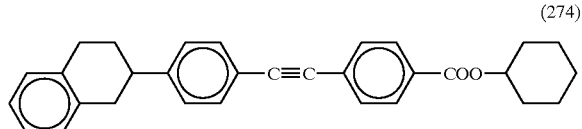
(275) 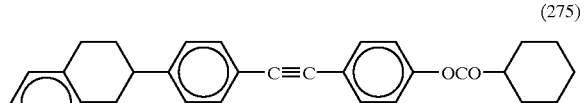
(276) 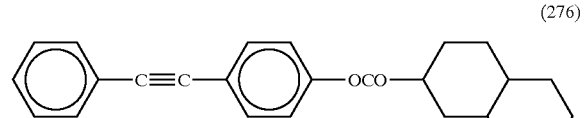
(277) 
(278) 
(279) 

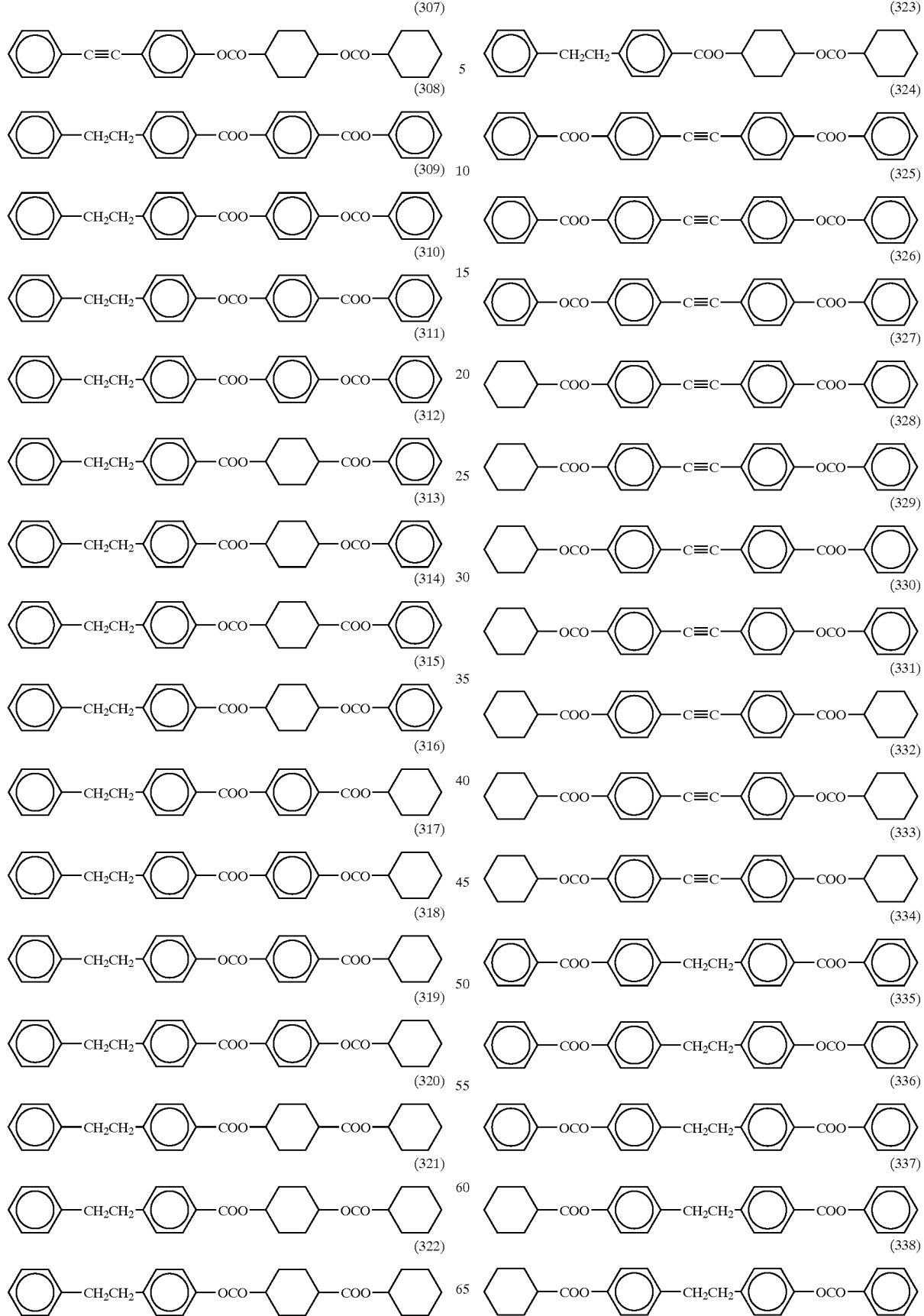

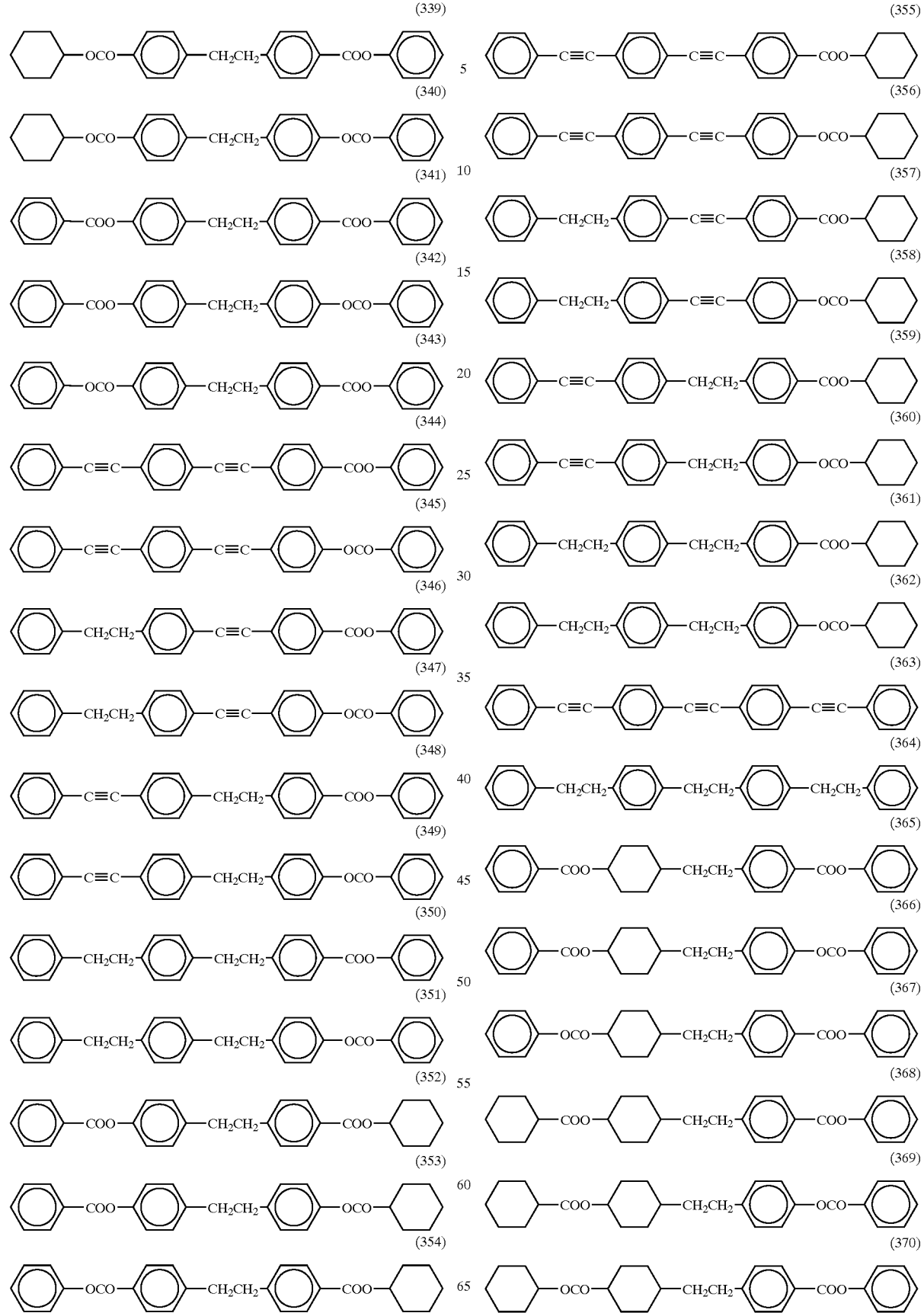

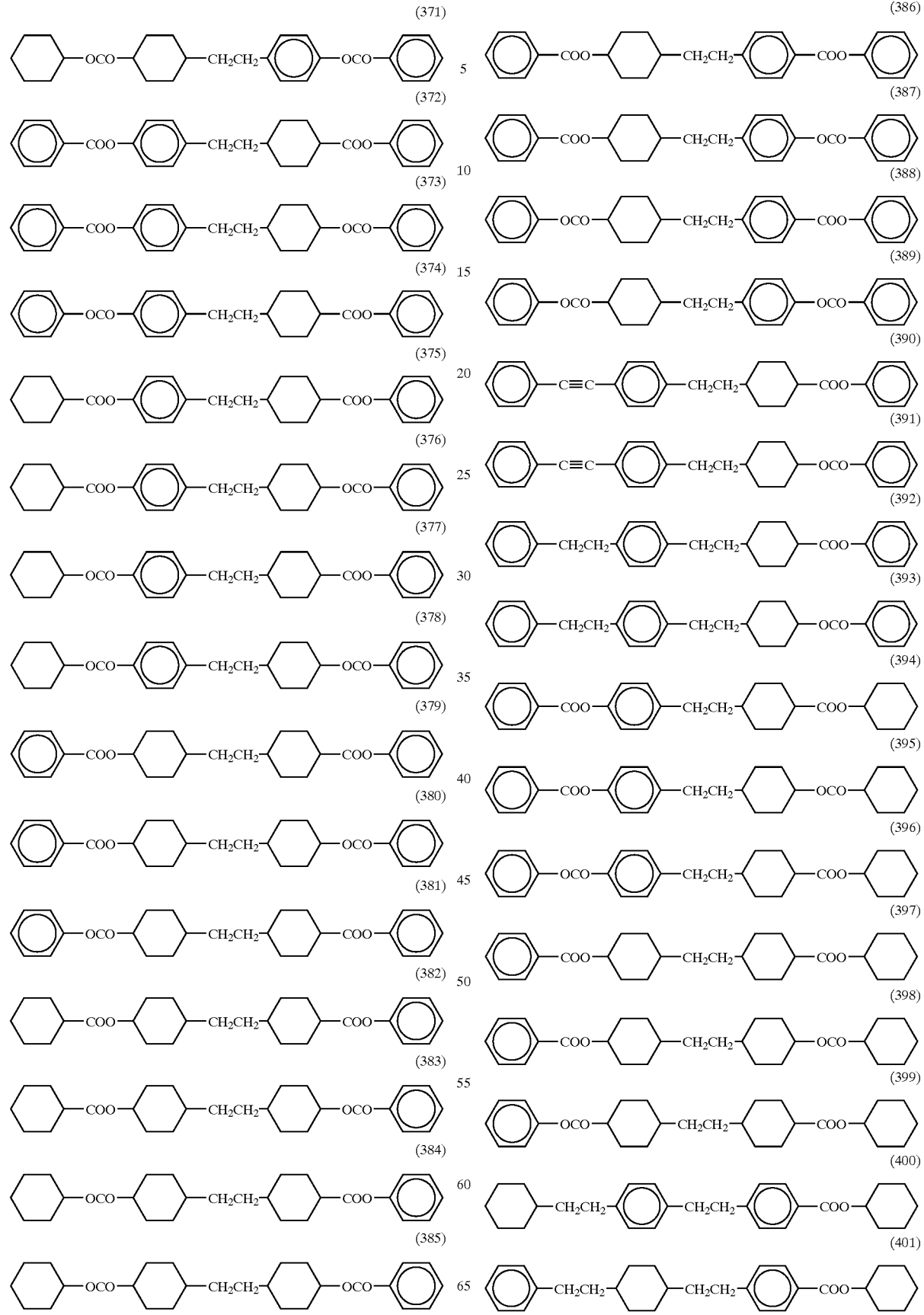

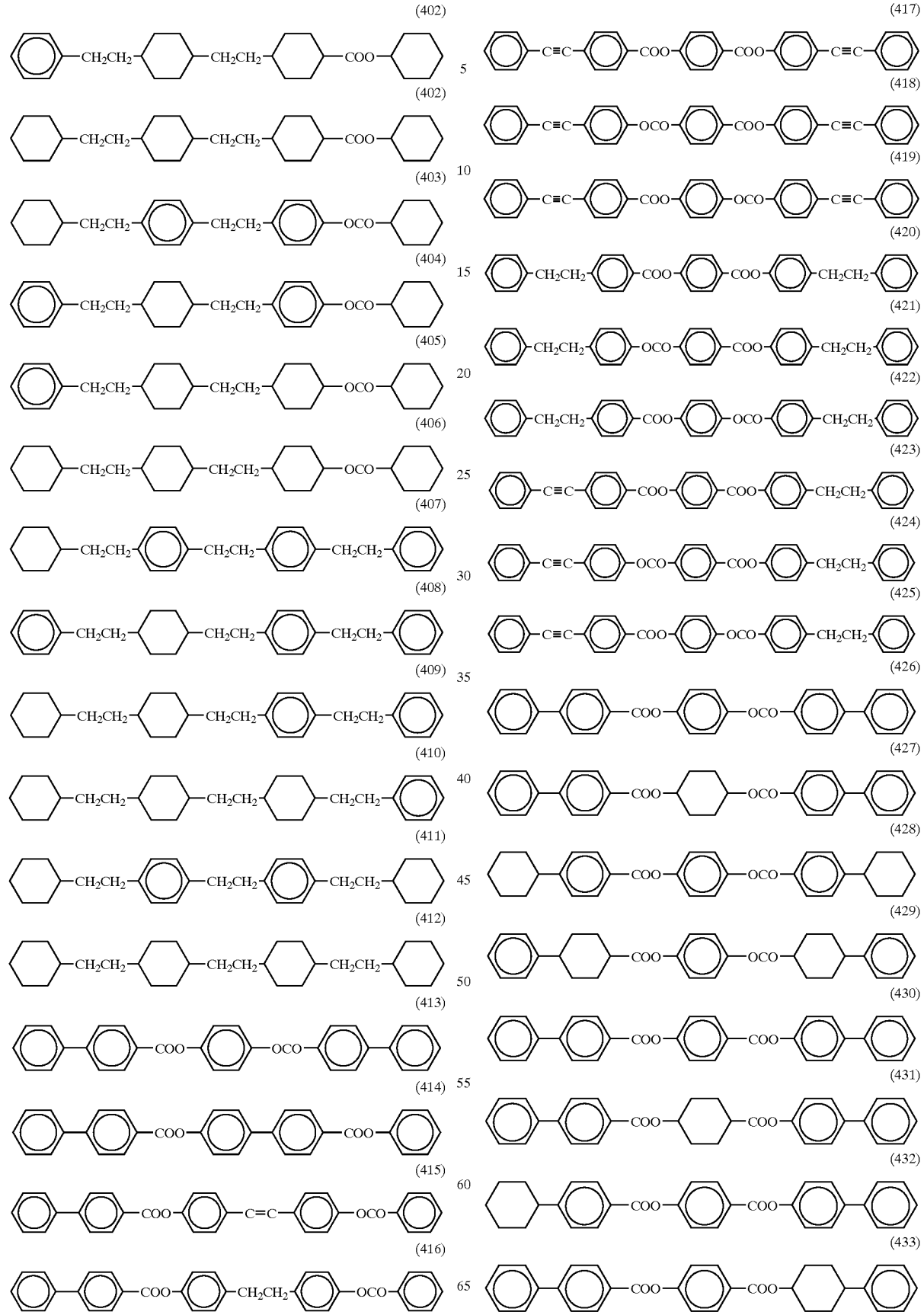

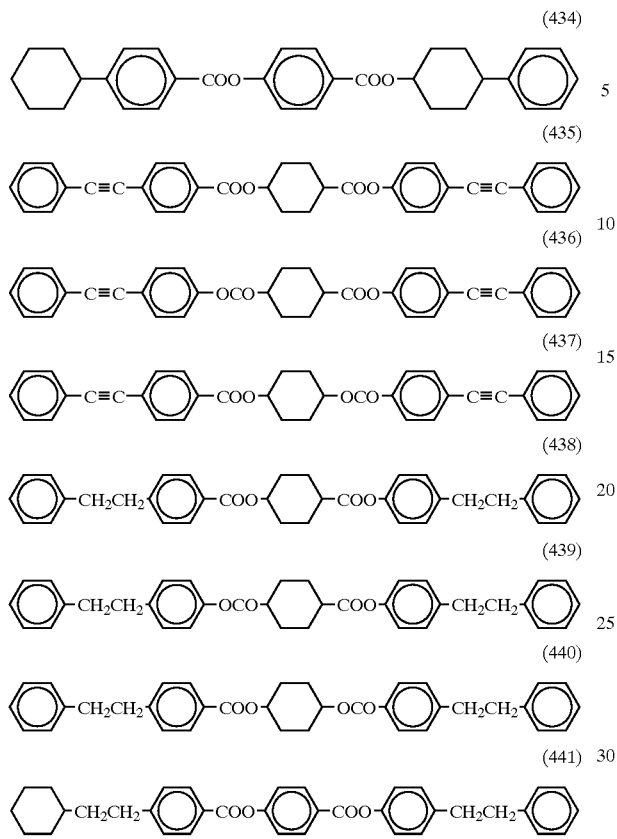

(wherein the aromatic rings, aliphatic rings, heterocyclic rings and condensed rings in the formulae (I) to (446) may also be subject to substitution with one or more substitution groups selected from the group consisting of cyano groups, halogen atoms, and alkyl groups, alkoxy groups and alkanoyl groups of 1 to 7 carbon atoms.)

Of the compounds represented by the general formula (II), particularly preferred compounds include: polymerizable liquid crystalline compounds represented by the general formula (VI)

(wherein X represents a hydrogen atom or a methyl group, $Y^3$ represents a linkage group selected from the group consisting of a single bond, —OC(=O)—, —C(=O)O—, —C=C— and —CH$_2$CH$_2$—, q represents an integer from 1 to 20, m represents an integer from 2 to 15, and p represents either of the integers 0 or 1. Furthermore, each of the 1,4-phenylene groups may be independently subject to substitution with one or more substitution groups selected from the group consisting of cyano groups, halogen atoms, and alkyl groups, alkoxy groups and alkanoyl groups of 1 to 7 carbon atoms.); polymerizable liquid crystalline compounds represented by the general formula (VII)

(wherein X represents a hydrogen atom or a methyl group, $Y^3$ represents a linkage group selected from the group consisting of a single bond, —OC(=O)—, —C(=O)O—, —C≡C—, and —CH$_2$CH$_2$—, q represents an integer from 1 to 20, m represents an integer from 2 to 15, and p represents either of the integers 0 or 1. Furthermore, each of the 1,4-cyclohexylene groups and 1,4-phenylene groups may be independently subject to substitution with one or more substitution groups selected from the group consisting of cyano groups, halogen atoms, and alkyl groups, alkoxy groups and alkanoyl groups of 1 to 7 carbon atoms.); polymerizable liquid crystalline compounds represented by the general formula (VIII)

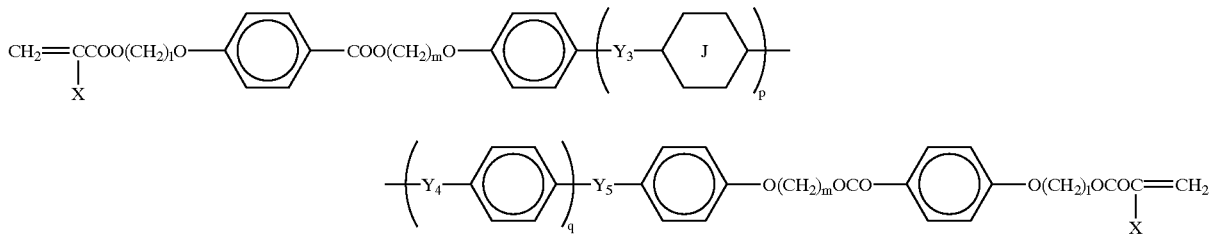

(wherein X represents a hydrogen atom or a methyl group, $Y^3$, $Y^4$ and $Y^5$ each represent, independently, a linkage group selected from the group consisting of a single bond, —OC(=O)—, —C(=O)O—, —C≡C—, and —CH$_2$CH$_2$—, p and q each represent, independently, either of the integers 0 or 1, l represents an integer from 1 to 20, m represents an integer from 2 to 15, and the ring J represents a 1,4-cyclohexylene group or a 1,4-phenylene group. Furthermore, each of the 1,4-cyclohexylene groups and 1,4-phenylene groups may be independently subject to substitution with one or more substitution groups selected from the group consisting of cyano groups, halogen atoms, and alkyl groups, alkoxy groups and alkanoyl groups of 1 to 7 carbon atoms.); polymerizable liquid crystalline compounds represented by the general formula (XXXV)

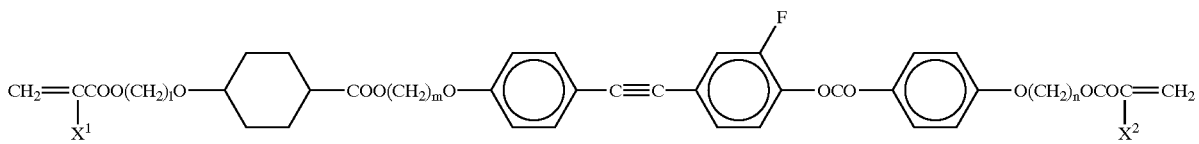

(wherein $X^1$ and $X^2$ each represent a hydrogen atom or a methyl group, l and n each represent, independently, an integer from 1 to 20, and m represents an integer from 3 to 16. Furthermore, each of the 1,4-cyclohexylene groups and 1,4-phenylene groups may be independently subject to substitution with one or more substitution groups selected from the group consisting of cyano groups, halogen atoms, and alkyl groups, alkoxy groups and alkanoyl groups of 1 to 7 carbon atoms.); polymerizable liquid crystalline compounds represented by the general formula (IX)

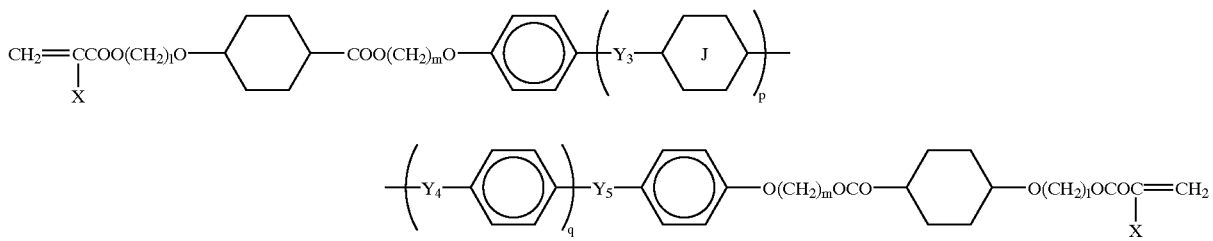

(wherein X represents a hydrogen atom or a methyl group, $Y^3$, $Y^4$ and $Y^5$ each represent, independently, a linkage group selected from the group consisting of a single bond, —OC(=O)—, —C(=O)O—, —C≡C—, and —CH$_2$CH$_2$—, p and q each represent, independently, either of the integers 0 or 1, l represents an integer from 1 to 20, m represents an integer from 2 to 15, and the ring J represents a 1,4-cyclohexylene group or a 1,4-phenylene group. Furthermore, each of the 1,4-cyclohexylene groups and 1,4-phenylene groups may be independently subject to substitution with one or more substitution groups selected from the group consisting of cyano groups, halogen atoms, and alkyl groups, alkoxy groups and alkanoyl groups of 1 to 7 carbon atoms.); and polymerizable liquid crystalline compounds represented by the general formula (X)

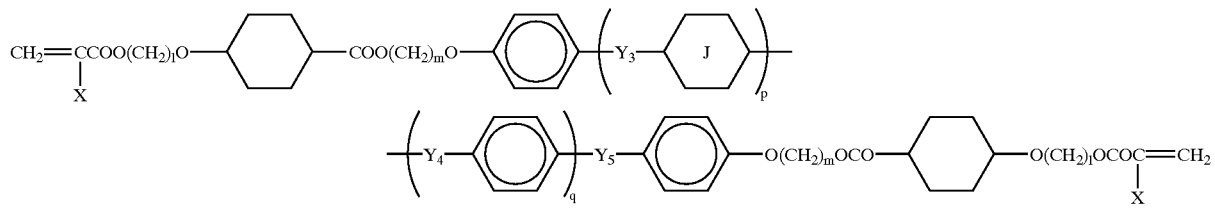

(wherein $X^1$ and $X^2$ each represent a hydrogen atom or a methyl group, l represents an integer from 1 to 20, m and n each represent, independently, an integer from 3 to 16, and o represents an integer from 1 to 20. Furthermore, each of the 1,4-phenylene groups may be independently subject to substitution with one or more substitution groups selected from the group consisting of cyano groups, halogen atoms, and alkyl groups, alkoxy groups and alkanoyl groups of 1 to 7 carbon atoms.).

The preferred polymerizable liquid crystal compounds represented by the aforementioned general formulae (VI), (VII) and (XXXV) are shown in Table 1, Table 2 and Table 3 below.

TABLE 1

| No. | X | $X^1$ | $X^2$ | m | $Y^3$ | $Y^4$ | q | l | n | p |
|---|---|---|---|---|---|---|---|---|---|---|
| 1 | H | H | H | 6 | — | OCO | 3 | 3 | 3 | 1 |
| 2 | H | H | H | 6 | — | OCO | 6 | 6 | 6 | 1 |
| 3 | $CH_3$ | $CH_3$ | $CH_3$ | 6 | — | OCO | 3 | 3 | 3 | 1 |
| 4 | $CH_3$ | $CH_3$ | $CH_3$ | 6 | — | OCO | 6 | 6 | 3 | 1 |
| 5 | H | H | H | 3 | — | OCO | 3 | 3 | 3 | 1 |
| 6 | H | H | H | 3 | — | OCO | 6 | 6 | 6 | 1 |
| 7 | H | H | H | 3 | — | OCO | 6 | 6 | 6 | 0 |
| 8 | H | H | H | 3 | — | OCO | 3 | 3 | 3 | 0 |

The No. 1 to 8 shown in Table 1 represent structures and numbers associated with the general formulae (VI), (VII) and (XXXV).

TABLE 2

| No. | X | $X^1$ | $X^2$ | m | $Y^3$ | $Y^4$ | q | l | n | p |
|---|---|---|---|---|---|---|---|---|---|---|
| 9 | H | H | H | 6 | OCO | — | 3 | 3 | 3 | 1 |
| 10 | H | H | H | 6 | OCO | — | 6 | 6 | 6 | 1 |
| 11 | $CH_3$ | $CH_3$ | $CH_3$ | 6 | OCO | — | 3 | 3 | 3 | 1 |
| 12 | $CH_3$ | $CH_3$ | $CH_3$ | 6 | OCO | — | 6 | 6 | 3 | 1 |
| 13 | H | H | H | 3 | OCO | — | 3 | 3 | 3 | 1 |
| 14 | H | H | H | 3 | OCO | — | 6 | 6 | 6 | 1 |
| 15 | $CH_3$ | $CH_3$ | $CH_3$ | 3 | OCO | — | 6 | 6 | 6 | 1 |
| 16 | $CH_3$ | $CH_3$ | $CH_3$ | 3 | OCO | — | 3 | 3 | 3 | 1 |

The No. 9 to 16 shown in Table 2 represent structures and numbers associated with the general formulae (VI), (VII) and (XXXV).

TABLE 3

| No. | X | $X^1$ | $X^2$ | m | $Y^3$ | $Y^4$ | q | L | n | P |
|---|---|---|---|---|---|---|---|---|---|---|
| 17 | H | H | H | 6 | —C≡C— | — | 3 | 3 | 3 | 1 |
| 18 | H | H | H | 6 | —C≡C— | — | 6 | 6 | 6 | 1 |
| 19 | $CH_3$ | $CH_3$ | $CH_3$ | 6 | —C≡C— | — | 3 | 3 | 3 | 1 |
| 20 | $CH_3$ | $CH_3$ | $CH_3$ | 6 | —C≡C— | — | 6 | 6 | 3 | 1 |
| 21 | H | H | H | 3 | —C≡C— | — | 3 | 3 | 3 | 1 |
| 22 | H | H | H | 3 | —C≡C— | — | 6 | 6 | 6 | 1 |
| 23 | $CH_3$ | $CH_3$ | $CH_3$ | 3 | —C≡C— | — | 6 | 6 | 6 | 1 |
| 24 | $CH_3$ | $CH_3$ | $CH_3$ | 3 | —C≡C— | — | 3 | 3 | 3 | 1 |

The No. 17 to 24 shown in Table 3 represent structures and numbers associated with the general formulae (VI), (VII) and (XXXV).

The preferred polymerizable liquid crystal compounds represented by the aforementioned general formulae (VIII), (IX) and (X) are shown in Table 4, Table 5 and Table 6 below.

TABLE 4

| No. | X | $X^1$ | $X^2$ | m | $Y^3$ | $Y^4$ | $Y^5$ | q | l | n | o | p |
|---|---|---|---|---|---|---|---|---|---|---|---|---|
| 25 | H | H | H | 6 | — | OCO | — | 1 | 3 | 3 | 3 | 1 |
| 26 | H | H | H | 6 | — | OCO | — | 1 | 6 | 6 | 6 | 1 |
| 27 | $CH_3$ | $CH_3$ | $CH_3$ | 6 | — | OCO | — | 1 | 3 | 3 | 3 | 1 |
| 28 | $CH_3$ | $CH_3$ | $CH_3$ | 6 | — | OCO | — | 1 | 6 | 6 | 6 | 1 |
| 29 | H | H | H | 3 | — | OCO | — | 1 | 3 | 3 | 3 | 1 |
| 30 | H | H | H | 3 | — | OCO | — | 1 | 6 | 6 | 6 | 1 |
| 31 | $CH_3$ | $CH_3$ | $CH_3$ | 3 | — | OCO | — | 1 | 6 | 6 | 6 | 1 |
| 32 | $CH_3$ | $CH_3$ | $CH_3$ | 3 | — | OCO | — | 1 | 3 | 3 | 3 | 1 |

The No. 25 to 32 shown in Table 4 represent structures and numbers associated with the general formulae (VIII), (IX) and (X).

TABLE 5

| No. | X | $X^1$ | $X^2$ | m | $Y^3$ | $Y^4$ | $Y^5$ | q | l | n | o | p |
|---|---|---|---|---|---|---|---|---|---|---|---|---|
| 33 | H | H | H | 6 | OCO | — | OCO | 1 | 3 | 3 | 3 | 1 |
| 34 | H | H | H | 6 | OCO | — | OCO | 1 | 6 | 6 | 6 | 1 |

TABLE 5-continued

| No. | X | $X^1$ | $X^2$ | m | $Y^3$ | $Y^4$ | $Y^5$ | q | l | n | o | p |
|---|---|---|---|---|---|---|---|---|---|---|---|---|
| 35 | $CH_3$ | $CH_3$ | $CH_3$ | 6 | OCO | — | OCO | 1 | 3 | 3 | 3 | 1 |
| 36 | $CH_3$ | $CH_3$ | $CH_3$ | 6 | OCO | — | OCO | 1 | 6 | 6 | 6 | 1 |
| 37 | H | H | H | 3 | OCO | — | OCO | 1 | 3 | 3 | 3 | 1 |
| 38 | H | H | H | 3 | OCO | — | OCO | 1 | 6 | 6 | 6 | 1 |
| 39 | $CH_3$ | $CH_3$ | $CH_3$ | 3 | OCO | — | OCO | 1 | 6 | 6 | 6 | 1 |
| 40 | $CH_3$ | $CH_3$ | $CH_3$ | 3 | OCO | — | OCO | 1 | 3 | 3 | 3 | 1 |

The No. 33 to 40 shown in Table 5 represent structures and numbers associated with the general formulae (VIII), (IX) and (X).

TABLE 6

| No. | X | $X^1$ | $X^2$ | m | $Y^3$ | $Y^4$ | $Y^5$ | q | l | n | o | p |
|---|---|---|---|---|---|---|---|---|---|---|---|---|
| 41 | H | H | H | 6 | —C≡C— | — | —C≡C— | 1 | 3 | 3 | 3 | 1 |
| 42 | H | H | H | 6 | —C≡C— | — | —C≡C— | 1 | 6 | 6 | 6 | 1 |
| 43 | $CH_3$ | $CH_3$ | $CH_3$ | 6 | —C≡C— | — | —C≡C— | 1 | 3 | 3 | 3 | 1 |
| 44 | $CH_3$ | $CH_3$ | $CH_3$ | 6 | —C≡C— | — | —C≡C— | 1 | 6 | 6 | 6 | 1 |
| 45 | H | H | H | 3 | —C≡C— | — | —C≡C— | 1 | 3 | 3 | 3 | 1 |
| 46 | H | H | H | 3 | —C≡C— | — | —C≡C— | 1 | 6 | 6 | 6 | 1 |
| 47 | $CH_3$ | $CH_3$ | $CH_3$ | 3 | —C≡C— | — | —C≡C— | 1 | 6 | 6 | 6 | 1 |
| 48 | $CH_3$ | $CH_3$ | $CH_3$ | 3 | —C≡C— | — | —C≡C— | 1 | 3 | 3 | 3 | 1 |

The No. 41 to 48 shown in Table 6 represent structures and numbers associated with the general formulae (VIII), (IX) and (X).

(Meth)acrylate compounds were mentioned previously as preferred compounds for the present invention, and compounds with an epoxy group as a reactive group are also preferred. Specific examples of this type of compound are those represented by the general formulae (XI) and (XII) shown below.

(In these formulae, $Y^3$ represents a linkage group selected from the group consisting of a single bond, —OC(=O)—, —C(=O)O—, —C≡C—, and —CH$_2$CH$_2$—, q represents an integer from 1 to 20, m represents an integer from 2 to 15, and p represents either of the integers 0 or 1. Furthermore, each of the 1,4-phenylene groups may be subject to substitution with one or more substitution groups selected from the group consisting of cyano groups, halogen atoms, and alkyl groups, alkoxy groups and alkanoyl groups of 1 to 7 carbon atoms.)

(Meth)acrylate compounds were described previously as preferred compounds for the present invention, and compounds with a vinyloxy group as a reactive group are also preferred. Specific examples of this type of compound are

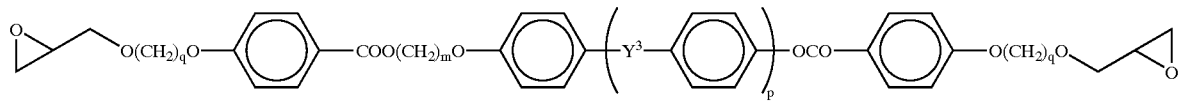

(XI)

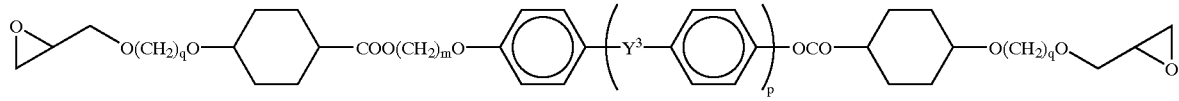

(XII)

those represented by the general formulae (XIII) and (XIV) shown below.

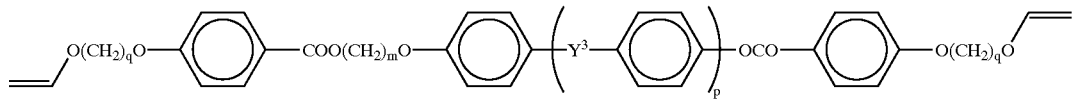

(XIII)

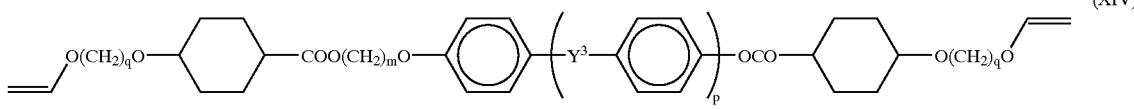

(XIV)

(In these formulae, $Y^3$ represents a linkage group selected from the group consisting of a single bond, —OC(=O)—, —C(=O)O—, —C≡C—, and —CH$_2$CH$_2$—, q represents an integer from 1 to 20, m represents an integer from 2 to 15, and p represents either of the integers 0 or 1. Furthermore, each of the 1,4-phenylene groups may be subject to substitution with one or more substitution groups selected from the group consisting of cyano groups, halogen atoms, and alkyl groups, alkoxy groups and alkanoyl groups of 1 to 7 carbon atoms.)

The desirable polymerizable liquid crystal compounds represented by the aforementioned general formulae (XIII) and (XIV) are shown in Table 7 and Table 8 below.

TABLE 7

| No. | m | $Y^3$ | q | p |
|---|---|---|---|---|
| 49 | 6 | — | 3 | 1 |
| 50 | 6 | — | 6 | 1 |
| 51 | 3 | — | 3 | 1 |
| 52 | 3 | — | 6 | 1 |
| 53 | 6 | OCO | 3 | 1 |
| 54 | 6 | OCO | 6 | 1 |
| 55 | 3 | OCO | 6 | 1 |
| 56 | 3 | OCO | 3 | 1 |

The No. 49 to 56 shown in Table 7 represent the structures and numbers associated with the general formulae (XII), (XII), (XIII) and (XIV).

TABLE 8

| No. | m | $Y^3$ | q | p |
|---|---|---|---|---|
| 57 | 6 | —C≡C— | 3 | 1 |
| 58 | 6 | —C≡C— | 6 | 1 |
| 59 | 3 | —C≡C— | 3 | 1 |
| 60 | 3 | —C≡C— | 6 | 1 |
| 61 | 6 | — | 3 | 0 |
| 62 | 6 | — | 6 | 0 |
| 63 | 3 | — | 6 | 0 |
| 64 | 3 | — | 3 | 0 |

The No. 57 to 64 shown in Table 8 represent structures and numbers associated with the general formulae (XI), (XII), (XIII) and (XIV).

As above is a description of preferred examples of compounds of the present invention. In these compounds, the cyclohexane rings should preferably be trans-cyclohexane rings.

The compounds represented by the general formula (VI) can be synthesized by the following method, for example.

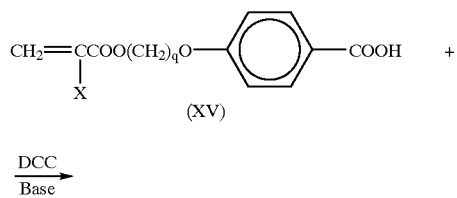

(XV)

DCC / Base →

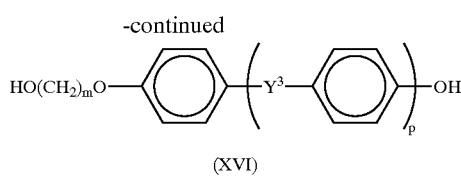

(XVI)

(In the formulae shown, X, $Y^3$, q, m and p each represent the same content as described for the general formula (VI). DCC represents dicyclohexyl carbodiimide.)

In other words, by carrying out an esterification reaction of an alcohol derivative represented by the general formula (XVI) and two equivalents of the carboxylic acid derivative represented by the general formula (XV), by using a condensing agent such as DCC (dicyclohexyl carbodiimide), the target compound represented by the general formula (VI) can be synthesized.

The carboxylic acid derivative represented by the general formula (XV) which functions as a synthetic raw material for the compound represented by the general formula (VI) can be synthesized by the following method, for example.

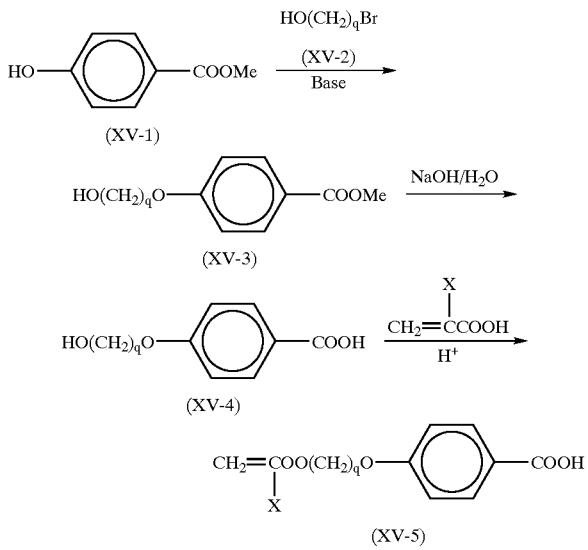

(In the formulae shown, X and q each represent the same content as described for the general formula (VI). Furthermore, Me represents a methyl group.)

In other words, methyl 4-hydroxybenzoate represented by the formula (XV-1) and the alcohol derivative with a bromide group represented by the general formula (XV-2) are reacted together to form the compound represented by the general formula (XV-3), and subsequent hydrolysis of the methyl ester yields a compound represented by the general formula (XV-4). By reacting this compound with (meth) acrylic acid in the presence of an acid catalyst, while removing water, the target carboxylic acid derivative represented by the general formula (XV-5) can be prepared.

The carboxylic acid derivative represented by the general formula (XV), which functions as a synthetic raw material for the compound represented by the general formula (VI), wherein a hydrogen atom of the aromatic ring is also substituted with a fluorine atom (namely, the compound represented by the general formula (XV-9)) can be synthesized by the following method, for example.

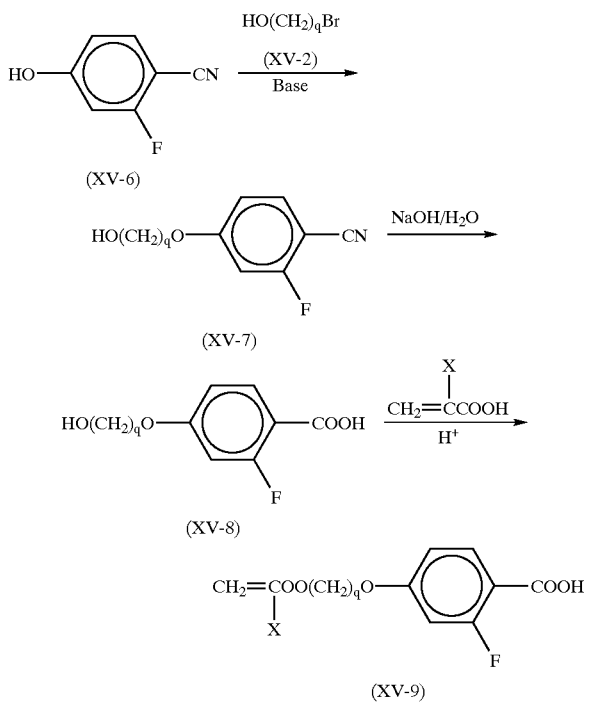

(In the formulae shown, X and q each represent the same content as described for the general formula (VI).)

In other words, 2-fluoro-4-hydroxybenzonitrile represented by the formula (XV-6) and the alcohol derivative with a bromide group represented by the general formula (XV-2) are reacted together to form the compound represented by the general formula (XV-7), and subsequent hydrolysis of the cyano group yields a compound represented by the general formula (XV-8). By reacting this compound with (meth)acrylic acid in the presence of an acid catalyst, while removing water, the target carboxylic acid derivative represented by the general formula (XV-9) can be prepared.

The carboxylic acid derivative represented by the general formula (XV), which functions as a synthetic raw material for the compound represented by the general formula (VI), wherein a hydrogen atom of the aromatic ring is also substituted with a methoxy group (namely, the compound represented by the general formula (XV-13)) can be synthesized by the following method, for example.

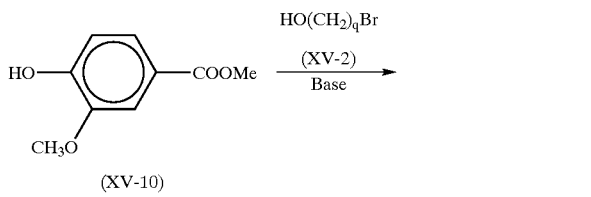

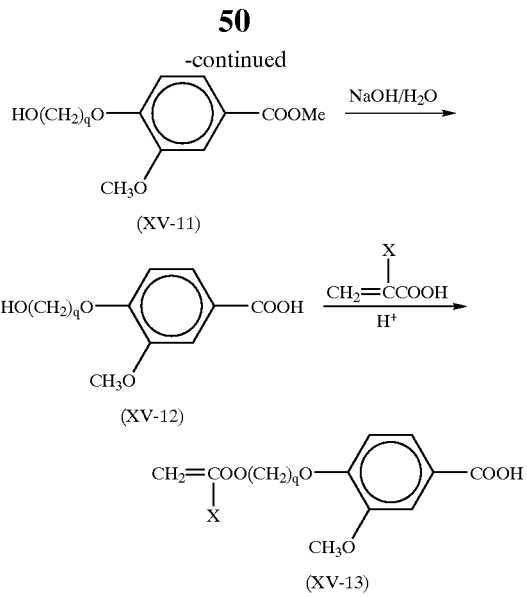

(In the formulae shown, X and q each represent the same content as described for the general formula (VI). Furthermore, Me represents a methyl group.)

In other words, methyl vanillate represented by the formula (XV-10) and the alcohol derivative with a bromide group represented by the general formula (XV-2) are reacted together to form the compound represented by the general formula (XV-11), and subsequent hydrolysis of the methyl ester yields a compound represented by the general formula (XV-12). By reacting this compound with (meth)acrylic acid in the presence of an acid catalyst, while removing water, the target carboxylic acid derivative represented by the general formula (XV-13) can be prepared.

The carboxylic acid derivative represented by the general formula (XV), which functions as a synthetic raw material for the compound represented by the general formula (VI), wherein a hydrogen atom of the aromatic ring is also substituted with a methyl group (namely, the compound represented by the general formula (XV-17)) can be synthesized by the following method, for example.

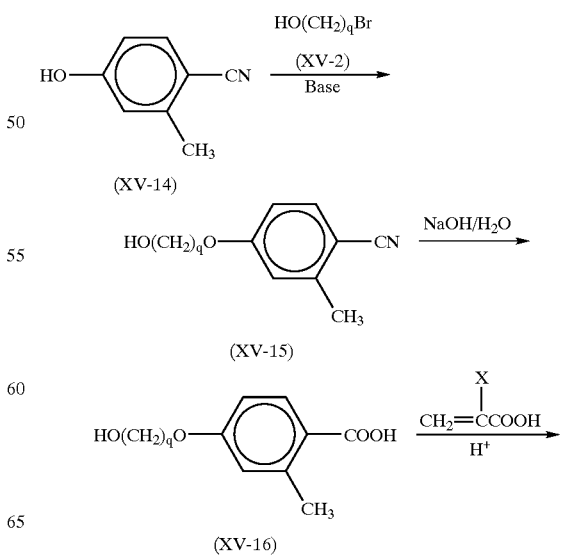

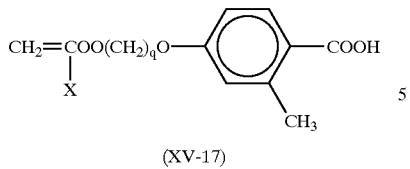

(XV-17)

(In the formulae shown, X and q each represent the same content as described for the general formula (VI).)

In other words, 4-hydroxy-2-methylbenzonitrile represented by the formula (XV-14) and the alcohol derivative with a bromide group represented by the general formula (XV-2) are reacted together to form the compound represented by the general formula (XV-15), and subsequent hydrolysis of the cyano group yields a compound represented by the general formula (XV-16). By reacting this compound with (meth)acrylic acid in the presence of an acid catalyst, while removing water, the target carboxylic acid derivative represented by the general formula (XV-17) can be prepared.

The alcohol derivative represented by the general formula (XVI), which functions as a synthetic raw material for the compound represented by the general formula (VI), wherein $Y^3$ is a single bond and p is the number 1 (namely, the compound represented by the general formula (XVI-3)) can be synthesized by the following method, for example.

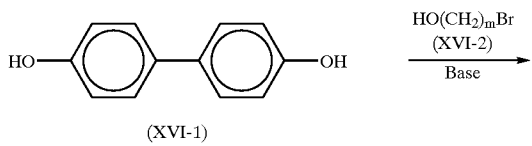

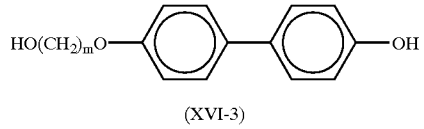

(In the formulae shown, m represents the same content as described for the general formula (VI).)

In other words, by reacting 4,4'-biphenol represented by the formula (XVI-1) with the alcohol derivative with a bromide group represented by the general formula (XVI-2), the target alcohol derivative represented by the general formula (XVI-3) can be prepared.

The alcohol derivative represented by the general formula (XVI), which functions as a synthetic raw material for the compound represented by the general formula (XI), wherein $Y^3$ is a single bond, p is the number 1, and a hydrogen atom of an aromatic ring is substituted with a fluoro group (namely, the compound represented by the general formula (XVI-11)) can be synthesized by the following method, for example.

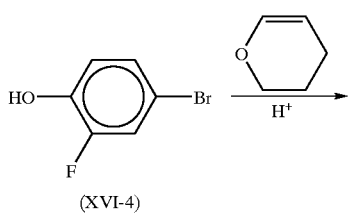

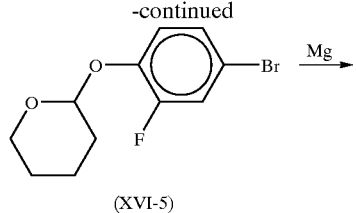

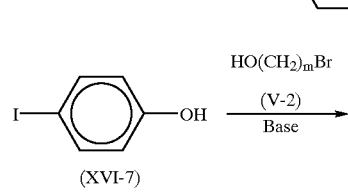

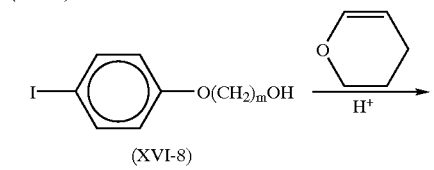

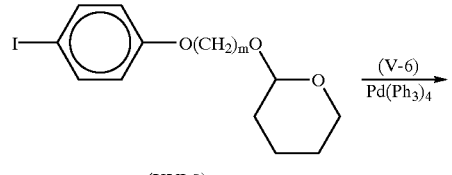

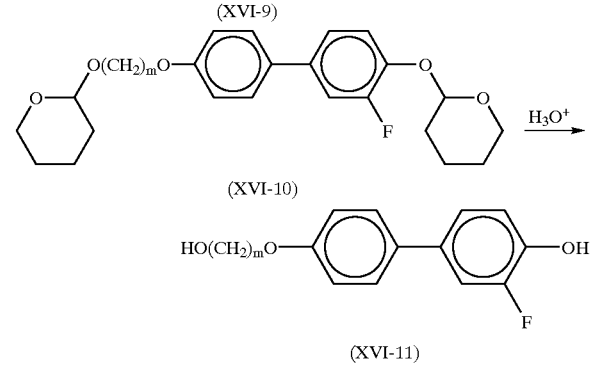

(In the formulae shown, m represents the same content as described for the general formula (VI).)

In other words, by protecting the hydroxyl group of 4-bromo-2-fluorophenol represented by the formula (XVI-4) with a tetrapyranyl ether, and subsequently reacting with magnesiun, the Grignard reagent represented by formula (XVI-6) is prepared. Next, following reaction of 4-iodophenol represented by the formula (XVI-7) with the alcohol derivative with a bromide group represented by the general formula (XVI-2), the terminal hydroxyl group is protected as a tetrapyranyl ether group, thereby yielding the compound represented by the general formula (XVI-9). The compound represented by the general formula (XVI-9) and the Grignard reagent represented by the formula (XVI-6) are subjected to a cross coupling reaction in the presence of a palladium catalyst to yield a compound represented by the general formula (XVI-10), and by subsequently carrying out a deprotection reaction, the target alcohol derivative represented by the general formula (XVI-11) can be prepared.

The alcohol derivative represented by the general formula (XVI), which functions as a synthetic raw material for the compound represented by the general formula (VI), wherein $Y^3$ is a single bond, p is the number 1, and a hydrogen atom of an aromatic ring is substituted with a fluoro group (namely, the compound represented by the general formula (XVI-17)) can be synthesized by the following method, for example.

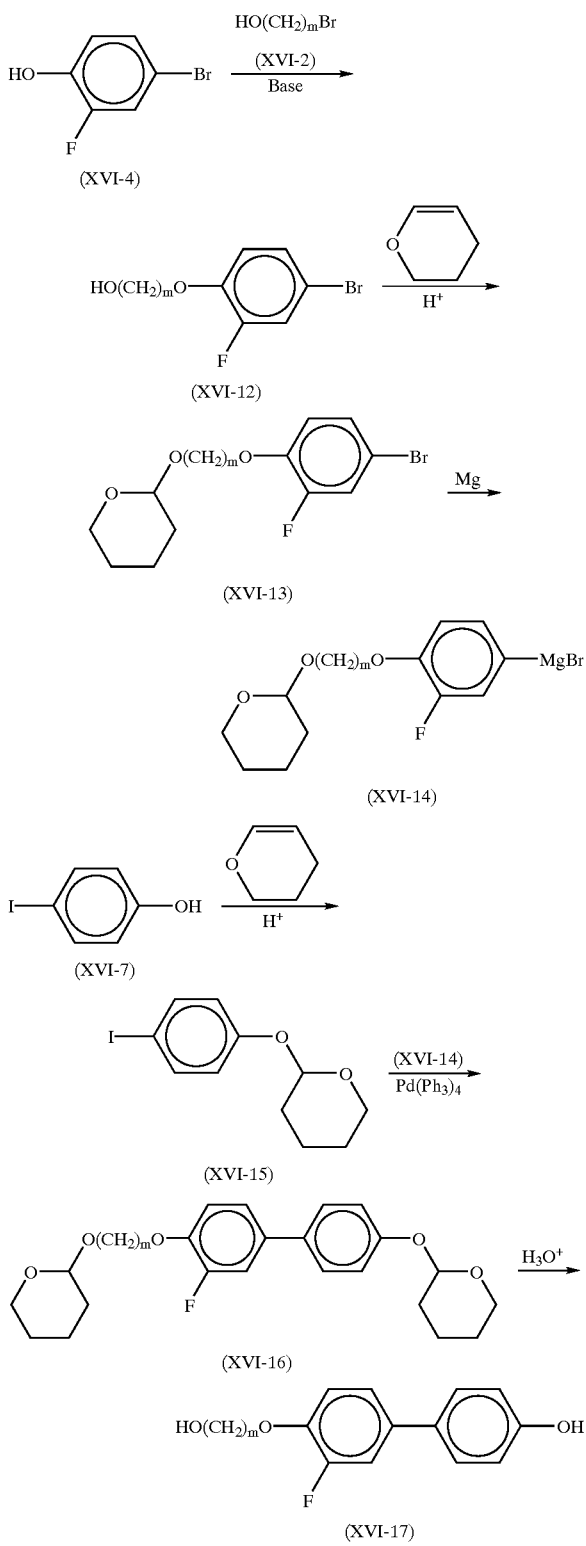

(In the formulae shown, m represents the same content as described for the general formula (VI).)

In other words, by reacting 4-bromo-2-fluorophenol represented by the formula (XVI-4) with the alcohol derivative with a bromo group represented by the general formula (XVI-2), subsequently protecting the terminal hydroxyl group as a tetrapyranyl ether, and then further reacting with magnesium, the Grignard reagent represented by the general formula (XVI-14) is prepared. Next, the hydroxyl group of 4-iodophenol represented by the formula (XVI-7) is protected as a tetrapyranyl ether group, thereby yielding the compound represented by the formula (XVI-15). The compound represented by the formula (XVI-15) and the Grignard reagent represented by the general formula (XVI-14) are then subjected to a cross coupling reaction in the presence of a palladium catalyst to yield a compound represented by the general formula (XVI-16), and by subsequently carrying out a deprotection reaction, the target alcohol derivative represented by the general formula (XVI-17) can be prepared.

The alcohol derivative represented by the general formula (XVI), which functions as a synthetic raw material for the compound represented by the general formula (VI), wherein $Y^3$ is a single bond, p is the number 1, and a hydrogen atom of an aromatic ring is substituted with a fluoro group (namely, the compound represented by the general formula (XVI-24)) can be synthesized by the following method, for example.

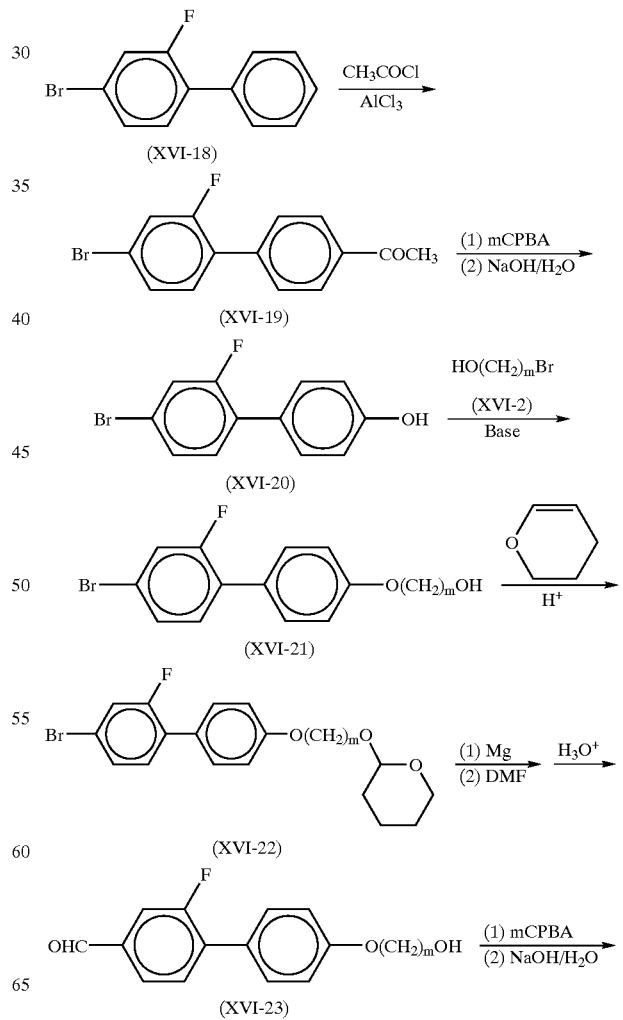

-continued

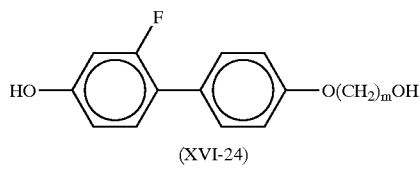

(XVI-24)

(In the formulae shown, m represents the same content as described for the general formula (VI).)

In other words, a Friedel Crafts reaction is used to introduce an acetyl group into 4-bromo-2-fluoro-1-phenylbenzene represented by the formula (XVI-18), thereby producing the compound represented by the formula (XVI-19). The acetyl group of the compound represented by the general formula (XVI-19) is then oxidized using m-chloro perbenzoic acid to form an ester group, and is subsequently hydrolyzed to yield the compound represented by the formula (XVI-20). The compound represented by the formula (XVI-20) is then reacted with the alcohol derivative with a bromo group represented by the general formula (XVI-2), and by subsequently protecting the hydroxyl group as a tetrapyranyl ether, the compound represented by the general formula (XVI-22) is obtained. The compound represented by the general formula (XVI-22) is reacted with magnesium to form a Grignard reagent, subsequently reacted with dimethyl formamide, and then hydrolyzed to produce the compound represented by the general formula (XVI-23). The aldehyde group of the compound represented by the general formula (XVI-23) is then oxidized, and subsequent hydrolysis enables the preparation of the target alcohol derivative represented by the general formula (XVI-24).

As above are described synthesis examples for compounds in which one of the hydrogen atoms of a 1,4-phenylene group is substituted with a fluorine atom, but two or more hydrogen atoms may also be substituted, and compounds in which methyl groups or methoxy groups are substituted, either together with, or instead of, the fluorine atoms, can also be synthesized by appropriate application of the above methods.

The alcohol derivative represented by the general formula (XVI), which functions as a synthetic raw material for the compound represented by the general formula (VI), wherein $Y^3$ is a —C(=O)O— linkage and p is the number 1 (namely, the compound represented by the general formula (XVI-30)) can be synthesized by the following method, for example.

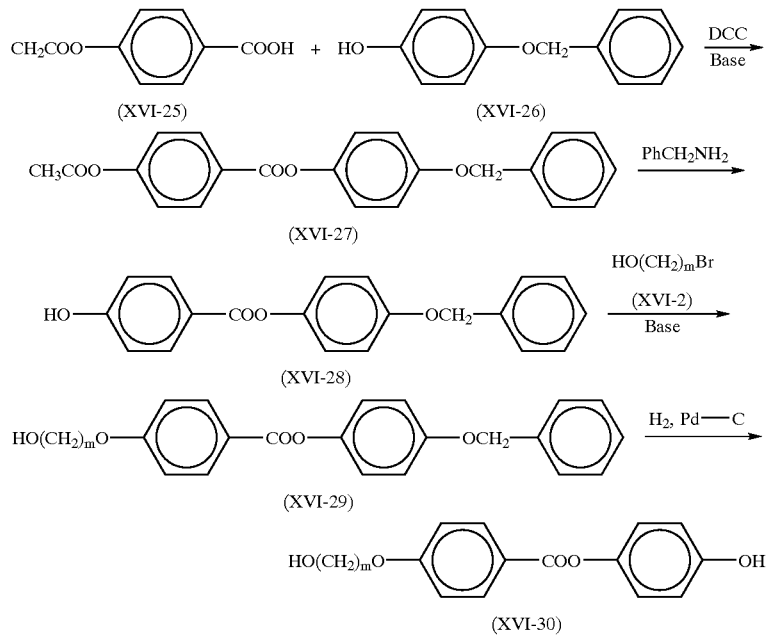

(In the formulae shown, m represents the same content as described for the general formula (VI). Furthermore, DCC represents dicyclohexyl carbodiimide, "Base" represents a base, and Ph represents a phenyl group.)

In other words, 4-acetoxybenzoic acid represented by the formula (XVI-25) and 4-benzyloxyphenol represented by the formula (XVI-26) are reacted in the presence of a condensing agent such as dicyclohexyl carbodiimide to produce the compound represented by the formula (XVI-27). This compound represented by the formula (XVI-27) is then reacted with benzyl amine to produce the compound represented by the formula (XVI-28). The compound represented by the formula (XVI-28) is then reacted with the alcohol derivative with a bromide group represented by the general formula (XVI-2), and by subsequently performing a reduction elimination of the benzyl group, the target alcohol derivative represented by the general formula (XVI-30) can be prepared.

The alcohol derivative represented by the general formula (XVI), which functions as a synthetic raw material for the compound represented by the general formula (VI), wherein $Y^3$ is a —C≡C— linkage, p is the number 1, and a hydrogen atom of an aromatic ring is substituted with a fluoro group (namely, the compound represented by the general formula (XVI-36)) can be synthesized by the following method, for example.

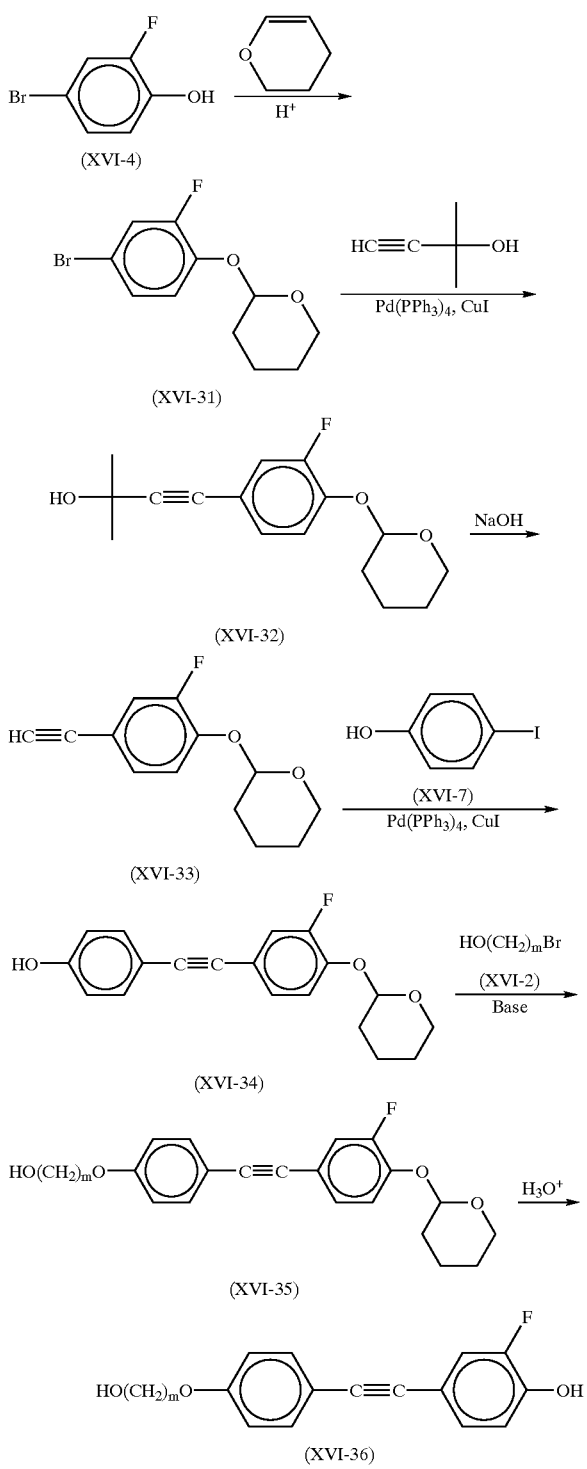

(In the formulae shown, m represents the same content as described for the general formula (VI). Furthermore, "Base" represents a base, and Ph represents a phenyl group.)

In other words, following protection of the hydroxyl group of 4-bromo-2-fluorophenol represented by the formula (XVI-4) with a tetrapyranyl ether, and subsequent reaction with 2-methyl-3-butyn-2-ol, and elimination of the t-butyl alcohol group, the acetylene derivative represented by the general formula (XVI-33) is obtained. This acetylene derivative represented by the general formula (XVI-33) and 4-iodophenol represented by the formula (XVI-7) are then subjected to a coupling reaction in the presence of a palladium catalyst to yield a compound represented by the formula (XVI-34). By reacting this compound represented by the formula (XVI-34) with the alcohol derivative with a bromo group represented by the general formula (XVI-2), and subsequently carrying out a deprotection reaction, the target alcohol derivative represented by the general formula (XVI-36) can be prepared.

The alcohol derivative represented by the general formula (XVI), which functions as a synthetic raw material for the compound represented by the general formula (VI), wherein $Y^3$ is a —$CH_2CH_2$— linkage, p is the number 1, and a hydrogen atom of an aromatic ring is substituted with a fluoro group (namely, the compound represented by the general formula (XVI-37)) can be synthesized by the following method, for example.

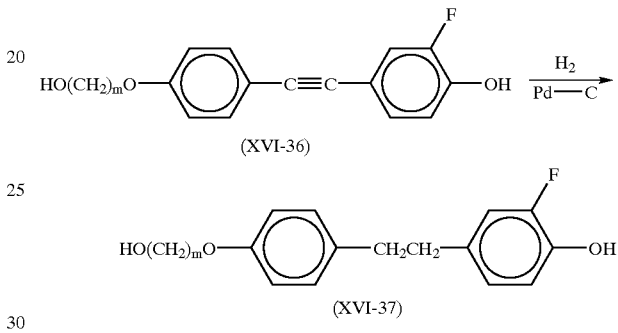

(In the formulae shown, m represents the same content as described for the general formula (VI).)

By reducing the triple bond of the alcohol derivative represented by the general formula (XVI-36), the alcohol derivative represented by the general formula (XVI-37) can be prepared.

The alcohol derivative represented by the general formula (XVI), which functions as a synthetic raw material for the compound represented by the general formula (VI), wherein p is the number 0 (namely, the compound represented by the general formula (XVI-39)) can be synthesized by the following method, for example.

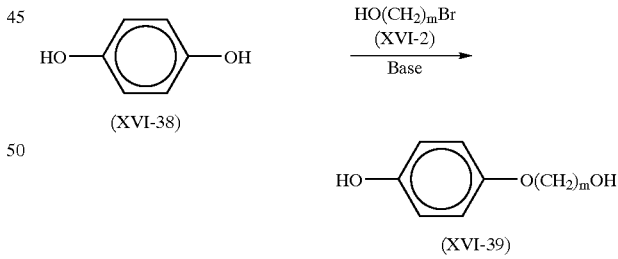

(In the formulae shown, m represents the same content as described for the general formula (VI).)

In other words, by reacting hydroquinone represented by the formula (XVI-38) with the alcohol derivative with a bromo group represented by the general formula (XVI-2), the target alcohol derivative represented by the general formula (XVI-39) can be prepared.

The alcohol derivative represented by the general formula (XVI), which functions as a synthetic raw material for the compound represented by the general formula (VI), wherein p is the number 0, and a hydrogen atom of the aromatic ring is substituted with a fluoro group (namely, the compound represented by the general formula (XVI-41)) can be synthesized by the following method, for example.

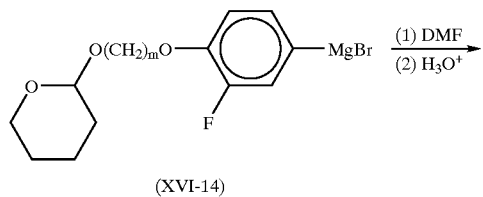

(XVI-14)

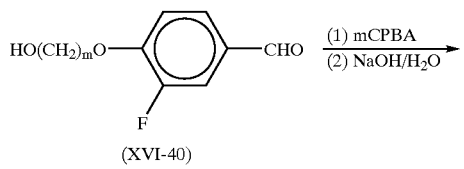

(XVI-40)

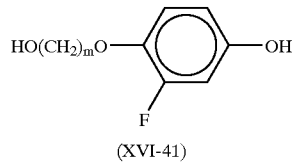

(XVI-41)

(In the formulae shown, m represents the same content as described for the general formula (VI). Furthermore, DMF represents dimethyl formamide, and mCPBA represents meta-chloro perbenzoic acid.)

In other words, by reacting the Grignard reagent represented by the general formula (XVI-14) with dimethyl formamide, and carrying out a subsequent hydrolysis, the aldehyde derivative represented by the general formula (XVI-40) is produced. By oxidizing this aldehyde derivative with peroxy acid and performing a subsequent hydrolysis, the target alcohol derivative represented by the general formula (XVI-41) can be prepared.

As follows is a description of the compound represented by the general formula (VII). The compound represented by the general formula (VII) can be synthesized by the following method, for example.

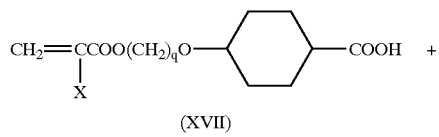

(XVII)

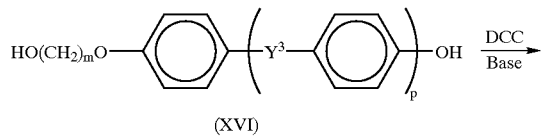

(XVI)

(In the formulae shown, X, $Y^3$, q, m and p represent the same content as described for the general formula (VII). Furthermore, DCC represents dicyclohcxyl carbodiimide and "Base" represents a base.)

In other words, by carrying out an esterification reaction of an alcohol derivative represented by the general formula (XVI) and two equivalents of the carboxylic acid derivative represented by the general formula (XVII) in the presence of a condensing agent such as dicyclohexyl carbodiimide, the target compound represented by the general formula (VII) can be synthesized.

The carboxylic acid derivative represented by the general formula (XVII), which functions as a synthetic raw material for the compound represented by the general formula (VII), can be synthesized by the following method, for example.

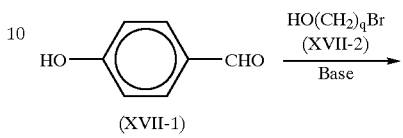

(XVII-1)

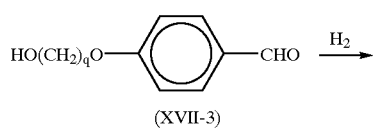

(XVII-3)

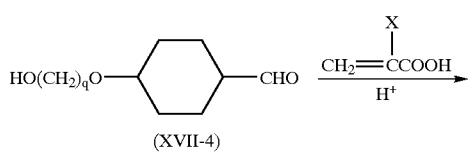

(XVII-4)

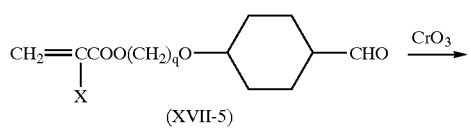

(XVII-5)

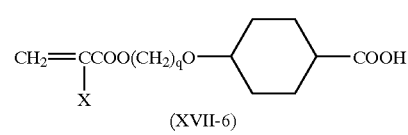

(XVII-6)

(In the formulae shown, q and X represent the same content as described for the general formula (VII).)

In other words, 4-hydroxybenzaldehyde represented by the formula (XVII-1) is reacted with an alcohol derivative with a bromo group represented by the general formula (XVII-2), and a subsequent ring reduction yields the compound represented by the general formula (XVII-4). By reacting this compound represented by the general formula (XVII-4) with (meth)acrylic acid in the presence of an acid catalyst, while removing water, and subsequently oxidizing the aldehyde group, the target carboxylic acid derivative represented by the general formula (XVII-6) can be prepared.

Furthermore, the compounds prepared in accordance with the synthesis examples described above can be utilized as the alcohol derivative represented by the general formula (XVI), which functions as a synthetic raw material for the compound represented by the general formula (VII).

As follows is a description of the compound represented by the general formula (XXXV). The compound represented by the general formula (XXXV) can be synthesized by the following method, for example.

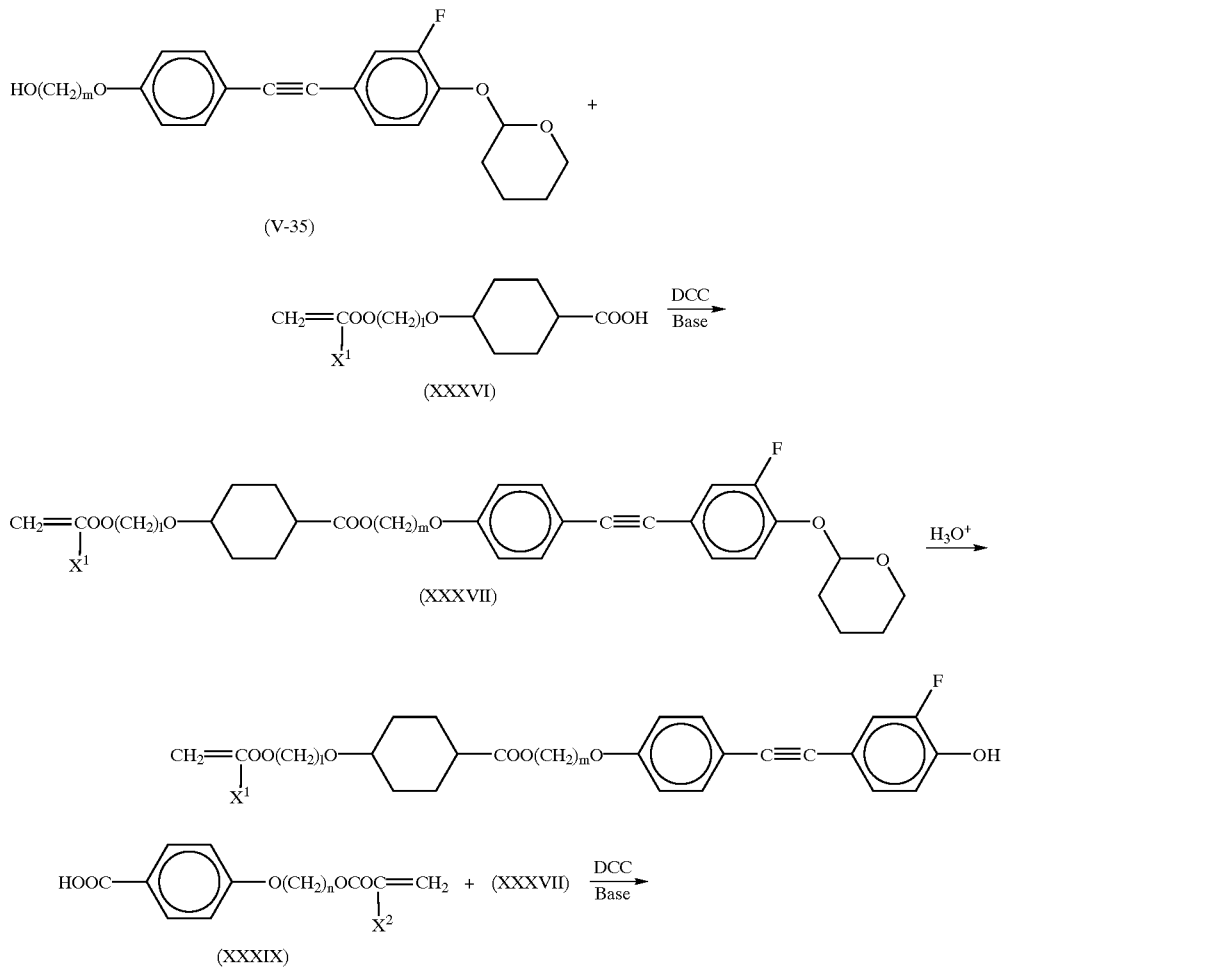

(In the formulae shown, $X^1$, $X^2$, l, m and n each represent the same content as described for the general formula (XXXV). Furthermore, DCC represents dicyclohexyl carbodiimide, and "Base" represents a base.)

In other words, a compound represented by the general formula (XVI-35) and a compound represented by the general formula (XXXVI) are reacted together using a condensing agent such as dicyclohexyl carbodiimide, to yield the compound represented by the general formula (XXXVII). The tetrapyranyl ether protective group of the compound represented by the general formula (XXXVII) is then eliminated, producing the compound represented by the general formula (XXXVIII). By reacting this compound represented by the general formula (XXXVIII) with a compound represented by the general formula (XXXIX) using a condensing agent such as dicyclohexyl carbodiimide, the target compound represented by the general formula (XXXV) can be prepared.

The compound represented by the general formula (XXXVI), which functions as a synthetic raw material for the compound represented by the general formula (XXXV), can be synthesized using the same method as described above for the synthesis of the compound represented by the general formula (XVII), and similarly, the compound represented by the general formula (XXXIX) can be synthesized using the same method as described above for the synthesis of the compound represented by the general formula (XV).

Next is a description of the compound represented by the general formula (VIII). The compound represented by the general formula (VIII) can be synthesized by the following method, for example.

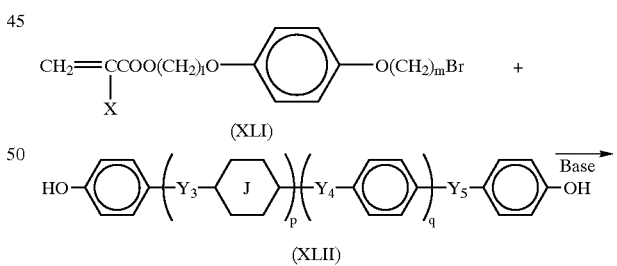

(In the formulae shown, X, $Y^3$, $Y^4$, $Y^5$, p, q, l and m each represent the same content as described for the general formula (VIII). Furthermore, DCC represents dicyclohexyl carbodiimide, and "Base" represents a base.)

In other words, by reacting a compound represented by the general formula (XLVI) and a compound represented by the general formula (XLVII) using a condensing agent such as dicyclohexyl carbodiimide, the target compound represented by the general formula (VIII) can be prepared.

The compound represented by the general formula (XLVI), which functions as a synthetic raw material for the compound represented by the general formula (XLV), can be synthesized by the following method, for example.

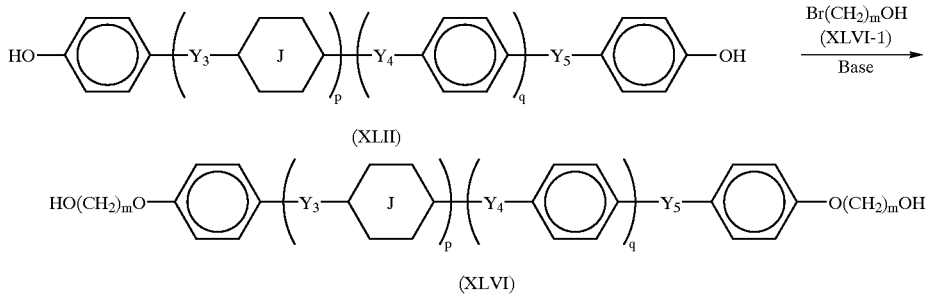

(XLII)

(XLVI)

(In the formulae shown, $Y^3$, $Y^4$, $Y^5$, p, q, l and m each represent the same content as described for the general formula (VIII). Furthermore, "Base" represents a base.)

In other words, by reacting the compound represented by the general formula (XLII) and the compound represented by the formula (XLVI-1), the target compound represented by the general formula (XLVI) can be prepared.

The compound represented by the general formula (XLVII), which functions as a synthetic raw material for the compound represented by the general formula (VIII), can be synthesized by the same method as that described above for the compound represented by the general formula (XV).

Next is a description of the compound represented by the general formula (IX). The compound represented by the general formula (IX) can be synthesized by the following method, for example.

synthesized by the same method as that described above for the compound represented by the general formula (XII').

The polymerizable liquid crystal compounds of the present invention can be used alone to prepare compositions, although compositions may also be prepared by mixing with other known polymerizable liquid crystal compounds. Examples of known polymerizable liquid crystal compounds include those polymerizable liquid crystal compounds which comprise both a backbone which is typically recognizable within this technical field as a liquid crystalline cyclic backbone, and a polymerizable functional group within the same molecule. Liquid crystalline cyclic backbones which comprise at least two or three 6 membered rings are particularly preferred. Examples of suitable polymerizable functional groups include acryloyloxy groups,

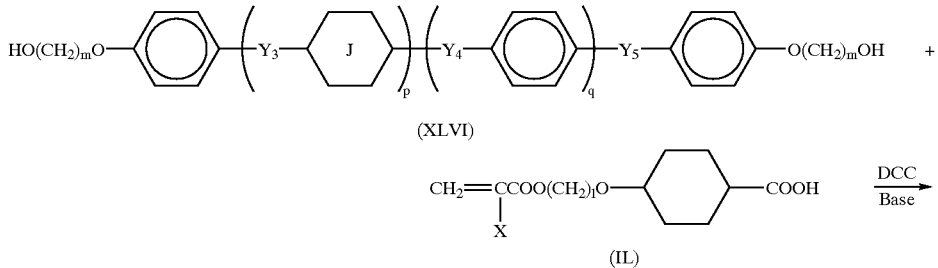

(XLVI)

(IL)

(In the formulae shown, X, $Y^3$, $Y^4$, $Y^5$, p, q, l and m each represent the same content as described for the general formula (IX). Furthermore, DCC represents dicyclohexyl carbodiimide, and "Base" represents a base.)

In other words, by reacting a compound represented by the general formula (XLVI) and a compound represented by the general formula (IL) using a condensing agent such as dicyclohexyl carbodiimide, the target compound represented by the general formula (IX) can be prepared.

The compound represented by the general formula (IL), which functions as a synthetic raw material for the compound represented by the general formula (XLVIII), can be methacryloyloxy groups, epoxy groups, vinyloxy groups, cinnamoyl groups, vinyl groups, ethynyl groups and maleimide groups.

In the case of compounds with a plurality of polymerizable functional groups within one molecule, the polymerizable functional groups may be of different structures. For example, in the case of a compound with two polymerizable functional groups, one functional group could be a methacryloyl group, and the other a vinyl ether group. Examples of this type of polymerizable liquid crystal compound include the compounds represented by the general formulae (LX) and (LXI) shown below, although such liquid crystal compounds are not limited to these compounds alone.

(LX)

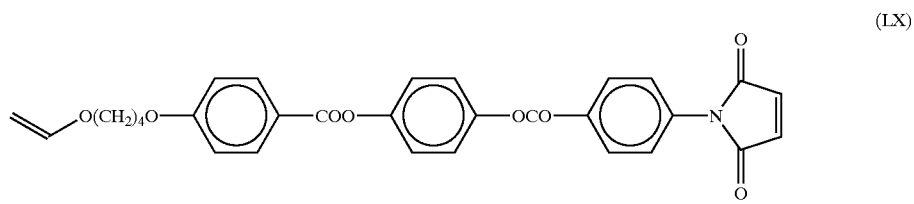

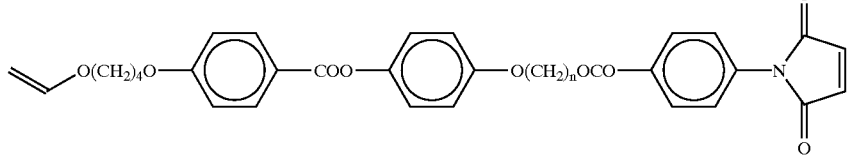
(LXI)

(In the formulae shown, n represents an integer of 6 to 11.)

In those cases where a liquid crystal composition of the present invention is used in the preparation of an optical element, it is preferable that the liquid crystal phase presents at room temperature, typically at 25° C.

A liquid crystal composition of the present invention should be a composition which displays a phase typically recognizable as a liquid crystal phase in this technical field. Amongst such compositions, those which realize a liquid crystal phase which is a nematic phase, a smectic A phase, a (chiral) smectic C phase, or a cholesteric phase are preferred. Furthermore within this group, nematic phases are particularly desirable as they offer superior alignment. Furthermore in those cases where a (chiral) smectic C phase is displayed, liquid crystal compositions which reveal a smectic A phase at a temperature region above the temperature region where the (chiral) smectic C phase is observed, and moreover reveal a nematic phase at a temperature region above the temperature region where the smectic A phase is observed, have a tendency to enable superior alignment, and are consequently preferred.

A liquid crystalline (meth)acrylate represented by the general formula (III) may also be incorporated within a liquid crystal composition of the present invention.

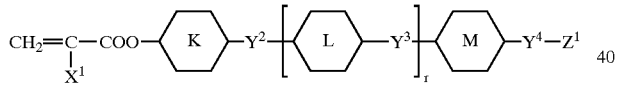

(In the formula shown, $X^1$ represents a hydrogen atom or a methyl group, r represents an integer of 0 or 1, the six membered rings K, L and M each represent, independently, a cyclic structure selected from the group consisting of

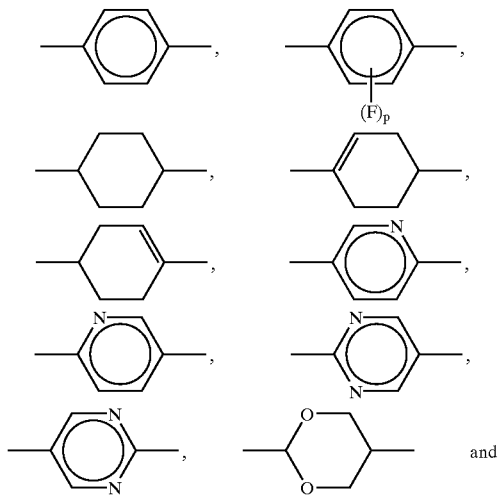

and

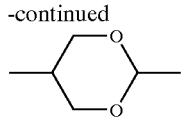

p represents an integer from 1 to 4, $Y^7$ And $Y^8$ each represent, independently, a linkage chain selected from the group consisting of a single bond, —$CH_2CH_2$—, —$CH_2C(CH_3)H$—, —$C(CH_3)HCH_2$—, —$CH_2O$—, —$OCH_2$—, —$CF_2O$—, —$OCF_2$—, —COO—, —OCO—, —C≡C—, —CH=CH—, —CF=CF—, —$(CH_2)_4$—, —$CH_2CH_2CH_2O$—, —$OCH_2CH_2CH_2$—, —CH=CH—$CH_2CH_2$— and —$CH_2CH_2$CH=CH—, $Y^9$ represents a single bond, —O—, —COO— or —OCO—, and $Z^7$ represents a hydrogen atom, a halogen atom, a cyano group, an alkyl group of 1 to 20 carbon atoms, or an alkenyl group of 2 to 20 carbon atoms.)

Of the liquid crystalline (meth)acrylate compounds represented by the general formula (III) which can be incorporated within a liquid crystal composition of the present invention, compounds represented by the general formula (IV)

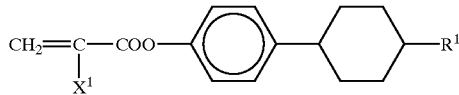

(wherein $X^1$ represents a hydrogen atom or a methyl group, and $R^1$ represents an alkyl group of 1 to 10 carbon atoms), or compounds represented by the general formula (V)

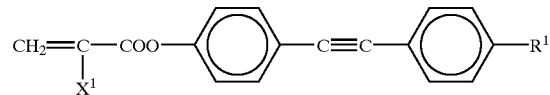

(wherein $X^1$ represents a hydrogen atom or a methyl group, and $R^1$ represents an alkyl group of 1 to 10 carbon atoms) are preferred. The compounds represented by the general formula (IV) and the general formula (V) may be used singularly, or in combinations of two or more compounds. In those cases where compounds are combined, it is preferable that the concentrations of the compound represented by the general formula (IV) and the compound represented by the general formula (V) are equal. However, compounds capable of being used in liquid crystal compositions of the present invention are not limited to the compounds described here.

Specific examples of compounds represented by the general formula (III) include those compounds represented by the formulae (a-1) through (a-25). In each case, the phase transition temperatures for the compounds represented by the formulae (a-1) through (a-25) are shown beneath the structural formulae. (In the formulae, a cyclohexane ring represents a trans-cyclohexane ring. Furthermore, the numbers represent phase transition temperatures, C represents a crystalline phase, N represents a nematic phase, S represents a smectic phase, and I represents an isotropic liquid phase.)
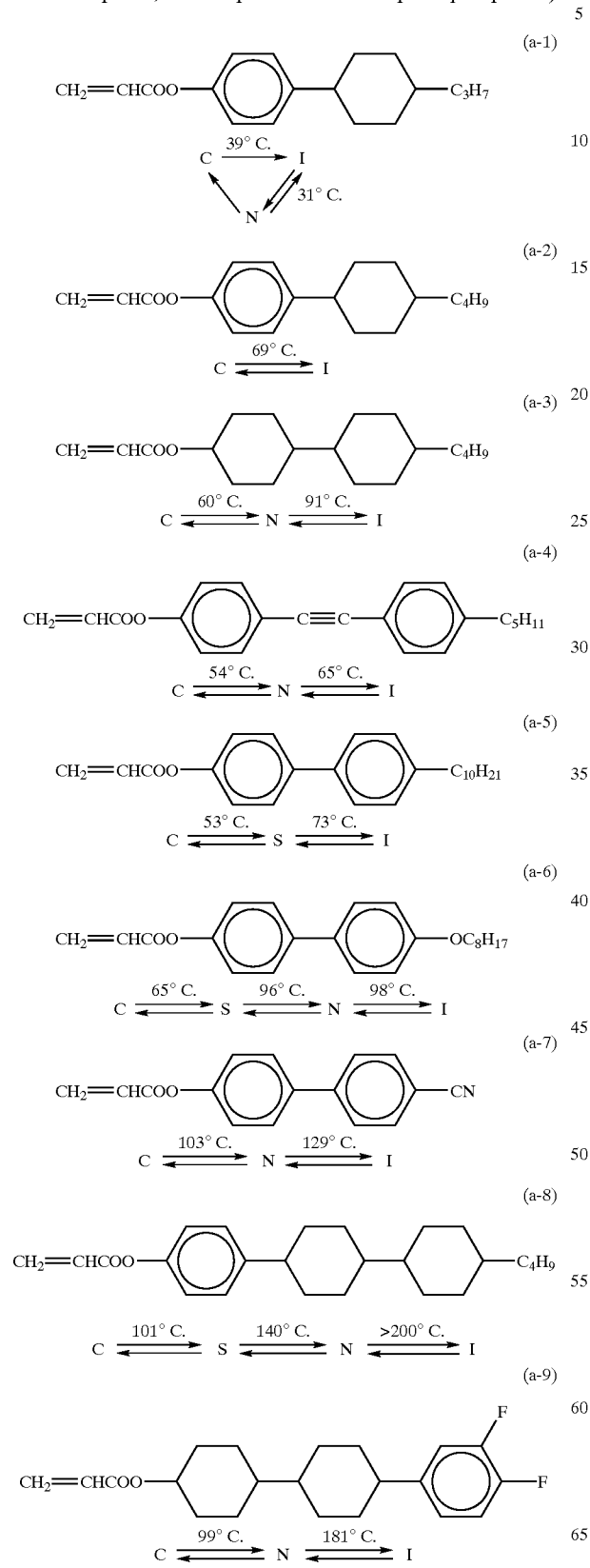
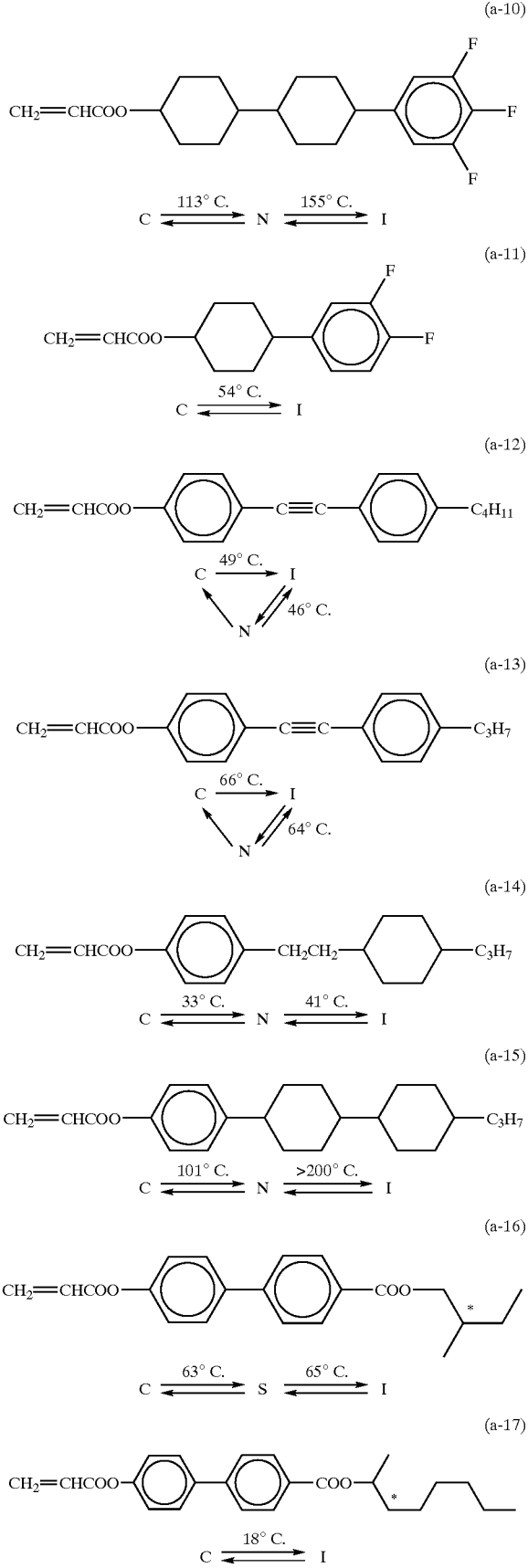

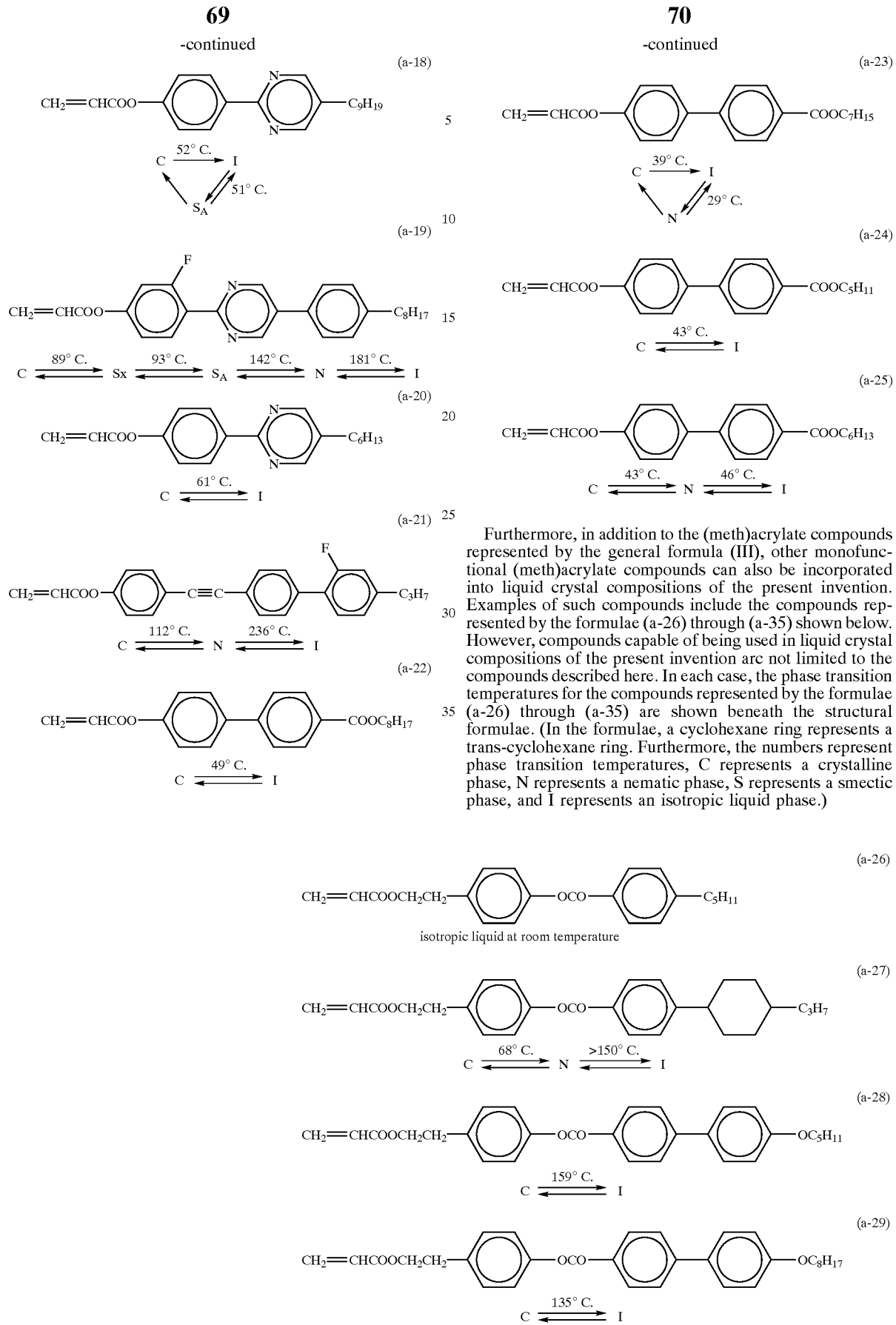

Furthermore, in addition to the (meth)acrylate compounds represented by the general formula (III), other monofunctional (meth)acrylate compounds can also be incorporated into liquid crystal compositions of the present invention. Examples of such compounds include the compounds represented by the formulae (a-26) through (a-35) shown below. However, compounds capable of being used in liquid crystal compositions of the present invention are not limited to the compounds described here. In each case, the phase transition temperatures for the compounds represented by the formulae (a-26) through (a-35) are shown beneath the structural formulae. (In the formulae, a cyclohexane ring represents a trans-cyclohexane ring. Furthermore, the numbers represent phase transition temperatures, C represents a crystalline phase, N represents a nematic phase, S represents a smectic phase, and I represents an isotropic liquid phase.)

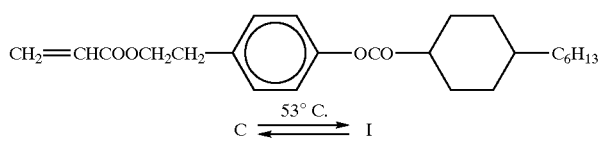
(a-30)

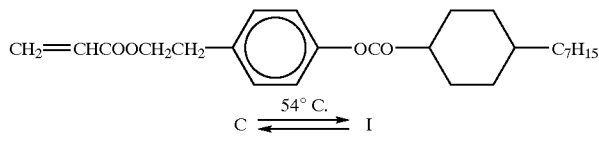
(a-31)

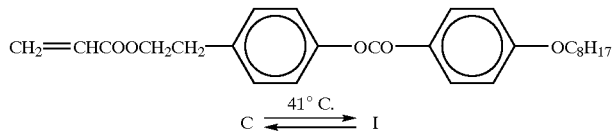
(a-32)

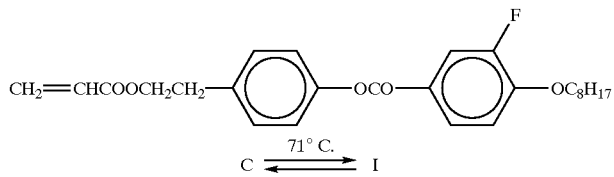
(a-33)

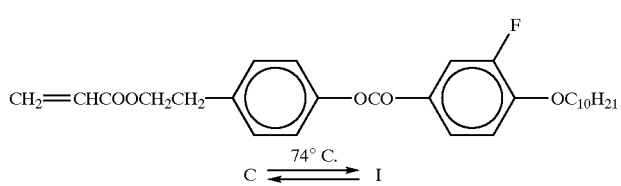
(a-34)

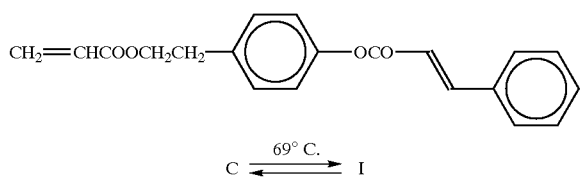
(a-35)

Furthermore, in addition to the compounds described above, (meth)acrylate compounds with a liquid crystalline cyclic backbone on a side chain can also be incorporated into liquid crystal compositions of the present invention. Examples of such compounds include the compounds represented by the formulae (a-36) through (a-45) shown below.

(In the formulae, a cyclohexane ring represents a trans-cyclohexane ring. Furthermore, the numbers represent phase transition temperatures, C represents a crystalline phase, N represents a nematic phase, S represents a smectic phase, and I represents an isotropic liquid phase.)

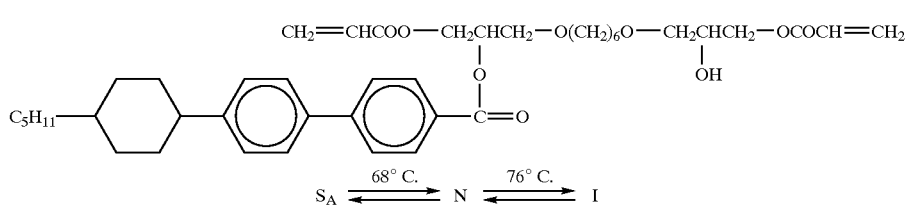
(a-36)

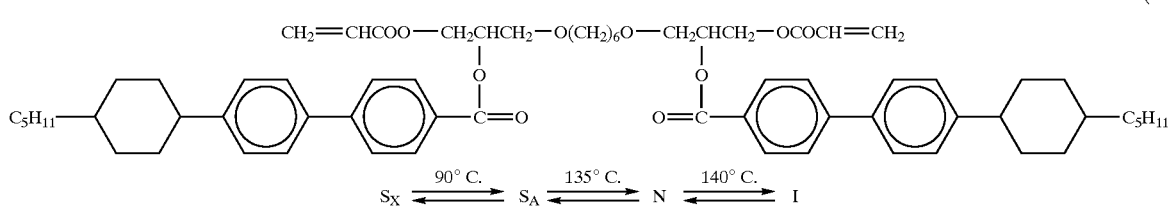
(a-37)

-continued
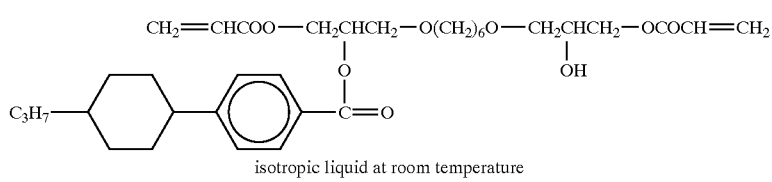
(a-38)
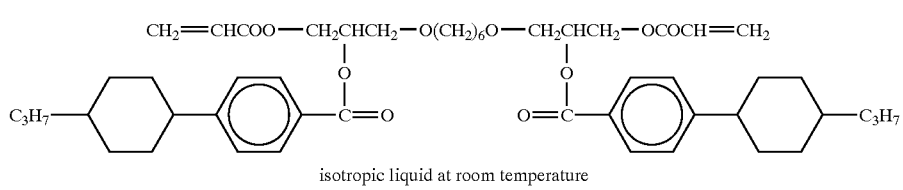
(a-39)
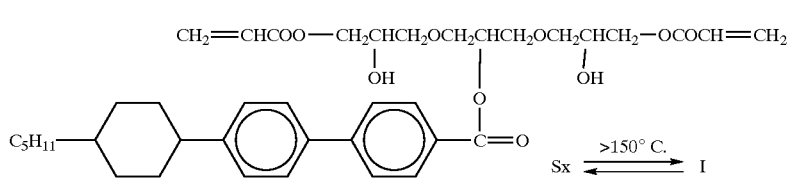
(a-40)
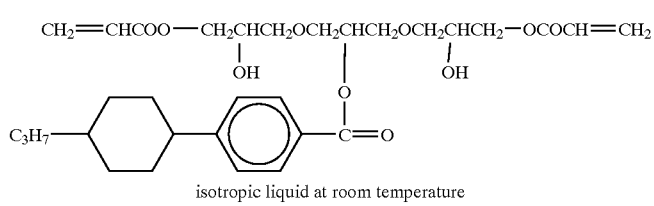
(a-41)
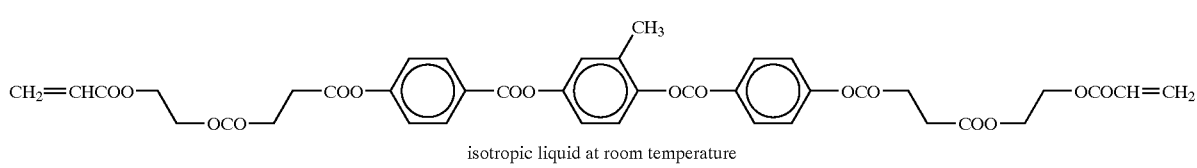
(a-42)
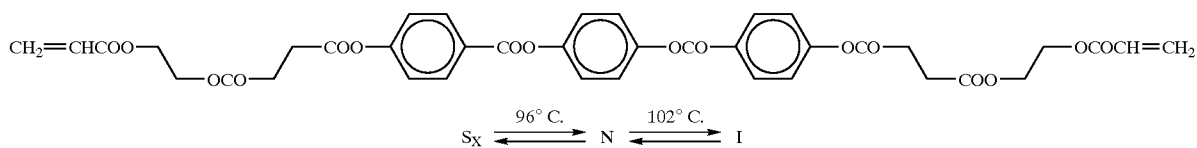
(a-43)
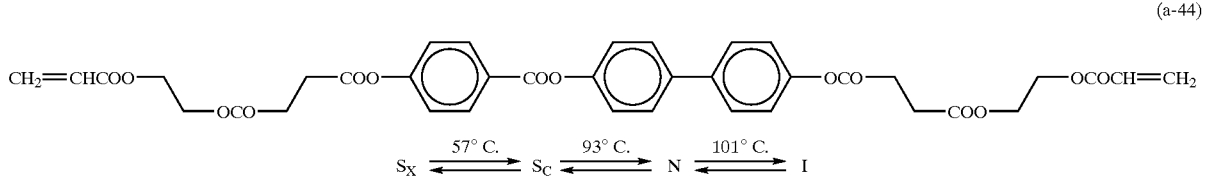
(a-44)
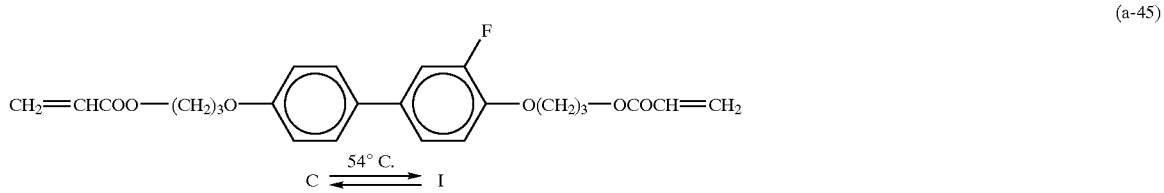
(a-45)
Moreover, in addition to the compounds described above, other liquid crystalline (meth)acrylate compounds can also be incorporated into liquid crystal compositions of the present invention. Examples of such compounds include the compounds represented by the formulae (a-46) through (a-61) shown below.

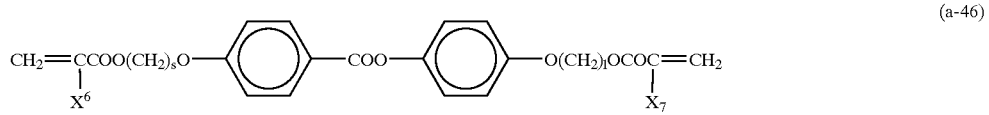
(a-46)
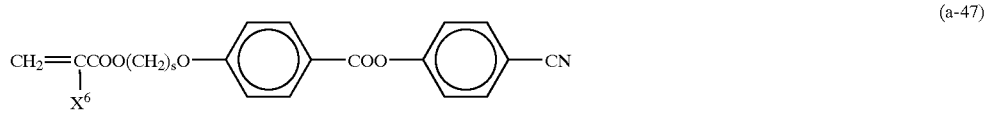
(a-47)
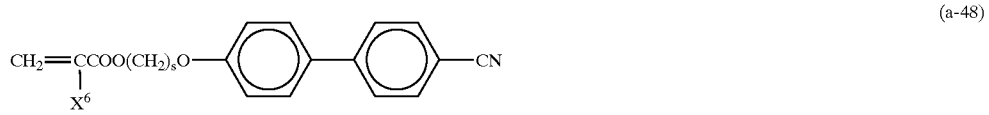
(a-48)
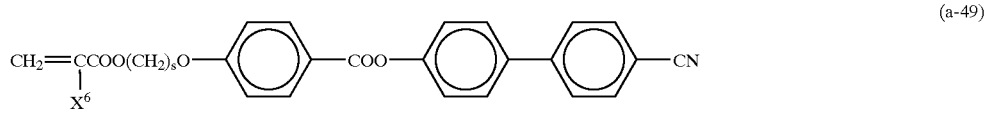
(a-49)
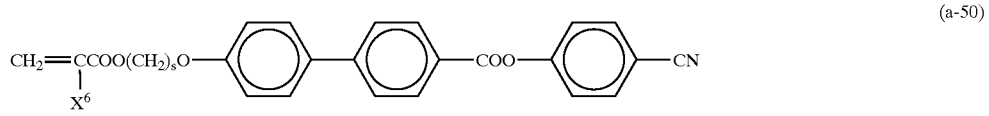
(a-50)
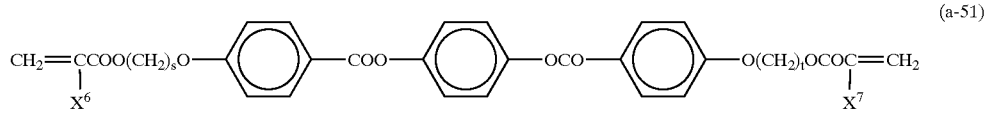
(a-51)
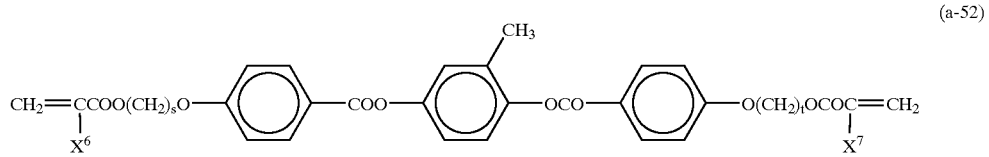
(a-52)
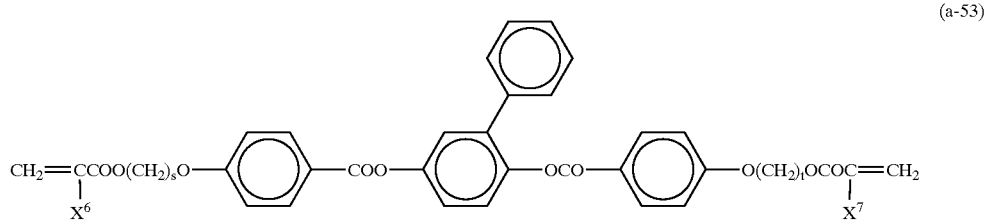
(a-53)
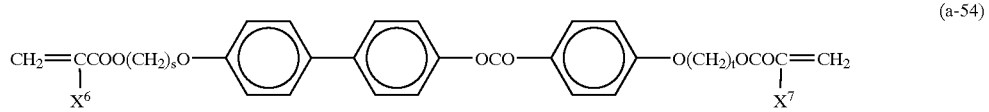
(a-54)
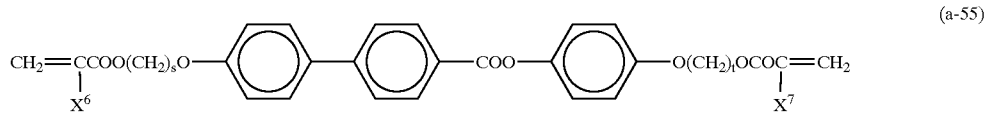
(a-55)
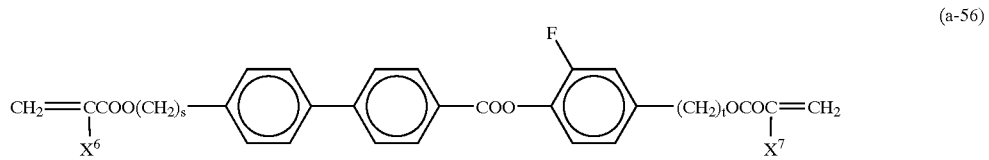
(a-56)
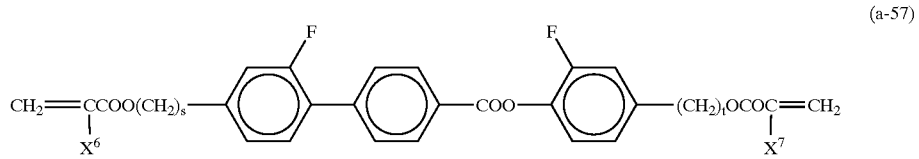
(a-57)

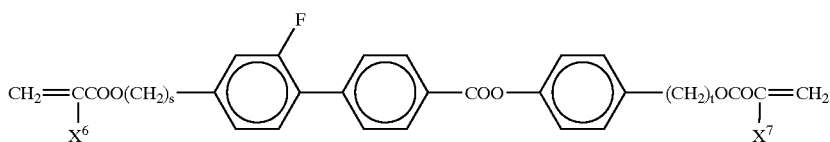
(a-58)

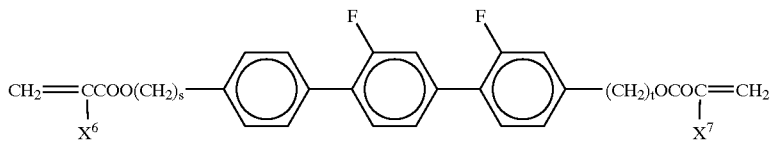
(a-59)

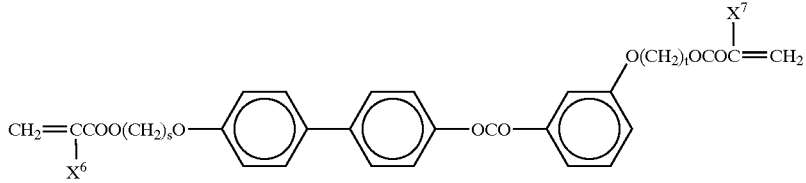
(a-60)

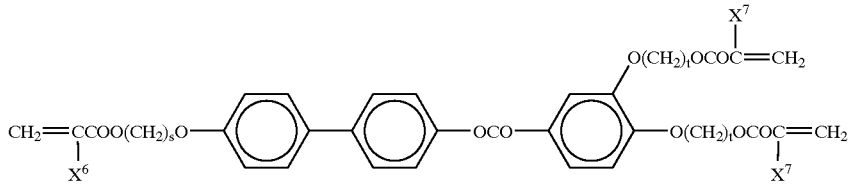
(a-61)

(In the formulae, $X^6$ and $X^7$ each represent, independently, a hydrogen atom or a methyl group, and s and t each represent, independently, an integer from 2 to 18.)

Furthermore, other liquid crystalline compounds which have no polymerizable functional groups may also be added to liquid crystal compositions of the present invention, depending on the final use of the composition. However, from the viewpoint of maintaining the heat resistant properties of the polymer prepared using the liquid crystal composition, the amount of such additives should preferably be no more than 80% by weight, with values of no more than 30% being even more preferred, and values of no more than 10% being particularly desirable.

Furthermore, compounds which have a polymerizable functional group, but which show no liquid crystallinity, may also be added to liquid crystal compositions of the present invention. Examples of such compounds include, without any particular restrictions, any compound typically recognized within the technical field as a polymer forming monomer or a polymer forming oligomer.

An object of a liquid crystal composition of the present invention involves irradiating an activated energy beam onto the composition at a temperature within the liquid crystal phase temperature region, and causing the polymerizable compound within the composition to undergo polymerization. As a result, in order to prepare a highly uniform polymer and avoid inducing undesirable thermal polymerization in the activated energy beam irradiation process, liquid crystal compositions of the present invention should preferably display liquid crystallinity at room temperature (typically 25° C.), or at a temperature in the vicinity of room temperature. For example, in those cases where an activated energy beam is irradiated onto a liquid crystal composition of the present invention in a (chiral) smectic C phase, causing a polymerization of the polymerizable compound within the composition, compositions in which the (chiral) smectic C phase appears at, or near, room temperature are preferred.

Furthermore, chiral (optically active) compounds may also be added to liquid crystal compositions of the present invention with the aim of preparing polymers with an internal liquid crystal backbone of a helical structure. The chiral compounds used for this type of purpose need not display liquid crystallinity, and may either possess, or not posses a polymerizable functional group. The helical direction of the helix made by the chiral compound can be selected in accordance with the intended use of the polymer.

Examples of such chiral compounds include cholesterol pelargonate and cholesterol stearate with the cholesterol group as the chiral group; compounds with a 2-methylbutyl group as the chiral group such as "CB-15", and "C-15" (manufactured by BDH Corporation from the U.K.), "S-1082" manufactured by Merck Corporation (Germany) and "CM-19", "CM-20" and "CM" manufactured by Chisso Corporation; as well as compounds with a 1-methylheptyl group as the chiral group such as "S-811" manufactured by Merck Corporation, and "CM-21" and "CM-22" manufactured by Chisso Corporation.

Preferred quantities of such chiral compound additives will vary depending on the ultimate use of the liquid crystal composition, although quantities which produce a value (d/P), representing the thickness (d) of the produced polymer upon polymerization divided by the helical pitch (P) within the polymer, within a range from 0.1 to 100 are preferred, with quantities which yield a value in the range from 0.1 to 20 being even more desirable.

In addition, polymerization initiators such as thermal polymerization initiators and photopolymerization initiators may also be added to liquid crystal compositions of the present invention with the aim of improving the polymerizability of the composition.

Examples of suitable thermal polymerization initiators include benzoyl peroxide and bisazobutyronitrile. Furthermore, examples of suitable photopolymerization initiators include benzoin ethers, benzophenones, acetophenones, and benzyl ketals. In those cases where thermal polymerization initiators or photopolymerization initiators are added to the composition, the quantity of such additives should preferably amount to no more than 10% by weight of the liquid crystal composition, with quantities of no more than 5% by weight being particularly preferred, and quantities within a range from 0.5 to 1.5% by weight being the most desirable.

Furthermore, stabilizers may also be added to liquid crystal compositions of the present invention with the aim of improving the preservation stability of the composition. Examples of usable stabilizers include hydroquinone, hydroquinone monoalkyl ethers, tertiary butyl catechols, pyrogallols, thiophenols, nitro compounds, β-naphthylamines, and β-naphthols. In those cases where stabilizers are used, the quantity of such additives should preferably amount to no more than 1% by weight of the liquid crystal composition, with quantities of no more than 0.5% by weight being particularly preferred.

As described above, in a liquid crystal composition of the present invention, liquid crystal compounds with a polymerizable functional group, liquid crystal compounds without a polymerizable functional group, polymerizable compounds which display no liquid crystallinity, polymerization initiators and stabilizers may be incorporated in addition to the liquid crystalline (meth)acrylate represented by the general formula (I), although the amount of each of these components added must be adjusted to ensure no loss in liquid crystallinity of the product liquid crystal composition.

Furthermore, in those cases where a liquid crystal composition of the present invention is used as the raw material for a polarizing film or an orientation film, or alternatively used for a printing ink, a paint, or a protective film or the like, then depending on the actual usage, further additives such as metals, metallic complexes, dyes, pigments, colorings, fluorescent materials, phosphorescent materials, surfactants, leveling agents, thixotropic agents, gelling agents, polysaccharides, ultraviolet light absorbers, infrared light absorbers, antioxidants, ion exchange resins, and metal oxides such as titanium oxide may also be added.

By conversion to a polymer, liquid crystal compositions incorporating a liquid crystal compound of the present invention can be applied to a variety of different uses, including phase retardation plates, polarizing plates, polarizing prisms, optical wave guides, piezoelectric elements, nonlinear optical elements, a variety of optical filters, liquid crystal pigments which utilize the selective reflection of cholesteric liquid crystal phases and the like, liquid crystal—resin composite displays, holographic liquid crystal displays, polymer stabilized liquid crystal (ferroelectric liquid crystal, antiferroelectric liquid crystal) displays, and as a coating for optical fibers or the like. Of these uses, polymers arising from polymerization of a liquid crystal composition of the present invention in an aligned state display anisotropy of the associated physical properties, and as such are particularly useful. These type of polymers can be prepared by supporting the polymerizable liquid crystal composition of the present invention on a substrate which has undergone a surface rubbing treatment with a cloth or the like, a substrate in which an organic thin film is formed thereon and then subjected to a surface rubbing treatment with a cloth or the like, or a substrate with an orientation film of $SiO_2$ formed by oblique deposition, or alternatively by sandwiching the polymerizable liquid crystal composition between such substrates, and then carrying out a subsequent polymerization of the polymerizable compound.

Examples of suitable methods for supporting the polymerizable liquid crystal composition onto the substrate include spin coating, die coating, extrusion coating, roll coating, wire bar coating, gravure coating, spray coating, dipping and printing methods. Furthermore, an organic solvent may also be added to the polymerizable liquid crystal composition for the coating process. Examples of suitable organic solvents which can be used for this purpose include ethyl acetate, tetrahydroftiran, toluene, hexane, methanol, ethanol, dimethyl formamide, methylene chloride, isopropanol, acetone, methyl ethyl ketone, acetonitrile and the cellosolve solvents. These organic solvents may be used singularly, or in combinations of two or more solvents, and should be selected based on consideration of the associated vapor pressure and the solubility of the polymerizable liquid crystal composition therein. Furthermore, the quantity of organic solvent added should preferably be no more than 90% by weight of the coating material. At values greater than 90% by weight, the produced film tends to be undesirably thin.

Examples of suitable methods for removing the added organic solvent include natural drying, heated drying, reduced pressure drying, and reduced pressure heated drying. In order to further improve the ease of application of the polymerizable liquid crystal material, a method in which an intermediate layer of a polyimide thin film or the like is provided on the substrate, or a method whereby a leveling agent is added to the polymerizable liquid crystal material, are also effective. The method wherein an intermediate layer of a polyimide thin film or the like is provided on top of the substrate is also particularly effective as a technique for improving the adhesion in those cases where the adhesion between the substrate and the polymer produced by polymerizing the polymerizable liquid crystal material is poor.

An example of a method for sandwiching the polymerizable liquid crystal material between two substrates is an injection method utilizing the capillary phenomenon. A technique wherein the space between the substrates is placed under reduced pressure, and the polymerizable liquid crystal material is then injected into the space is also effective.

Examples of alignment treatment methods other than the rubbing treatment and $SiO_2$ oblique deposition methods described above include methods utilizing flow alignment of the liquid crystal material, and methods utilizing electric fields or magnetic fields. These alignment techniques can be used singularly, or in combinations of two or more methods.

In addition, an example of an alternative alignment method to rubbing is a method utilizing optical alignment. This type of method involves the formation of an aligned film by irradiating polarized light, and preferably polarized ultraviolet light, onto an organic thin film of a material such as polyvinyl cinnamate which has a functional group within the molecule which undergoes optical dimerization, an organic thin film with a functional group which undergoes isomerization under light, or an organic thin film of a polyimide or the like. By suitable use of an optical mask with this alignment method, an aligned patterning treatment can be performed with relative ease, meaning molecular alignment within the polymer can also be controlled with a high degree of precision.

The shape of the substrate may be a flat plate, or may also incorporate a curved surface. Either organic materials or inorganic materials can be used for constructing the substrate. Examples of organic materials which can be used as the substrate material include polyethylene terephthalate, polycarbonate, polyimide, polyamide, polymethyl methacrylate, polystyrene, polyvinyl chloride, polytetrafluoroethylene, polychlorotrifluoroethylene, polyalylate, polysulfone, triacetyl cellulose, cellulose, and polyether ether ketone. Furthermore, examples of suitable inorganic materials include silicon, glass and calcite.

In those cases where a suitable degree of alignment can not be obtained by rubbing these substrates with a cloth or the like, an organic thin film such as a thin film of polyimide or a thin film of polyvinyl alcohol or the like can be formed on the substrate surface using known methods, and this thin film then subjected to rubbing with a cloth or the like. Furthermore, polyimide thin films, which provide a pretilt angle used in typical twisted nematic (TN) elements or super twisted nematic (STN) elements, enable the molecular aligned structure within the polymer to be controlled with an even greater degree of precision, and are consequently particularly desirable.

In those cases where the alignment state is controlled using an electric field, a substrate with an electrode layer is used. In such a case, it is preferable that an organic thin film such as the aforementioned polyimide film or the like is formed on top of the electrode.

Possible alignment states for the liquid crystal composition include any of the variety of alignment states widely known within the technical fields associated with liquid crystals, with specific examples including homogenous (horizontal) alignment, tilted homogenous alignment, homeotropic (vertical) alignment, tilted homeotropic alignment, hybrid alignment, twisted nematic alignment and super twisted nematic alignment. Furthermore, combinations of these alignment states are possible, as are patterns in which the alignment state varies from area to area.

Both tilted homogenous alignment and tilted homeotropic alignment, refer to states where the angle between the substrate surface and the major axis of the liquid crystal molecules is an angle other than 0 degrees or 90 degrees. The angle between the substrate surface and the major axis of the liquid crystal molecules can be selected, as desired, in accordance with the use or function of the product polymer. In those cases where the angle between the substrate surface and the major axis of the liquid crystal molecules is set to a value from 10 to 80 degrees, and more preferably set to an angle from 20 to 70 degrees, the product polymer can be used as an optical material improving on viewing angle performance of a liquid crystal display.

Furthermore, the product polymer in the case where the aligranent state of the liquid crystal composition is set as hybrid alignment can also be used as an optical material improving on viewing angle performance of a liquid crystal display. Furthermore, in those cases where the angle between the substrate surface and the major axis of the liquid crystal molecules is set to a value from 30 to 60 degrees, and preferably set to an angle from 40 to 50 degrees, and even more preferably set at an angle of 45 degrees, the product polymer is able to provide an efficient split of polarized beams. This type of polymer can be very useful as a polarization beam splitter or an optical low pass filter.

Moreover, the product polymer in those cases where the alignment state of the liquid crystal composition is set as hybrid alignment can also be used as a polarized light optical element or an optical low pass filter.

In contrast, alignment structures with a helical structure as represented by twisted nematic alignment, super twisted alignment and cholesteric alignment are also very useful. In those cases where the twist angle is set to a value from 60 to 270 degrees, the product polymer can be used for optical compensation applications for liquid crystal displays. Furthermore, in those cases where the helical pitch is adjusted, and set so that a specific wavelength region is selectively reflected, the product polymer can be used as a notch filter or a reflective color filter.

Furthermore, in those cases where the wavelength region for selective reflection is set in the infrared region, the product polymer can be used as an infrared cut filter. In those cases where the alignment state is set as homogeneous alignment or homeotropic alignment, the product polymer has a larger anisotropic refractive index than a drawn polymer film, and so such alignment states offer the advantage that thinner devices can be designed which offer an identical level of an anisotropic refractive index. Furthermore, the possibility also exists for building an optical compensating plate into the liquid crystal cell. When used for optical compensation of a reflective type liquid crystal element, this characteristic is extremely important, and such compensating plates are particularly useful as ¼ wavelength plates.

A preferred method for polymerizing a liquid crystal composition of the present invention, from the point of ensuring a rapid polymerization, comprises irradiating the composition with an activated energy beam such as an ultraviolet beam or an electron beam. In those cases where ultraviolet light is used, either a polarized light source or a depolarized light source may be used. Furthermore in those cases where the polymerization is conducted with the liquid crystal composition sandwiched between two substrates, then at least the substrate facing the irradiation source must display a suitable degree of transparency relative to the activated energy beam. Moreover, a technique can also be used wherein a mask is used during the irradiation so that only specific portions undergo polymerization, and by subsequently altering certain conditions such as the electric field, the magnetic field, or the temperature, the alignment state of only the non-polymerized portions can be altered, and these portions can then be polymerized by further irradiation with an activated energy beam. The temperature during irradiation should preferably be held within a temperature range which maintains the liquid crystal state of the liquid crystal composition of the present invention. Particularly in those cases where a polymer is to be prepared by photopolymerization, then from the viewpoint of avoiding inducing unintended thermal polymerization, it is preferable that, as far as possible, the polymerization is conducted at a temperature close to room temperature, namely typically at a temperature of 25° C. The intensity of the activated energy beam should preferably be within a range from 0.1 mW/cm$^2$ to 2 W/cm$^2$. If the intensity is less than 0.1 mW/cm$^2$, then completing the polymerization requires an excessive amount of time, leading to a lowering of productivity, whereas if the intensity is greater than 2 W/cm$^2$, then there is a tendency for the polymerizable liquid crystal composition itself to deteriorate.

Following irradiation of a polymerizable liquid crystal composition of the present invention with an activated light beam, in order to reduce variations in the initial characteristics of the product polymer and generate more stable characteristics, the product polymer may also be subjected to heat treatment. The temperature of such heat treatment should preferably be within a range from 50 to 250° C., and the heat treatment time should preferably be for a period of 30 seconds to 12 hours.

A polymer formed from a polymerizable liquid crystal composition of the present invention which has been manufactured using the types of methods described above may be peeled away from the substrate and used as a stand alone element, or alternatively may be used without removal from the substrate. Furthermore, polymers formed from a polymerizable liquid crystal composition of the present invention can also be used in a laminated arrangement of two or more layers, or attached to other substrates.

EXAMPLES

As follows is a more detailed description of the present invention using working examples. However it should be noted that the present invention is not limited to the examples presented here. The haze measurements described in the examples below were conducted using a compensation method (JIS, K7361).

Example 1

Synthesis (1) of a Liquid Crystalline Acrylate Compound

A mixture of 100.0 g of 4,4'-bisphenol, 73.0 g of 6-chloro-1-hexanol, 22.0 g of sodium hydroxide, 21.0 g of potassium iodide, 400 ml of ethanol and 400 ml of water was heated, with stirring, for 5 hours at 80° C. The resulting reaction liquid was cooled to room temperature, and dilute hydrochloric acid then added until the aqueous layer of the reaction liquid was weakly acidic. The precipitated crystals were filtered using a glass filter, and then washed with 1500 ml of water to yield a crude product of 700 g. This crude product material was recrystallized twice, from 700 ml of methanol, and then from a further 300 ml of methanol, to yield the purified product. The product compound was then further dissolved in 300 ml of tetrahydrofuran, any insoluble matter removed by filtration, and the tetrahydrofuran then removed under reduced pressure to yield 40.6 g of the compound represented by the formula (s-1).

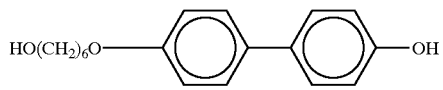

A mixture of 138.1 g of 4-hydroxybenzoate, 136.1 g of 6-chloro-1-hexanol, 84.0 g of sodium hydroxide, 25.0 g of potassium iodide, 440 ml of ethanol and 440 ml of water was heated, with stirring, for 32 hours at 80° C. The resulting reaction liquid was cooled to room temperature, 1000 ml of saturated brine solution added, and dilute hydrochloric acid then added until the aqueous layer of the reaction liquid was weakly acidic. 1000 ml of ethyl acetate was then added to the reaction solution to extract the reaction product. Following washing of the organic layer with water, the extraction medium was removed under reduced pressure and the product air dried to yield 223.9 g of the compound represented by the formula (s-2).

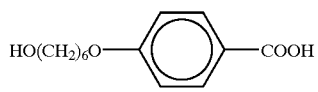

A mixture of 110.0 g of the compound represented by the formula (s-2), 133.1 g of acrylic acid, 27.0 g of p-toluenesulfonic acid, 6.0 g of hydroquinone, 420 ml of toluene, 180 ml of n-hexane and 260 ml of tetrahydrofuran was heated with stirring, and refluxed for 6 hours with the water generated being removed. The reaction liquid was cooled to room temperature, and then 1000 ml of saturated brine solution and 800 ml of ethyl acetate was added to the reaction solution to extract the reaction product. Following washing of the organic layer with water, the organic medium was removed under reduced pressure to yield 231.4 g of a crude product. This crude product material was then recrystallized twice from a mixture of 400 ml of n-hexane and 100 ml of toluene to yield 111.8 g of the compound represented by the formula (s-3).

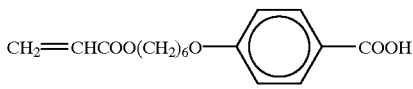

$^1$H-NMR (300 MHz, CDCL$_3$); δ=1.42~1.87 (m, 8H), 4.14 (t, 2H), 4.38 (t, 2H), 5.84 (d, 1H), 6.11 (d, 1H), 6.43 (d, 1H), 6.94 (d, 2H), 8.06 (d, 2H)

A mixture of 2.0 g of the compound represented by the formula (s-1), 4.5 g of the compound represented by the formula (s-3), 1.9 g of 4-dimethylaminopyridine, 3.0 g of 1-ethyl-3-(3-dimethylaminopropyl)carbodiimide hydrochloride, and 50 ml of tetrahydrofuran was stirred for 16 hours at room temperature. Following completion of the stirring process, the sedimentation was removed with a filter, and 100 ml of saturated brine solution then added. The aqueous layer was neutralized with a weak aqueous solution of hydrochloric acid, and 200 ml of ethyl acetate added to extract the reaction product. Following washing of the organic layer with water, the organic medium was removed under reduced pressure to yield 7.0 g of a crude product. The crude product was purified by silica gel column chromatography using a solvent mixture of ethyl acetate and toluene (ethyl acetate: toluene ratio of 1:4, Rf=0.68) as the eluent, and was then further purified by recrystallization from 15 ml of methanol, to yield 4.5 g of the liquid crystalline acrylate compound represented by the formula (s-4).

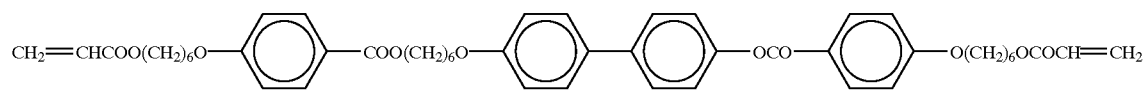

The phase transition temperatures for the liquid crystalline acrylate compound represented by the formula (s-4) were 46° C. for the crystalline phase—smectic X phase (the detailed phase structure could not be determined) transition temperature, 55° C. for the smectic X phase—smectic A phase transition temperature, 93° C. for the smectic A phase—nematic phase transition temperature, and 100° C. for the nematic phase—isotropic liquid phase transition temperature, with the compound represented by the formula (s-4) displaying a nematic phase between 93 and 100° C.

$^1$H-NMR (300 MHz, CDCL$_3$); δ=1.44~1.86 (m, 24H), 3.97~4.07 (m, 6H), 4.15~4.21 (m, 4H), 4.30 (t, J=6 Hz, 2H), 5.78~5.84 (m, 2H), 6.07~6.17 (m, 2H), 6.36~6.44 (m, 2H), 6.87~8.17 (m, 16H)

In contrast, the phase transition temperatures for the compound represented by the formula (4.1) from example 4 of Published Japanese translation No. Hei-6-507987 of PCT International Publication, which has a similar structure to the compound represented by the formula (s-4), were 87° C. for the liquid crystal phase—smectic A phase transition temperature, 145° C. for the smectic A phase—nematic phase transition temperature, and 170° C. for the nematic phase—isotropic liquid phase transition temperature, with the compound represented by the formula (4.1) displaying a nematic phase between 145 and 170° C.

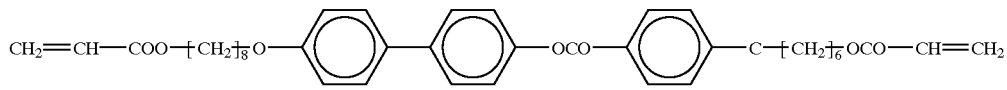

In comparison with the known compound of the formula (4.1), the compound of the formula (s-4) produced in the example 1 has one extra ring within the molecule, yet the temperature at which the nematic phase is displayed is more than 50° C. lower, and it is clear that this effect is due to the introduction of a phenylcarbonyloxyalkyleneoxy group between the biphenyl group of the compound of formula (4.1) and the acryloyloxyalkyleneoxy group bonded to this biphenyl group.

Example 2

Synthesis (2) of a Liquid Crystalline Acrylate Compound

A mixture of 80.0 g of methyl 4-hydroxybenzoate, 80.4 g of 3-bromo-1-propanol, 80.0 g of potassium carbonate, and 320 ml of dimethyl formamide was subjected to heated reflux, with stirring, for 6 hours at 80° C. The resulting reaction liquid was cooled to room temperature, 800 ml of saturated brine solution added, and dilute hydrochloric acid then added until the aqueous layer of the reaction liquid was weakly acidic. 1000 ml of tetrahydrofuran was then added to the reaction solution to extract the reaction product. The organic medium was subsequently removed under reduced pressure to yield 112.6 g of a crude product represented by the formula (s-8).

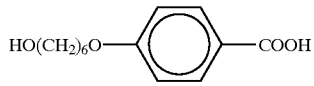

A mixture of 112.6 g of the crude product represented by the formula (s-8), 21.0 g of sodium hydroxide, 100 ml of methanol and 100 ml of water was subjected to heated reflux, with stirring, for 3 hours. The reaction liquid was cooled to room temperature and neutralized by adding hydrochloric acid. Subsequently, 1000 ml of saturated brine solution was added to the reaction solution, and a further 1000 ml of tetrahydrofuran was then added to extract the reaction product. Removal of the organic medium under reduced pressure yielded 242.1 g of a crude product. This crude product was subsequently recrystallized from 200 ml of toluene, recrystallized again from 400 ml of toluene, and then recrystallized once again from a solvent mixture of 200 ml of toluene and 100 ml of tetrahydrofuran to yield 92.0 g of the compound represented by the formula (s-9).

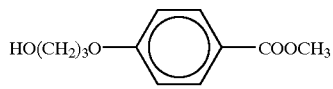

A mixture of 92.0 g of the compound represented by the formula (s-9), 135.0 g of acrylic acid, 15.0 g of p-toluenesulfonic acid, 3.0 g of hydroquinone, 420 ml of toluene and 420 ml of n-hexane was heated with stirring, and refluxed for 5 hours with the water generated being removed with a Dean Stark water separator. The reaction liquid was cooled to room temperature, and the reaction liquid washed with 1000 ml of saturated brine solution. Following addition of 800 ml of ethyl acetate to the organic layer, the organic layer was washed twice with 300 ml of an aqueous solution of saturated sodium bicarbonate. The organic layer was then washed a further 3 times with 1000 ml samples of water, and the organic medium was removed under reduced pressure to yield 121.7 g of a crude product. This crude product material was then recrystallized from a solvent mixture of 70 ml of toluene and 200 ml of n-hexane to yield 39.9 g of the compound represented by the formula (s-10).

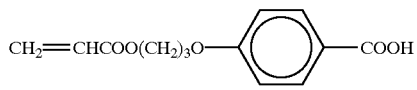

A mixture of 3.0 g of the compound represented by the formula (s-1), 5.8 g of the compound represented by the formula (s-10), 0.6 g of 4-dimethylaminopyridine, 4.5 g of 1-ethyl-3-(3-dimethylaminopropyl)carbodiimide hydrochloride, and 100 ml of tetrahydrofuran was stirred while the temperature was raised to 50° C. Once the temperature had reached 50° C. the heating was immediately halted, and stirring continued while the temperature cooled naturally back down to room temperature. The mixture was then stirred for a further 6 hours at room temperature. A dilute aqueous solution of hydrochloric acid was then added to the reaction liquid until the aqueous layer became weakly acidic, and 200 ml saturated brine solution and 300 ml of ethyl acetate were then added to extract the reaction product. Following washing of the organic layer with water, the organic solvent was removed under reduced pressure to yield 12.2 g of a crude product. The crude product was purified by silica gel column chromatography using a solvent mixture of toluene and ethyl acetate (ethyl acetate: toluene ratio of 1:4, Rf=0.52) as the eluent, and was then further purified by recrystallization from 40 ml of methanol, to yield 3.0 g of a liquid crystalline acrylate compound represented by the formula (s-11).

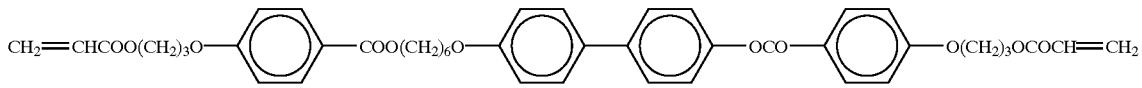

The phase transition temperatures for the liquid crystalline acrylate compound represented by the formula (s-11) were 82° C. for the liquid crystal phase—smectic X phase (detailed phase structure could not be determined) transition temperature, 84° C. for the smectic X phase—smectic A phase transition temperature, 86° C. for the smectic A phase—nematic phase transition temperature, and 105° C. for the nematic phase—isotropic liquid phase transition temperature.

$^1$H-NMR (300 MHz, CDCL$_3$); δ=1.55~2.35 (m, 12H), 4.01 (t, J=6 Hz, 2H), 4.10 (t, J=6 Hz, 2H), 4.16 (t, J=6 Hz, 2H), 4.31 (t, J=7 Hz, 2H), 4.38 (t, J=6 Hz, 4H), 5.84 (dd, J=10 Hz, 2H), 6.07~6.18 (m, 2H), 6.41 (dd, J=17 Hz, 2H), 6.87~8.17 (m, 16H)

Example 3

Synthesis (3) of a Liquid Crystalline Acrylate Compound

A mixture of 1075.0 g of 4-bromophenol, 1017.8 g of 6-chloro-1-hexanol, 1029.7 g of potassium carbonate, 130 g of potassium iodide and 4300 ml of dimethyl formamide was heated, with stirring, for 20 hours at 80° C. The resulting reaction liquid was cooled to room temperature, and dilute hydrochloric acid then added until the aqueous layer of the reaction liquid was weakly acidic. 10000 ml of ethyl acetate was then added to extract the reaction product. The organic layer was washed with water, the organic medium subsequently removed under reduced pressure, and the product vacuum dried to yield 1962.0 g of a crude product represented by the formula (s-12).

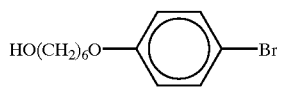
(s-12)

Into a mixture of 1962.0 g of the compound represented by the formula (s-12), 180.4 g of p-toluenesulfonic acid pyridinium salt and 9800 ml of methylene chloride was dripped 1207.8 g of 3,4-dihydropyran, with the rate of addition controlled so that the temperature of the resulting reaction mixture did not exceed 30° C. Following completion of the addition, the mixture was stirred for 3 hours. Upon completion of the reaction, the reaction liquid was washed 3 times with 3000 ml samples of saturated brine solution, the organic medium was removed under reduced pressure, and the resulting product was vacuum dried to yield 2977.2 g of a crude product represented by the formula (s-13).

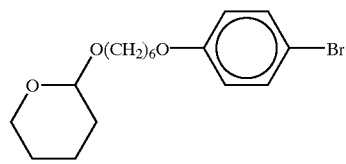
(s-13)

Into a mixture of 1635.0 g of 4-bromo-2-fluorophenol, 215.1 g of p-toluenesulfonic acid pyridinium salt and 8200 ml of methylene chloride was dripped 1440.0 g of 3,4-dihydropyran, with the rate of addition controlled so that the temperature of the resulting reaction mixture did not exceed 30° C. Following completion of the addition, the mixture was stirred for 3 hours. Upon completion of the reaction, the reaction liquid was washed 3 times with 3000 ml samples of saturated brine solution, the organic medium was removed under reduced pressure, and the resulting product was vacuum dried to yield 2320.0 g of a crude product represented by the formula (s-14).

(s-14)

2320.0 g of the crude product represented by the formula (s-14) dissolved in 8000 ml of tetrahydrofulran was dripped onto 225.4 g of magnesium, at a rate that maintained the internal temperature at a temperature of 40 to 50° C. Following completion of the addition, the mixture was stirred for 1 hour at room temperature. Any remaining magnesium was removed by filtration to yield a tetrahydrofuran solution of the compound represented by the formula (s-15).

(s-15)

Next, a mixture of 2977.2 g of the crude product represented by the formula (s-13), 75.2 g of tetrakis (triphenylphosphine) palladium (O), and 8000 ml of tetrahydrofuran was stirred, with heating, at 45° C. The tetrahydroluran solution of the compound represented by the formula (s-15) was then dripped into the reaction liquid, with the rate of addition controlled so as to maintain the internal temperature at 40 to 50° C. Following completion of the addition, the mixture was stirred for 3 hours with sufficient heating applied to maintain the internal temperature at 40 to 50° C. Upon completion of the reaction, the reaction liquid was cooled to room temperature and neutralized with dilute hydrochloric acid. The product was then extracted by the addition of 10000 ml of ethyl acetate to the reaction liquid. The organic layer was subsequently washed 3 times with 3000 ml samples of saturated brine solution, the organic medium was removed under reduced pressure, and the resulting product was vacuum dried to yield 3120.0 g of a crude product represented by the formula (s-16).

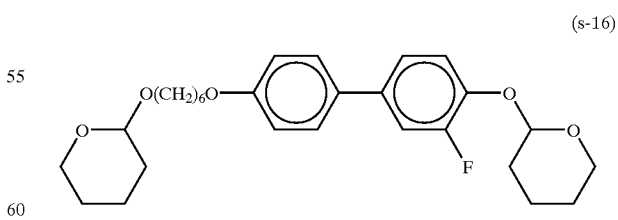
(s-16)

A mixture of 3120.0 g of the crude product represented by the formula (s-16), 7000 ml of tetrahydrofuran and 1500 ml of an aqueous hydrochloric acid solution was refluxed, with heating, for 3 hours. Upon completion of the reaction the temperature was cooled to room temperature, and 10000 ml of ethyl acetate added to extract the product. The organic layer was subsequently washed 3 times with 3000 ml samples of saturated brine solution, the organic medium was removed under reduced pressure, and the resulting product was vacuum dried to yield 1870.0 g of a crude product represented by the formula (s-17). This crude product was washed with 6000 ml of hot toluene, and yielded 800 g of the compound (s-17).

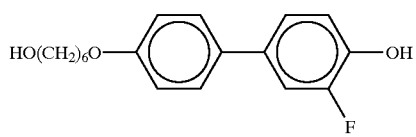

(s-17)

A mixture of 2.0 g of the compound (s-17), 4.2 g of the compound (s-3) synthesized in the example 1, 0.2 g of 4-dimethylaminopyridine, 2.8 g of 1-ethyl-3-(3-dimethylaminopropyl)carbodiimide hydrochloride and 50 ml of tetrahydrofuran was stirred for 16 hours at room

Example 4

Synthesis (4) of a Liquid Crystalline Acrylate Compound

A mixture of 2.0 g of the compound represented by the formula (s-17), 3.6 g of the compound (s-10) synthesized in the example 3, 0.2 g of 4-dimethylaininopyridlne, 2.8 g of 1-ethyl-3-(3-dimethylaminopropyl)carbodiimide hydrochloride, and 50 ml of tetrahydrofuran was stirred for 16 hours at room temperature. Following completion of the stirring process, the sedimentation was removed with a filter, and 100 ml of saturated brine solution then added. The aqueous layer was then neutralized with a weak aqueous solution of hydrochloric acid, and 200 ml of ethyl acetate added to extract the reaction product. Following washing of the organic layer with water, the organic medium was removed under reduced pressure to yield 5.5 g of a crude product. The crude product was purified by silica gel column chromatography using a solvent mixture of ethyl acetate and toluene (ethyl acetate: toluene ratio of 1:5, Rf=0.51) as the eluent, and was then further purified by 10 separate recrystallizations using a solvent medium of 10 ml of ethanol and 5 ml of ethyl acetate, to yield 1.8 g of a liquid crystalline acrylate compound represented by the formula (s-19).

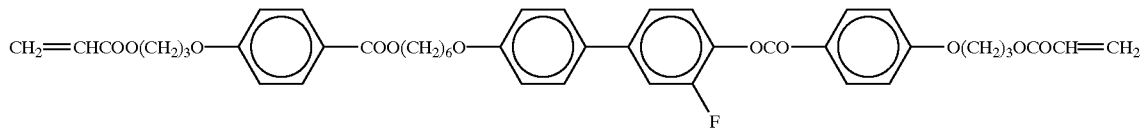

(s-19)

temperature. Following completion of the stirring process, the sedimentation was removed with a filter, and 100 ml of saturated brine solution then added. The aqueous layer was neutralized with a weak aqueous solution of hydrochloric acid, and 200 ml of ethyl acetate then added to extract the reaction product. Following washing of the organic layer with water, the organic medium was removed under reduced pressure to yield 6.0 g of a crude product. The crude product was purified by silica gel column chromatography using a solvent mixture of ethyl acetate and toluene (ethyl acetate: toluene ratio of 1:10, Rf=0.33) as the eluent, and was then further purified by recrystallization from a solvent mixture of 30 ml of hexane and 10 ml of ethyl acetate, and an additional recrystallization from a solvent mixture of 30 ml of ethanol and 10 ml of ethyl acetate, to yield 1.7 g of a liquid crystalline acrylate compound represented by the formula (s-18).

The phase transition temperatures for the liquid crystalline acrylate compound (s-19) were 37° C. for the smectic A phase—nematic phase transition, and 86° C. for the nematic phase—isotropic liquid phase transition.

Example 5

Synthesis (5) of a Liquid Crystalline Acrylate Compound

A mixture of 50.0 g of 4-benzyloxyphenol, 28.3 g of 3-chloro-1-propanol, 41.3 g of potassium carbonate, 5.0 g of potassium iodide and 100 ml of dimethyl formamide was heated, with stirring, for 5 hours at 80° C. The resulting reaction liquid was cooled to room temperature, and dilute hydrochloric acid then added until the aqueous layer of the reaction liquid was weakly acidic. 800 ml of tetrahydrofuran was then added to extract the reaction product. The organic

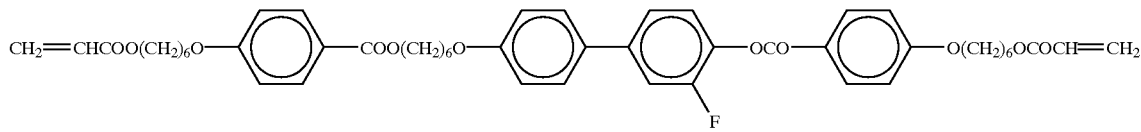

(s-18)

The phase transition temperatures for the liquid crystalline acrylate compound represented by the formula (s-18) were 66° C. for the smectic A phase—nematic phase transition, and 86° C. for the nematic phase—isotropic liquid phase transition.

layer was washed with water, the organic medium subsequently removed under reduced pressure, and the product vacuum dried to yield 67.2 g of a crude product represented by the formula (s-20). This crude product was purified by two separate recrystallizations from 140 ml samples of toluene, to yield 31.9 g of the compound (s-20).

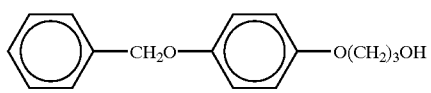
(s-20)

A mixture of 31.9 g of the compound (s-20), 6.0 g of a palladium carbon catalyst and 500 ml of ethanol was placed in an autoclave, and stirred for three hours under a 0.3 Mpa atmosphere of hydrogen. Following completion of the reaction, the palladium carbon catalyst was removed by filtration, the organic medium subsequently removed under reduced pressure, and the product then vacuum dried to yield 27.7 g of a crude product represented by the formula (s-21). This crude product was purified by washing with 100 ml of hot toluene, to yield 20.1 g of the compound (s-21).

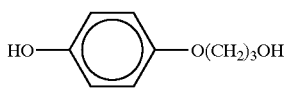
(s-21)

A mixture of 3.2 g of the compound (s-21), 10.0 g of the compound (s-10) synthesized in the example 3, 0.5 g of 4-dimethylaminopyridine, 7.7 g of 1-ethyl-3-(3-dimethylaminopropyl)carbodiimide hydrochloride, and 120 ml of tetrahydrofuran was stirred for 16 hours at room temperature. Following completion of the stirring process, the sedimentation was removed with a filter, and 200 ml of saturated brine solution then added. The aqueous layer was then neutralized with a weak aqueous solution of hydrochloric acid, and 400 ml of ethyl acetate added to extract the reaction product. Following washing of the organic layer with water, the organic medium was removed under reduced pressure to yield 13.1 g of a crude product. The crude product was purified by silica gel column chromatography using a solvent mixture of ethyl acetate and toluene (ethyl acetate: toluene ratio of 1:5, Rf=0.36) as the eluent, and was then further purified by recrystallization from 10 ml of ethanol, to yield 5.0 g of a liquid crystalline acrylate compound represented by the formula (s-22).

reaction, the reaction liquid was washed once with 250 ml of saturated aqueous sodium bicarbonate, and washed once more with 250 ml of saturated brine solution. Following drying of the organic layer with anhydrous magnesium sulfate, the solvent medium was removed under reduced pressure to yield 67.0 g of a compound represented by the formula (s-14).

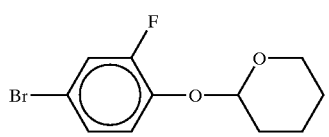
(S-14)

$^1$H-NMR (300 MHz, CDCL$_3$); δ=1.50~2.08 (m, 6H), 3.56~3.63 (m, 1H), 3.84~3.92 (m, 1H), 5.38~5.40 (m, 1H), 7.00~7.32 (m, 3H)

To a solution of 34.4 g of the compound (s-14) obtained from the above synthesis, 14.7 g of trimethylsilylacetylene, 120 ml of dimethyl formamide, and 45 ml of triethylamine was added 1.73 g of tetrakistriphenylphosphine palladium and 0.57 g of copper iodide, and the resulting mixture was heated, with stirring, for 8 hours at 80° C. The progression of the reaction was confirmed by thin layer chromatography (hexane: dichloromethane ratio of 2:1), and when the reaction was complete, the reaction liquid was diluted with 300 ml of ethyl acetate. The solution was then washed once with 200 ml of saturated aqueous ammonium chloride, and twice with 200 ml samples of saturated brine solution. The organic layer was dried with anhydrous magnesium sulfate, and following subsequent removal of the solvent medium under reduced pressure, the crude product was purified by column chromatography (hexane: dichloromethane ratio of 2:1) to yield 32.8 g of the compound represented by the formula (s-23).

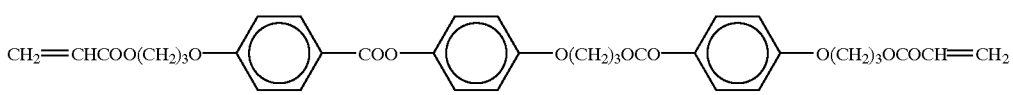
(s-22)

The liquid crystalline acrylate compound (s-22) displayed a nematic liquid crystal phase.

Example 6

Synthesis (6) of a Liquid Crystalline Acrylate Compound

Following addition of 6.3 g of pyridinium para-toluenesulfonic acid to a solution of 48.0 g of 4-bromo-2-fluorophenol and 250 ml of dichloromethane, the resulting solution was cooled using an ice bath, and a solution of 42.0 g of dihydropyran and 75 ml of dichloromethane was added gradually via a dropping funnel over a one hour period. Following completion of the addition, the temperature was raised to room temperature and the mixture was stirred for approximately 4 hours. The reaction product was confirmed using gas chromatography, and upon completion of the

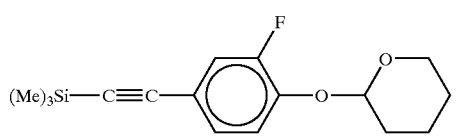
(S-23)

A solution of 34.5 g of 75% tetranormalbutyl ammonium fluoride and 60 ml of dichloromethane was cooled in an ice bath, and a solution of 30.7 g of the synthesized compound represented by the formula (s-23) and 60 ml of dichloromethane was added gradually via a dropping funnel over a one hour period. Following completion of the addition, the temperature was raised to room temperature and the mixture was stirred for approximately 3 hours. The progression of the reaction was confirmed by thin layer chromatography (using toluene), and when the reaction was complete, the reaction liquid was washed twice with 150 ml samples of saturated brine solution. The organic layer was dried with anhydrous magnesium sulfate, and following subsequent removal of the solvent medium under reduced pressure, the crude product was purified by column chromatography (toluene) to yield 22.1 g of the compound represented by the formula (s-24).

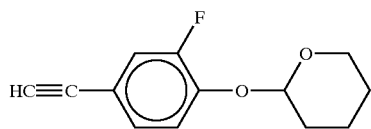
(S-24)

$^1$H-NMR (300 MHz, CDCL$_3$); δ=1.50~2.09 (m, 6H), 3.01 (s, 1H), 3.60~3.65 (m, 1H), 3.85~3.93 (m, 1H), 5.46~5.48 (m, 1H), 7.10~7.35 (m, 3H)

To a solution of 22.5 g of the compound (s-24) obtained from the above synthesis, 19.9 g of 4-bromophenol, 120 ml of dimethyl formamide, and 35 ml of triethylamine was added 1.25 g of tetrakistriphenylphosphine palladium and 0.41 g of copper iodide, and the resulting mixture was heated, with stirring, for 12 hours at 90° C. The progression of the reaction was confirmed by thin layer chromatography (toluene: ethyl acetate ratio of 10:1), and when the reaction was complete, the reaction liquid was diluted with 200 ml of ethyl acetate. The solution was then washed once with 150 ml of saturated aqueous ammonium chloride, and twice with 150 ml samples of saturated brine solution. The organic layer was dried with anhydrous magnesium sulfate, and following subsequent removal of the solvent medium under reduced pressure, the crude product was purified by column chromatography (toluene: ethyl acetate ratio of 10:1) to yield 17.5 g of the compound represented by the formula (s-25).

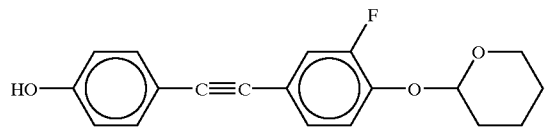
(S-25)

$^1$H-NMR (300 MHz, CDCL$_3$); δ=1.60~2.06 (m, 6H), 3.62~3.66 (m, 1H), 3.90~3.98 (m, 1H), 5.11 (s, 1H), 5.47~5.49 (m, 1H), 6.70~7.41 (m, 7H)

To a solution of 14.4 g of the compound (s-25) obtained from the above synthesis, 16.7 g of 6-bromohexanol, and 140 ml of dimethyl formamide was added 12.7 g of potassium carbonate, and the resulting mixture was heated, with stirring, for 4 hours at 85° C. The progression of the reaction was confirmed by thin layer chromatography (toluene: ethyl acetate ratio of 4:1), and when the reaction was complete, the reaction liquid was diluted with 200 ml of ethyl acetate. The solution was then washed three times with 100 ml samples of saturated brine solution. The organic layer was dried with anhydrous magnesium sulfate, and following subsequent removal of the solvent medium under reduced pressure, the crude product was separated out by column chromatography (toluene: ethyl acetate ratio of 4:1). Following removal of the solvent medium under reduced pressure, the crude product was purified by recrystallization (chloroform: hexane ratio of 1:3) to yield 17.0 g of the compound represented by the formula (s-26).

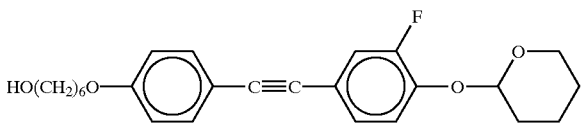
(S-26)

White crystals, melting point: 96.5 to 97.0° C.

$^1$H-NMR (300 MHz, CDCL$_3$); δ=1.32~2.12 (m, 14H), 3.61~3.69 (m, 3H), 3.88~3.99 (m, 3H), 5.46~5.48 (m, 1H), 6.84~7.45 (m, 7H)

To a solution of 7.6 g of the compound (s-26) obtained from the above synthesis and 70 ml of tetrahydrofuran was added 35 ml of a 10% aqueous solution of hydrochloric acid, and the resulting mixture was stirred for 4 hours at room temperature to allow the reaction to proceed. The progression of the reaction was confirmed by thin layer chromatography (toluene: ethyl acetate ratio of 4:1), and when the reaction was complete, the reaction liquid was diluted with 200 ml of ethyl acetate. The solution was then washed twice with 100 ml samples of saturated brine solution. The organic layer was dried with anhydrous magnesium sulfate, and following subsequent removal of the solvent medium under reduced pressure, the crude product was purified by recrystallization (chloroform) to yield 5.5 g of the compound represented by the formula (s-27).

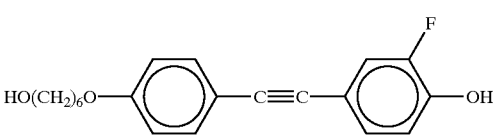
(S-27)

White crystals, melting point: 127.0 to 128.0° C.

$^1$H-NMR (300 MHz, CDCL$_3$); δ=1.42~1.83 (m, 8H), 3.00 (br. s, 1H), 3.56 (t, 2H), 4.02 (t, 2H), 6.92~7.45 (m, 7H)

To a solution of 2.2 g of the compound (s-27) obtained from the above synthesis, 5.9 g of the compound (s-3), namely 4-(6-acryloyloxyhexyloxy)benzoic acid, and 100 ml of tetrahydrofuran was added 3.85 g of 1-ethyl-3-(3-dimethylaminopropyl)carbodiimide hydrochloride and 2.45 g of 4-dimethylaminopyridine, and the resulting mixture was stirred for 3 days at room temperature to allow the reaction to proceed. The progression of the reaction was confirmed by thin layer chromatography (toluene: ethyl acetate ratio of 4:1), and when the reaction was complete, the reaction liquid was diluted with 200 ml of ethyl acetate. The solution was then washed twice with 100 ml samples of saturated brine solution. The organic layer was dried with anhydrous magnesium sulfate, and following subsequent removal of the solvent medium under reduced pressure, the crude product was separated by column chromatography (toluene: ethyl acetate ratio of 4:1) to yield 4.5 g of a liquid crystalline compound represented by the formula (s-28).

(S-28)

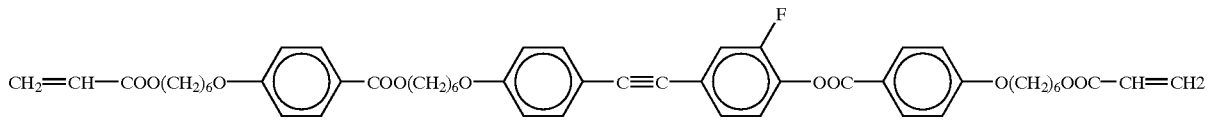

The phase transition temperatures for the liquid crystalline acrylate compound of the formula (s-28) under rising temperature conditions were 50° C. for the crystalline phase—nematic phase transition, and 87° C. for the nematic phase—isotropic liquid phase transition, whereas the phase transition temperatures under falling temperature conditions were 87° C. for the isotropic liquid phase—nematic phase transition, and less than 25° C. for the nematic phase—crystalline phase transition.

$^1$H-NMR (300 MHz, CDCL$_3$); δ=1.44~1.83 (m, 24H), 3.96~4.33 (m, 12H), 5.80 (m, 2H), 6.13 (m, 2H), 6.43 (m, 2H), 6.85~7.46 (m, 9H), 8.00 (d, 2H), 8.14 (d, 2H)

In contrast, the phase transition temperatures for the compound represented by the formula (cxvii), which was disclosed in the example 4 of Japanese Unexamined Patent Application, First Publication No. 2000-281628, and has a structure similar to the compound of the formula (s-28), were 56° C. for the crystalline phase—smectic C phase transition, 66° C. for the smectic C phase—smectic A phase transition, 123° C. for the smectic A phase—nematic phase transition, and 139° C. for the nematic phase—isotropic liquid phase transition, so that the compound represented by the formula (cxvii) displays a nematic phase at temperatures from 123 to 129° C.

Example 7

Synthesis (7) of a Liquid Crystalline Acrylate Compound

To a solution of 5.0 g of the compound (s-26) obtained from the above synthesis, 4.6 g of the compound (s-3), namely 4-(6-acryloyloxyhexyloxy)benzoic acid, and 150 ml of tetrahydrofuran was added 3.0 g of 1-ethyl-3-(3-dimethylaminopropyl)carbodiimide hydrochloride and 1.92 g of 4-dimethylaminopyridine, and the resulting mixture was stirred for 3 days at room temperature to allow the reaction to proceed. The progression of the reaction was confirmed by thin layer chromatography (toluene: ethyl acetate ratio of 4:1), and when the reaction was complete, the reaction liquid was diluted with 300 ml of ethyl acetate. The solution was then washed twice with 150 ml samples of saturated brine solution. The organic layer was dried with anhydrous magnesium sulfate, and following subsequent removal of the solvent medium under reduced pressure, the crude product was separated by column chromatography (toluene: ethyl acetate ratio of 4:1) to yield 7.5 g of the compound represented by the formula (s-29).

In comparison with the known compound of the formula (cxvii), the compound of the formula (s-4) produced in the example 6 has one extra ring within the molecule, but still displays a nematic phase temperature which is more than 50° C. lower than the known compound. Clearly, the reason for this effect is the introduction of a phenylcarbonyloxy-alkyleneoxy group between the phenyl group of the compound (cxvii) and the acryloyloxyalkyleneoxy group bonded to this phenyl group.

To a solution of 6.6 g of the compound (s-29) obtained from the above synthesis and 60 ml of tetrahydrofuran was added 35 ml of a 10% aqueous solution of hydrochloric acid, and the resulting mixture was stirred for 4 hours at room temperature to allow the reaction to proceed. The progression of the reaction was confirmed by thin layer chromatography (toluene: ethyl acetate ratio of 4:1), and when the reaction was complete, the reaction liquid was diluted with 200 ml of ethyl acetate. The solution was then washed twice with 100 ml samples of saturated brine solution. The organic layer was dried with anhydrous magnesium sulfate, and following subsequent removal of the solvent medium under reduced pressure, the crude product was purified by recrystallization (ethanol) to yield 5.0 g of a compound represented by the formula (s-30).

hydroxide at a temperature of 80° C. Following completion of the addition, the temperature was maintained at 80° C. for a further 7.5 hours to allow the reaction to proceed. The progression of the reaction was confirmed by thin layer chromatography (toluene: ethyl acetate ratio of 1:1), and when the reaction was complete, the reaction liquid was cooled to room temperature, and a 1N aqueous solution of dilute hydrochloric acid was added until the aqueous layer of the reaction liquid became weakly acidic. 500 ml of ethyl acetate was then added to the reaction solution to extract the

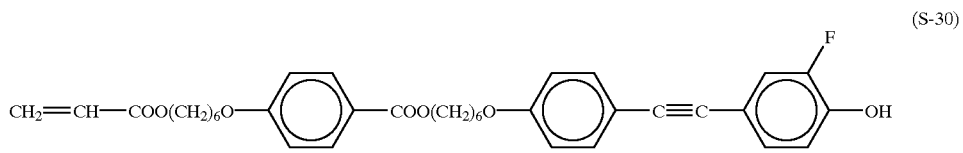

(S-30)

The compound of the formula (s-30) was a liquid crystalline compound, and the associated phase transition temperatures were 78° C. for the monotropic isotropic liquid phase—nematic phase transition, and 74° C. for the nematic phase—crystalline phase transition.

$^1$H-NMR (300 MHz, CDCL$_3$); δ=1.42~1.81 (m, 16H), 3.95~4.33 (m, 8H), 5.81 (d, 1H), 6.12 (dd, 1H), 6.41 (d, 1H), 6.83~7.30 (m, 7H), 7.44 (d, 2H), 7.98 (d, 2H)

Following addition of 6.3 g of pyridinium para-toluenesulfonic acid to a solution of 45.0 g of 6-bromohexanol and 250 ml of dichloromethane, the resulting solution was cooled using an ice bath, and a solution of 42.0 g of dihydropyran and 75 ml of dichloromethane was added gradually via a dropping funnel over a one hour period. Following completion of the addition, the temperature was raised to room temperature and the mixture was stirred for approximately 4 hours. The reaction product was confirmed using gas chromatography, and upon completion of the reaction, the reaction liquid was washed once with 250 ml of saturated aqueous sodium bicarbonate, and washed once more with 250 ml of saturated brine solution. Following drying of the organic layer with anhydrous magnesium sulfate, the solvent medium was removed under reduced pressure to yield 65.5 g of a compound represented by the formula (s-31).

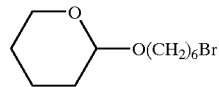

(S-31)

A solution of 18.5 g of the compound (s-31) obtained from the above synthesis and 10 ml of ethanol was placed in a dropping funnel, and then added over an approximately 20 minute period, with stirring, to a mixture of 10.14 g of 4-hydroxybenzoic acid, 1.75 g of potassium iodide, 30 ml of ethanol and 36.0 g of a 17% aqueous solution of sodium reaction product. Following washing of the organic layer with water, the extraction medium was removed under reduced pressure, and the product was air dried to yield 20.0 g of the compound represented by the formula (s-32).

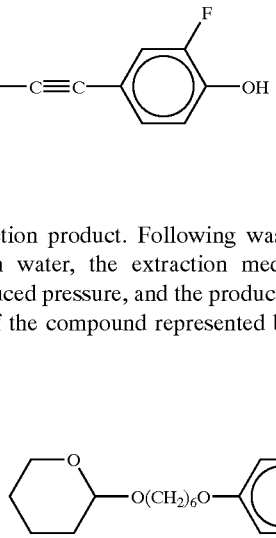

(S-32)

$^1$H-NMR (300 MHz, CDCL$_3$); δ=1.40~1.87 (m, 14H), 3.38~3.91 (m, 4H), 4.02 (t, 2H), 4.59 (m, 1H), 6.92 (d, 2H), 8.06 (d, 2H)

To a solution of 6.8 g of the compound (s-32) obtained from the above synthesis, 7.1 g of the compound (s-20), and 150 ml of tetrahydrofuran was added 4.1 g of 1-ethyl-3-(3-dimethylaminopropyl)carbodiimide hydrochloride and 2.6 g of 4-dimethylaminopyridine, and the resulting mixture was stirred for 2 days at room temperature to allow the reaction to proceed. The progression of the reaction was confirmed by thin layer chromatography (toluene: ethyl acetate ratio of 4:1), and when the reaction was complete, the reaction liquid was diluted with 300 ml of ethyl acetate. The solution was then washed twice with 150 ml samples of saturated brine solution. The organic layer was dried with anhydrous magnesium sulfate, and following subsequent removal of the solvent medium under reduced pressure, the crude product was separated by column chromatography (toluene: ethyl acetate ratio of 4: 1) to yield 9.6 g of the compound represented by the formula (s-33).

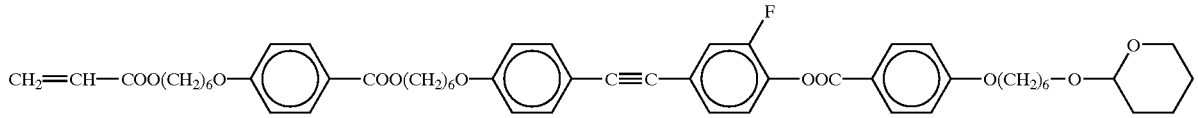

(S-33)

To a solution of 9.6 g of the compound (s-33) obtained from the above synthesis and 80 ml of tetrahydrofuran was added 35 ml of a 10% aqueous solution of hydrochloric acid, and the resulting mixture was stirred for 4 hours at room temperature to allow the reaction to proceed. The progression of the reaction was confirmed by thin layer chromatography (toluene: ethyl acetate ratio of 4:1), and when the reaction was complete, the reaction liquid was diluted with 200 ml of ethyl acetate. The solution was then washed twice with 100 ml samples of saturated brine solution. The organic layer was dried with anhydrous magnesium sulfate, and the solvent medium removed under reduced pressure. The crude product was separated by column chromatography (toluene: ethyl acetate ratio of 4:1), and then purified by recrystallization (ethanol) to yield 7.8 g of a compound represented by the formula (s-34).

phase—isotropic liquid phase transition, whereas the phase transition temperatures under falling temperature conditions were 60° C. for the isotropic liquid phase—nematic phase transition, and less than 25° C. for the nematic phase—crystalline phase transition.

$^1$H-NMR (300 MHz, CDCL$_3$); δ=1.43~1.84 (m, 32H), 3.96~4.33 (m, 16H), 5.81 (d, 2H), 6.12 (dd, 2H), 6.41 (d, 2H), 6.85~6.98 (m, 7H), 7.19~7.46 (m, 6H), 7.96~8.16 (m, 6H)

Whereas the liquid crystalline acrylate compound of the formula (s-28) produced in example 6 displays a nematic phase between 50 and 87° C. for rising temperatures, the liquid crystalline acrylate compound of the formula (s-35) produced in example 7 displays a nematic phase between 28 and 60° C. for rising temperatures, approximately 25° C. lower than the temperatures observed for the compound (S-34)

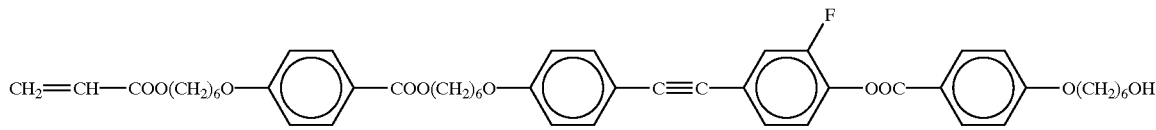

The compound of the formula (s-30) was a liquid crystalline acrylate compound, and the associated phase transition temperatures were 45° C. for the crystalline phase—nematic phase transition, and 111° C. for the nematic phase—isotropic liquid phase transition.

$^1$H-NMR (300 MHz, CDCL$_3$); δ=1.43~1.84 (m, 24H), 3.64~4.33 (m, 12H), 5.80 (d, 1H), 6.12 (dd, 1H), 6.40 (d, 1H), 6.85~7.46 (m, 11H), 7.98 (d, 2H), 8.14 (d, 2H)

To a solution of 4.0 g of the compound (s-34) obtained from the above synthesis, 2.15 g of the compound (s-3), namely 4-(6-acryloyloxyhexyloxy)benzoic acid, and 60 ml of tetrahydrofuran was added 1.41 g of 1-ethyl-3-(3-dimethylaminopropyl)carbodiimide hydrochloride and 0.90 g of 4-dimethylaminopyridine, and the resulting mixture was stirred for 3 days at room temperature to allow the reaction to proceed. The progression of the reaction was confirmed by thin layer chromatography (toluene: ethyl acetate ratio of 4:1), and when the reaction was complete, the reaction liquid was diluted with 150 ml of ethyl acetate. The solution was then washed twice with 100 ml samples of saturated brine solution. The organic layer was dried with anhydrous magnesium sulfate, and following subsequent removal of the solvent medium under reduced pressure, the crude product was separated by column chromatography (toluene: ethyl acetate ratio of 7:1) to yield 4.4 g of a liquid crystalline acrylate compound represented by the formula (s-35).

(s-28). Furthermore, whereas the liquid crystalline acrylate compound of the formula (s-28) produced in example 6 displays a nematic phase between 25 and 60° C. for falling temperatures, the liquid crystalline acrylate compound of the formula (s-35) produced in example 7 displays a nematic phase between temperatures below 25° C. and 87° C. for falling temperatures, offering a far wider temperature range than that observed for the compound (s-28).

In comparison with the compound of the formula (s-28) obtained in the example 6, the compound of the formula (s-35) produced in the example 7 has one extra ring within the molecule, yet the temperature at which the nematic phase is displayed for rising temperatures is more than 25° C. lower, and the temperature range of the nematic phase for falling temperatures is far wider. Clearly, the reason for this effect is the introduction of a phenylcarbonyloxyalkyleneoxy group between the phenyl group of the compound (s-28) and the acryloyloxyalkyleneoxy group bonded to this phenyl group.

Example 8

Preparation (1) of a Liquid Crystal Composition

Mixing of the liquid crystalline acrylate compound represented by the formula (s-4) obtained from the example 1, and the liquid crystalline acrylate compound represented by the formula (s-11) obtained from the example 2 revealed that (S-35)

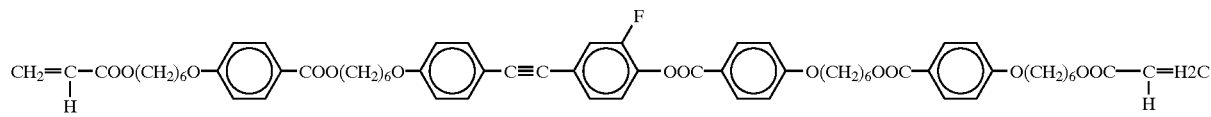

The phase transition temperatures for the liquid crystalline acrylate compound of the formula (s-35) under rising temperature conditions were 28° C. for the crystalline phase—nematic phase transition, and 60° C. for the nematic the two compounds were very compatible and produced a uniform mixture regardless of the relative proportions within the mixture. FIG. 1 shows the relationship between the proportion of the liquid crystalline acrylate compound represented by the formula (s-11) within a mixture of the liquid crystalline acrylate compound represented by the formula (s-4) and the liquid crystalline acrylate compound represented by the formula (s-11), and the phase which is produced at that proportion.

Example 9

Preparation (2) of a Liquid Crystal Composition

A composition (A) was prepared by combining 50 parts by weight of the liquid crystalline acrylate compound represented by the formula (a-1)

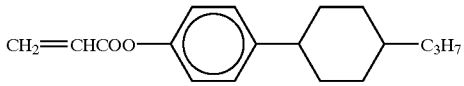

and 50 parts by weight of the liquid crystalline acrylate compound represented by the formula (a-4).

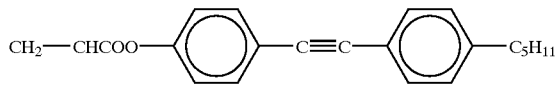

The composition (A) displayed a nematic liquid crystal phase at room temperature (25° C.). The nematic phase—isotropic liquid phase transition temperature was 46° C. Furthermore, the value of $n_e$ (extraordinary index of refraction) measured at 589 nm was 1.662, the value of $n_o$ (ordinary index of refraction) at the same wavelength was 1.510, and the birefringence was 0.152.

A composition (B) was prepared by combining 10 parts by weight of the liquid crystalline acrylate compound represented by the formula (s-4) obtained from the example 1, and 90 parts by weight of the composition (A). The composition (B) displayed a nematic liquid crystal phase at room temperature (25° C.). The nematic phase—isotropic liquid phase transition temperature was 52° C. Furthermore, the value of $n_e$ (extraordinary index of refraction) measured at 589 nm was 1.664, the value of $n_o$ (ordinary index of refraction) at the same wavelength was 1.511, and the birefringence was 0.153.

Example 10

Preparation (3) of a Liquid Crystal Composition

A composition (C) was prepared by combining 20 parts by weight of the liquid crystalline acrylate compound represented by the formula (s-4) obtained from the example 1, and 80 parts by weight of the composition (A). The composition (C) displayed a nematic liquid crystal phase at room temperature (25° C.). The nematic phase—isotropic liquid phase transition temperature was 57° C. Furthermore, the value of $n_e$ (extraordinary index of refraction) measured at 589 nm was 1.666, the value of $n_o$ (ordinary index of refraction) at the same wavelength was 1.513, and the birefringence was 0.153.

Example 11

Preparation (4) of a Liquid Crystal Composition

A composition (D) was prepared by combining 30 parts by weight of the liquid crystalline acrylate compound represented by the formula (s-4) obtained from the example 1, and 70 parts by weight of the composition (A). The composition (D) displayed a nematic liquid crystal phase at room temperature (25° C.). The nematic phase—isotropic liquid phase transition temperature was 62° C. Furthermore, the value of $n_e$ (extraordinary index of refraction) measured at 589 nm was 1.667, the value of $n_o$ (ordinary index of refraction) at the same wavelength was 1.513, and the birefringence was 0.154.

Example 12

Preparation (5) of a Liquid Crystal Composition

A composition (E) was prepared by combining 40 parts by weight of the liquid crystalline acrylate compound represented by the formula (s-4) obtained from the example 1, and 60 parts by weight of the composition (A). The composition (E) displayed a nematic liquid crystal phase at room temperature (25° C.). The nematic phase—isotropic liquid phase transition temperature was 67° C. Furthermore, the value of $n_e$ (extraordinary index of refraction) measured at 589 nm was 1.667, the value of $n_o$ (ordinary index of refraction) at the same wavelength was 1.513, and the birefringence was 0.154.

Example 13

Preparation (6) of a Liquid Crystal Composition

A composition (F) was prepared by combining 10 parts by weight of the liquid crystalline acrylate compound represented by the formula (s-11) obtained from the example 2, and 90 parts by weight of the composition (A). The composition (F) displayed a nematic liquid crystal phase at room temperature (25° C.). The nematic phase—isotropic liquid phase transition temperature was 49° C. Furthermore, the value of $n_e$ (extraordinary index of refraction) measured at 589 nm was 1.665, the value of $n_o$ (ordinary index of refraction) at the same wavelength was 1.513, and the birefringence was 0.152.

Example 14

Preparation (7) of a Liquid Crystal Composition

A composition (G) was prepared by combining 20 parts by weight of the liquid crystalline acrylate compound represented by the formula (s-1) obtained from the example 2, and 80 parts by weight of the composition (A). The composition (G) displayed a nematic liquid crystal phase at room temperature (25° C.). The nematic phase—isotropic liquid phase transition temperature was 56° C. Furthermore, the value of $n_e$ (extraordinary index of refraction) measured at 589 nm was 1.667, the value of $n_o$ (ordinary index of refraction) at the same wavelength was 1.515, and the birefringence was 0.152.

Example 15

Preparation (8) of a Liquid Crystal Composition

A composition (H) was prepared by combining 30 parts by weight of the liquid crystalline acrylate compound represented by the formula (s-11) obtained from the example 2, and 70 parts by weight of the composition (A). The composition (H) displayed a nematic liquid crystal phase at room temperature (25° C.). The nematic phase—isotropic liquid phase transition temperature was 61° C. Furthermore, the value of $n_e$ (extraordinary index of refraction) measured at 589 nm was 1.669, the value of $n_o$ (ordinary index of refraction) at the same wavelength was 1.517, and the birefringence was 0.152.

Example 16

Preparation (9) of a Liquid Crystal Composition

A composition (I) was prepared by combining 10 parts by weight of the liquid crystalline acrylate compound represented by the formula (s-28) obtained from the example 6, and 90 parts by weight of the composition (A). The composition (I) displayed a nematic liquid crystal phase at room temperature (25° C.). Furthermore, the value of $n_e$ (extraordinary index of refraction) measured at 589 nm was 1.6689, the value of $n_o$ (ordinary index of refraction) at the same wavelength was 1.5107, and the birefringence was 0.1582.

Example 17

Preparation (10) of a Liquid Crystal Composition

A composition (J) was prepared by combining 30 parts by weight of the liquid crystalline acrylate compound represented by the formula (s-28) obtained from the example 6, and 70 parts by weight of the composition (A). The com-

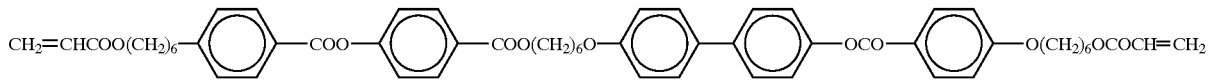

position (J) displayed a nematic liquid crystal phase at room temperature (25° C.). Furthermore, the value of $n_e$ (extraordinary index of refraction) measured at 589 nm was 1.6785, the value of $n_o$ (ordinary index of refraction) at the same wavelength was 1.5110, and the birefringence was 0.1675.

Example 18

Preparation (11) of a Liquid Crystal Composition

A composition (K) was prepared by combining 10 parts by weight of the liquid crystalline acrylate compound represented by the formula (s-35) obtained from the example 7, and 90 parts by weight of the composition (A). The composition (K) displayed a nematic liquid crystal phase at room temperature (25° C.). Furthermore, the value of $n_e$ (extraordinary index of refraction) measured at 589 nm was 1.6702, the value of $n_o$ (ordinary index of refraction) at the same wavelength was 1.5110, and the birefringence was 0.1592.

Example 19

Preparation (12) of a Liquid Crystal Composition

A composition (L) was prepared by combining 30 parts by weight of the liquid crystalline acrylate compound represented by the formula (s-35) obtained from the example 7, and 70 parts by weight of the composition (A). The composition (L) displayed a nematic liquid crystal phase at room temperature (25° C.). Furthermore, the value of $n_e$ (extraordinary index of refraction) measured at 589 nm was 1.6813, the value of $n_o$ (ordinary index of refraction) at the same wavelength was 1.5120, and the birefringence was 0.1693.

Example 20

Preparation (13) of a Liquid Crystal Composition

A composition (M) was prepared by combining 50 parts by weight of the liquid crystalline acrylate compound represented by the formula (s-28) obtained from the example 6, and 50 parts by weight of the liquid crystalline acrylate compound represented by the formula (s-35) obtained from the example 8. The phase transition temperatures for the composition (M) under rising temperature conditions were 38° C. for the crystalline phase—nematic phase transition, and 101° C. for the nematic phase—isotropic liquid phase transition, whereas the phase transition temperatures under falling temperature conditions were 101° C. for the isotropic liquid phase—nematic phase transition, and less than 25° C. for the nematic phase—crystalline phase transition.

Comparative Example 1

Preparation (14) of a Liquid Crystal Composition

A composition (N) was prepared by combining 20 parts by weight of the compound represented by the formula (a-62)

(this compound displays a smectic C phase at room temperature, and has phase transition temperatures of 89° C. for the smectic C phase—smectic A phase transition, 92° C. for the smectic A phase—nematic phase transition, and 132° C. for the nematic phase—isotropic liquid phase transition), and 80 parts by weight of the of the composition (A). In this composition (N), the compound represented by the formula (a-62) displayed poor compatibility with the composition (A), and at room temperature, separated into a crystalline phase and a liquid crystal phase.

Comparative Example 2

Preparation (15) of a Liquid Crystal Composition

A composition (O) was prepared by combining 30 parts by weight of the compound represented by the formula (a-62) used in the comparative example 1, and 70 parts by weight of the of the composition (A). In this composition (O), the compound represented by the formula (a-62) displayed poor compatibility with the composition (A), and at room temperature, separated into a crystalline phase and a liquid crystal phase.

Comparative Example 3

Preparation (17) of a Liquid Crystal Composition

A composition (K) was prepared by combining 20 parts by weight of the compound represented by the formula (a-63)

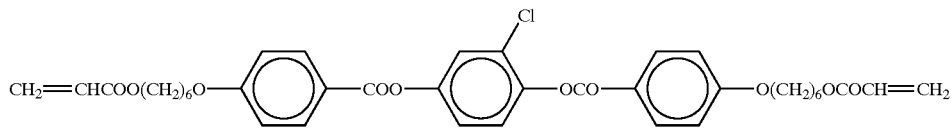

(this compound displays a crystalline phase at room temperature, and has phase transition temperatures of 87° C. for the crystalline phase—smectic phase transition, 91° C. for the smectic phase—nematic phase transition, and 110° C. for the nematic phase—isotropic liquid phase transition), and 80 parts by weight of the of the composition (A). The composition (P) displayed a nematic liquid crystal phase at room temperature (25° C.). The nematic phase—isotropic liquid phase transition temperature was 64° C. Furthermore, the value of $n_e$ (extraordinary index of refraction) measured at 589 nm was 1.673, the value of $n_o$ (ordinary index of refraction) at the same wavelength was 1.507, and the birefringence was 0.166.

Comparative Example 4

Preparation (17) of a Liquid Crystal Composition

A composition (Q) was prepared by combining 30 parts by weight of the compound represented by the formula (a-63) used in the comparative example 3, and 70 parts by weight of the of the composition (A). In this composition (Q), the compound represented by the formula (a-63) displayed poor miscibility with the composition (A), and at room temperature, separated into a crystalline phase and a liquid crystal phase.

The examples 8 to 20 are examples in which liquid crystalline compounds according to the present invention display good miscibility with the composition (A) comprising a compound with only one mesogenic group in the molecule. The comparative examples 1 and 2 show that twin type polymerizable liquid crystal compounds with two mesogenic groups in each molecule display poor miscibility with the composition (A) comprising a compound with only one mesogenic group in each molecule. The comparative examples 3 and 4 reveal that the compounds (s-11), (s-28) and (s-34) used in the present invention display very good compatibility.

Example 21

Preparation (1) of an Optically Arlisotropic Film

A composition (R) was prepared from 99 parts by weight of the composition (C) prepared in the example 5, and 1 part by weight of a photopolymerization initiator "Irgacure 651" (manufactured by Ciba Geigy Corporation). The composition (R) was injected, at room temperature, into an anti parallel aligned liquid crystal glass cell (a glass cell which has undergone alignment treatment so that the liquid crystals will align along one axis) with a cell gap of 50 microns. Following injection, uniform alignment along a single axis was able to be confirmed. Subsequently, ultraviolet radiation of 1 mW/cm$^2$ was irradiated onto the composition (R) at room temperature (25° C.) for a period of 10 minutes, using a UVGL-25 produced by UVP Corporation, thereby polymerizing the composition (R) to yield a polymer product. The product polymer obtained displayed a refractive index which differed depending on the direction, and the ability to function as an optically anisotropic film was confirmed. The haze of the polymer inside the glass cell was 7.8%.

Example 22

Preparation (2) of an Optically Anisotropic Film

A composition (S) was prepared from 99 parts by weight of the composition (D) prepared in the example 6, and 1 part by weight of the photopolymerization initiator "Irgacure 651" (manufactured by Ciba Geigy Corporation). The composition (S) was injected, at room temperature, into an anti parallel aligned liquid crystal glass cell (a glass cell which has undergone alignment treatment so that the liquid crystals will align along one axis) with a cell gap of 50 microns. Uniform alignment along a single axis was able to be confirmed almost immediately after injection. Subsequently, ultraviolet radiation of 1 mW/cm$^2$ was irradiated onto the composition (S) at room temperature (25° C.) for a period of 10 minutes, using a UVGL-25 produced by UVP Corporation, thereby polymerizing the composition (S) to yield a polymer product. The product polymer obtained displayed a refractive index which differed depending on the direction, and the ability to function as an optically anisotropic film was confirmed. The haze of the polymer inside the glass cell was 3.3%.

Example 23

Preparation (3) of an Optically Anisotropic Film

A composition (T) was prepared from 99 parts by weight of the composition (E) prepared in the example 7, and 1 part by weight of the photopolymerization initiator "Irgacure 651" (manufactured by Ciba Geigy Corporation). The composition (T) was injected, at room temperature, into an anti parallel aligned liquid crystal glass cell (a glass cell which has undergone alignment treatment so that the liquid crystals will align along one axis) with a cell gap of 50 microns. Following injection, uniform alignment along a single axis was able to be confirmed. Subsequently, ultraviolet radiation of 1 mW/cm$^2$ was irradiated onto the composition (T) at room temperature (25° C.) for a period of 10 minutes, using a UVGL-25 produced by UVP Corporation, thereby polymerizing the composition (T) to yield a polymer product. The product polymer obtained displayed a refractive index which differed depending on the direction, and the ability to function as an optically anisotropic film was confirmed. The haze of the polymer inside the glass cell was 1.8%.

Example 24

Preparation (4) of an Optically Anisotropic Film

A composition (U) was prepared from 99 parts by weight of the composition (H) prepared in the example 10, and 1 part by weight of the photopolymerization initiator "Irgacure 651" (manufactured by Ciba Geigy Corporation). The composition (U) was injected, at room temperature, into an anti parallel aligned liquid crystal glass cell (a glass cell which has undergone alignment treatment so that the liquid crystals will align along one axis) with a cell gap of 50 microns. Following injection. uniform alignment along a single axis was able to be confirmed. Subsequently, ultraviolet radiation of 1 mW/cm² was irradiated onto the composition (U) at room temperature (25° C.) for a period of 10 minutes, using a UVGL-25 produced by UVP Corporation, thereby polymerizing the composition (U) to yield a polymer product. The product polymer obtained displayed a refractive index which differed depending on the direction, and the ability to function as an optically anisotropic film was confirmed. The haze of the polymer inside the glass cell was 5.8%.

Example 25

Preparation (5) of an Optically Anisotropic Film

A composition (V) was prepared from 99 parts by weight of the composition (1) prepared in the example 16, and 1 part by weight of the photopolymerization initiator "Irgacure 651" (manufactured by Ciba Geigy Corporation). The composition (V) was injected, at room temperature, into an anti parallel aligned liquid crystal glass cell (a glass cell which has undergone alignment treatment so that the liquid crystals will align along one axis) with a cell gap of 50 microns. Following injection, uniform alignment along a single axis was able to be confirmed. Subsequently, ultraviolet radiation of 1 mW/cm² was irradiated onto the composition (V) at room temperature (25° C.) for a period of 10 minutes, using a UVGL-25 produced by UVP Corporation, thereby polymerizing the composition (V) to yield a polymer product. The product polymer obtained displayed a refractive index which differed depending on the direction, and the ability to function as an optically anisotropic film was confirmed. The haze of the polymer inside the glass cell was 4.6%. Furthermore, the retardation of the polymer was 3.26 μm.

Example 26

Preparation (6) of an Optically Anisotropic Film

A composition (W) was prepared from 99 parts by weight of the composition (J) prepared in the example 17, and 1 part by weight of the photopolymerization initiator "Irgacure 651" (manufactured by Ciba Geigy Corporation). The composition (W) was injected, at room temperature, into an anti parallel aligned liquid crystal glass cell (a glass cell which has undergone alignment treatment so that the liquid crystals will align along one axis) with a cell gap of 50 microns. Following injection, uniform alignment along a single axis was able to be confirmed. Subsequently, ultraviolet radiation of 1 mW/cm² was irradiated onto the composition (W) at room temperature (25° C.) for a period of 10 minutes, using a UVGL-25 produced by UVP Corporation, thereby polymerizing the composition (W) to yield a polymer product. The product polymer obtained displayed a refractive index which differed depending on the direction, and the ability to function as an optically anisotropic film was confirmed. The haze of the polymer inside the glass cell was 1.54%. Furthermore, the retardation of the polymer was 3.72 μm.

Example 27

Preparation (7) of an Optically Anisotropic Film

A composition (X) was prepared from 99 parts by weight of the composition (K) prepared in the example 18, and 1 part by weight of the photopolymerization initiator "Irgacure 651" (manufactured by Ciba Geigy Corporation). The composition (X) was injected, at room temperature, into an anti parallel aligned liquid crystal glass cell (a glass cell which has undergone alignment treatment so that the liquid crystals will align along one axis) with a cell gap of 50 microns. Following injection, uniform alignment along a single axis was able to be confirmed. Subsequently, ultraviolet radiation of 1 mW/cm² was irradiated onto the composition (X) at room temperature (25° C.) for a period of 10 minutes, using a UVGL-25 produced by UVP Corporation, thereby polymerizing the composition (X) to yield a polymer product. The product polymer obtained displayed a refractive index which differed depending on the direction, and the ability to function as an optically anisotropic film was confirmed. The retardation of the polymer inside the glass cell was 4.72 μm.

Example 28

Preparation (8) of an Optically Anisotropic Film

A composition (Y) was prepared from 99 parts by weight of the composition (L) prepared in the example 19, and 1 part by weight of the photopolymerization initiator "Irgacure 651" (manufactured by Ciba Geigy Corporation). The composition (Y) was injected, at room temperature, into an anti parallel aligned liquid crystal glass cell (a glass cell which has undergone alignment treatment so that the liquid crystals will align along one axis) with a cell gap of 50 microns. Following injection, uniform alignment along a single axis was able to be confirmed. Subsequently, ultraviolet radiation of 1 mW/cm² was irradiated onto the composition (Y) at room temperature (25° C.) for a period of 10 minutes, using a UVGL-25 produced by UVP Corporation, thereby polymerizing the composition (Y) to yield a polymer product. The product polymer obtained displayed a refractive index which differed depending on the direction, and the ability to function as an optically anisotropic film was confirmed. The retardation of the polymer inside the glass cell was 5.27 μm.

Example 29

Preparation (9) of an Optically Anisotropic Film

A composition (Z) was prepared from 99 parts by weight of the composition (M) prepared in the example 20, and 1 part by weight of the photopolymerization initiator "Irgacure 651" (manufactured by Ciba Geigy Corporation). The composition (Z) was injected, at room temperature, into an anti parallel aligned liquid crystal glass cell (a glass cell which has undergone alignment treatment so that the liquid crystals will align along one axis) with a cell gap of 5 microns. Following injection, uniform alignment along a single axis was able to be confirmed. Subsequently, ultraviolet radiation of 1 mW/cm² was irradiated onto the composition (Z) at room temperature (25° C.) for a period of 2 minutes, using a UVGL-25 produced by UVP Corporation, thereby polymerizing the composition (Z) to yield a polymer product. The product polymer obtained displayed a refractive index which differed depending on the direction, and the ability to function as an optically anisotropic film was confirmed. The retardation of the polymer inside the glass cell was 0.76 μm.

Comparative Example 5

Preparation (10) of an Optically Anisotropic Film

A composition (AA) was prepared from 99 parts by weight of the composition (A) prepared in the example 9 (which incorporates no liquid crystalline acrylate compounds of the present invention), and 1 part by weight of the photopolymerization initiator "Irgacure 651" (manufactured by Ciba Geigy Corporation). The composition (AA) was injected, at room temperature, into anti parallel aligned liquid crystal glass cells (glass cells which have undergone alignment treatment so that the liquid crystals will align along one axis) with cell gaps of 5 microns and 50 microns respectively. Following injection, uniform alignment along a single axis was able to be confirmed. Subsequently, ultraviolet radiation of 1 mW/cm² was irradiated onto the compositions (AA) in the glass cells, at room temperature (25° C.), for periods of 2 and 10 minutes respectively, using a UVGL-25 produced by UVP Corporation, thereby polymerizing the composition (AA) to yield polymer products. The product polymers obtained both displayed a refractive index which differed depending on the direction, thereby confirming the ability to function as an optically anisotropic film. The haze of the polymer inside the 50 micron glass cell was 13.5%, and the retardation 2.75 μm. Furthermore, the retardation of the polymer inside the 5 micron glass cell was 0.38 μm.

Comparative Example 6

Preparation (11) of an Optically Anisotropic Film

A composition (BB) was prepared from 99 parts by weight of the composition (P) prepared in the comparative example 3 (which incorporates no liquid crystalline acrylate compounds of the present invention), and 1 part by weight of a photopolymerization initiator "Irgacure 651" (manufactured by Ciba Geigy Corporation). The composition (BB) was injected, at room temperature, into an anti parallel aligned liquid crystal glass cell (a glass cell which has undergone alignment treatment so that the liquid crystals will align along one axis) with a cell gap of 50 microns. Following injection, uniform alignment along a single axis was able to be confirmed. Subsequently, ultraviolet radiation of 1 mW/cm² was irradiated onto the composition (BB) in the glass cell at room temperature (25° C.) for a period of 10 minutes, using a UVGL-25 produced by UVP Corporation, thereby polymerizing the composition (BB) to yield a polymer product. The product polymer obtained displayed a refractive index which differed depending on the direction, thereby confirming the ability to function as an optically anisotropic film. The haze of the polymer inside the glass cell was 18.8%.

The results of the examples 21 to 29 and the comparative examples 5 and 6 reveal that by using a liquid crystal composition incorporating a compound of the general formula (I) of the present invention, the haze value of the polymer produced by subsequent polymerization is reduced, and the retardation value is improved.

Example 30

A composition (CC) was prepared from 50 parts by weight of the composition (T) prepared in the example 24 and 50 parts by weight of ethyl acetate. Next, a polyimide thin film with a film thickness of approximately 100 nm was formed on the surface of a 5 cm square glass substrate using a polyimide alignment agent "AL1051" (manufactured by JSR Ltd.), and the surface of this polyimide thin film was then subjected to rubbing treatment. The composition (S) was then coated onto the rubbed surface so as to form a dried film thickness of 10 microns. During the natural evaporation of the ethyl acetate, there was little flow movement of the composition, and a good degree of uniformity was maintained in the film thickness. Following natural evaporation of the ethyl acetate, ultraviolet radiation of 2 mW/cm² was irradiated onto the composition under a stream of nitrogen gas for a period of 5 minutes, using a UVGL-25 produced by UVP Corporation, thereby polymerizing the composition.

The product polymer obtained displayed a refractive index which differed depending on the direction, and the ability to function as an optically anisotropic film was confirmed. The amount of film thickness irregularity was minimal.

Comparative Example 7

A coating was prepared in the same manner as the example 30, with the exception that the composition (T) of the example 31 was replaced with the composition (AA) prepared in the comparative example 5. During the natural evaporation of the ethyl acetate, the composition showed a tendency to undergo flow type movements, and the uniformity of the film thickness was lost. Following natural evaporation of the ethyl acetate, ultraviolet radiation of 2 mW/cm² was irradiated onto the composition under a stream of nitrogen gas for a period of 5 minutes, using a UVGL25 produced by UVP Corporation, thereby polymerizing the composition. The product polymer obtained displayed a refractive index which differed depending on the direction, and the ability to function as an optically anisotropic film was confirmed. However, considerable film thickness irregularity was also visible.

The example 30 and the comparative example 7 reveal that the viscosity of the liquid crystal compositions of the present invention are of a viscosity ideal for the coating process. Compounds of the general formula (I) of the present invention are also useful as viscosity regulating agents.

Industrial Applicability

The compounds used in the present invention display a liquid crystal phase at low temperatures, are highly compatible with other liquid crystal compounds, and moreover polymerize to form polymers with low haze values. Furthermore, polymerizable liquid crystal compositions of the present invention which incorporate these types of compounds can be prepared with a viscosity which is ideal for coating processes. Consequently, polymerizable liquid crystal compositions of the present invention are very useful in applications such as optical phase retardation plates, polarizing plates, polarizing prisms, optical wave guides, piezoelectric elements, nonlinear optical elements, a variety of optical filters, pigments which utilize the selective reflection of cholesteric liquid crystal phases and the like, and as a coating for optical fibers or the like.

What is claimed is:

1. A polymerizable composition which displays a liquid crystal phase, comprising a liquid crystalline backbone with two or more ring structures and a compound (I) with a partial structure represented by a general formula

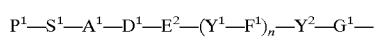

$P^1—S^1—A^1—D^1—E^2—(Y^1—F^1)_n—Y^2—G^1—$ wherein $P^1$ represents a polymerizable functional group;
$S^1$ represents a linkage chain selected from a group consisting of $—(CH_2)_w—$, $—O(CH_2)_w—$, $—(CH_2)_wO—$, $—(CH_2)_wC(=O)O—$, $—(CH_2)_wOC(=O)—$, $—C(=O)O(CH_2)_w—$ and $—OC(=O)(CH_2)_w—$ (wherein w represents an integer from 1 to 20);
$A^1$ and $E^2$ each represent, independently, either one of a hydrocarbon ring and a hetero ring, although $E^2$ is a ring incorporated within said liquid crystalline backbone;
and $D^1$ represents a linkage chain selected from a group consisting of $—C(=O)—O—(CH_2)_m—O—$, $—O(CH_2)_m—O—C(=O)—$, $—O—C(=O)—(CH_2)_m—O—$, and $—O(CH_2)_m—C(=O)—O—$ (wherein m represents an integer from 1 to 15);

E², F¹, and G¹ each represent, independently, a ring structure selected from a group consisting of

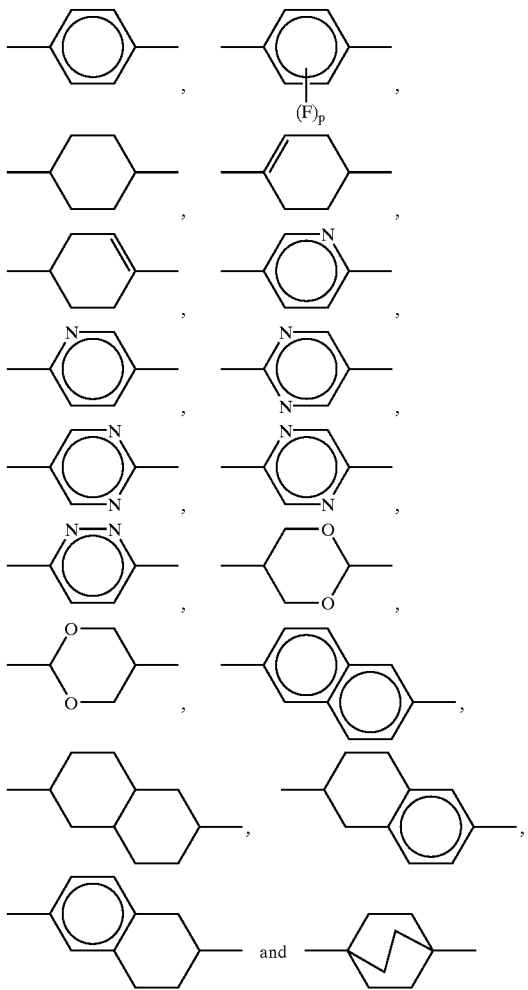

(wherein p represents an integer of 1 to 4);

Y¹ and Y² each represent, independently, a linkage group selected from a group consisting of a single bond, —CH₂CH₂—, —CH₂O—, —OCH₂—, —C(=O)O—, —OC(=O)—, —C≡C—, —CH=CH—, —CF=CF—, —(CH₂)₄—, —CH₂CH₂CH₂O—, —OCH₂CH₂CH₂—, —CH=CH—CH₂CH₂—, —CH₂CH₂—CH=CH—, —CH=CH—C(=O)O— and —OC(=O)—CH=CH—; and n represents an integer from 0 to 3.

2. A polymerizable composition according to claim 1, wherein said compound (I) is a compound represented by a general formula (II)

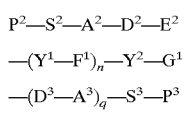

wherein P² and P³ each represent, independently, a polymerizable functional group selected from a group consisting of a (meth)acryloyloxy group, a (meth)acrylamide group, a vinyl group, an epoxy group, a mercapto group, a vinyloxy group and a maleimide group;

S² and S³ each represent, independently, a linkage chain selected from a group consisting of —(CH₂)_w—, —O(CH₂)_w—, —(CH₂)_wO—, —(CH₂)_wC(=O)O—, —(CH₂)_wOC(=O)—, —C(=O)O(CH₂)_w— and —OC(=O)(CH₂)_w— (wherein w represents an integer from 1 to 20);

A², and A³, each represent, independently, a ring structure selected from a group consisting of

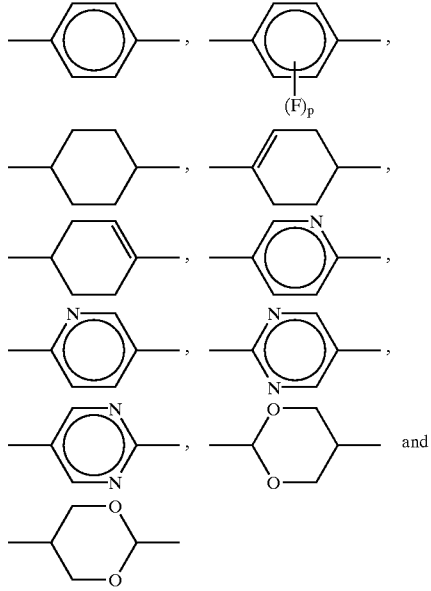

(wherein p represents an integer of 1 to 4);

D² and D³ each represent, independently, a linkage chain selected from a group consisting of —C(=O)—O—(CH₂)_m—O—, —O(CH₂)_m—O—C(=O)—, —O—C(=O)—(CH₂)_m—O—, and —O(CH₂)_m—C(=O)—O— (wherein m represents an integer from 1 to 15).

3. A polymerizable composition according to claim 2, wherein said compound represented by said general formula (II) utilizes a compound in which said groups A², A³, E², F¹ and G¹ each represent a structure selected from a group consisting of

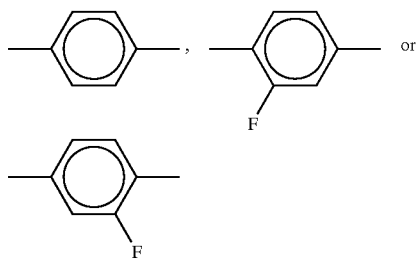

and said linkage chain D² and said linkage chain D³ are either one of —C(=O)—O—(CH₂)_m—O— and —O(CH₂)_m—O—C(=O)— (wherein m represents an integer from 2 to 15).

4. A polymerizable composition according to claim 3, wherein said compound represented by said general formula (II) utilizes a compound in which said groups S² and S³ are either one of —O(CH₂)_w— and —(CH₂)_w—O— (wherein w represents an integer from 2 to 18).

5. A polymerizable composition according to claim 4 utilizing a compound in which said groups P² and P³ are both a (meth)acryloyloxy group.

6. A polymerizable liquid crystal composition according to claim 5, wherein another polymerizable compound in addition to said compound (I) is a compound represented by a general formula (III)

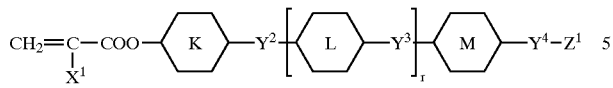

(wherein $X^1$ represents either one of a hydrogen atom and a methyl group, r represents either one of an integer 0 and an integer 1, K, L and M each represent, independently, a cyclic structure selected from a group consisting of

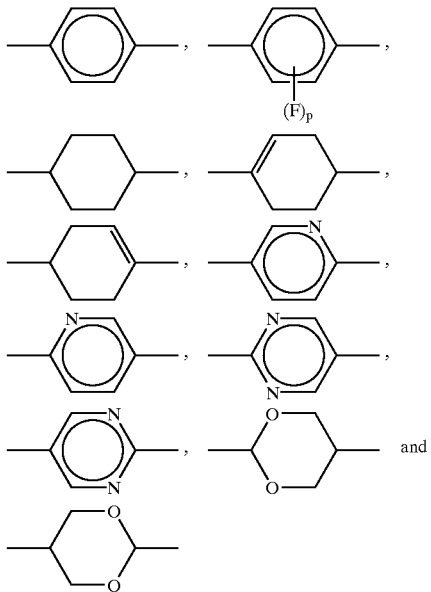

p represents an integer from 1 to 4, $Y^2$ and $Y^3$ each represent, independently, a linkage chain selected from a group consisting of a single bond, —CH$_2$CH$_2$—, —CH$_2$C(CH$_3$)H—, —C(CH$_3$)HCH$_2$—, —CH$_2$O—, —OCH$_2$—, —CF$_2$O—, —OCF$_2$—, —COO—, —OCO—, —C≡C—, —CH=CH—, —CF=CF—, —(CH$_2$)$_4$—, —CH$_2$CH$_2$CH$_2$O—, —OCH$_2$CH$_2$CH$_2$—, —CH=CH—CH$_2$CH$_2$— and —CH$_2$CH$_2$CH=CH—, $Y^4$ represents any one of a single bond, —O—, —COO— and —OCO—, and $Z^1$ represents any one of a hydrogen atom, a halogen atom, a cyano group, an alkyl group of 1 to 20 carbon atoms, and an alkenyl group of 2 to 20 carbon atoms).

7. A polymerizable liquid crystal composition according to claim 6 wherein said compound represented by said general formula (III) utilizes either one of a compound represented by a general formula (IV)

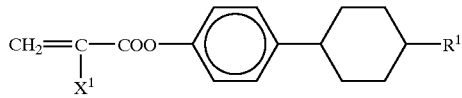

(wherein $X^1$ represents either one of a hydrogen atom and a methyl group, and $R^1$ represents an alkyl group of 1 to 10 carbon atoms), and a compound represented by a general formula (V)

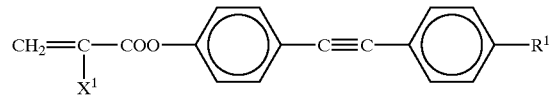

(wherein $X^1$ represents either one of a hydrogen atom and a methyl group, and $R^1$ represents an alkyl group of 1 to 10 carbon atoms).

8. A polymerizable liquid crystal composition according to claim 7 wherein said compound represented by said general formula (IV) utilizes a compound in which $X^1$ is a hydrogen atom and $R^1$ is an alkyl group of 2 to 7 carbon atoms, and said compound represented by a general formula (V) utilizes a compound in which $X^1$ is a hydrogen atom and $R^2$ is an alkyl group of 2 to 7 carbon atoms.

9. A polymerizable liquid crystal composition according to claim 1, comprising another polymerizable compound in addition to said compound (I).

10. An optically anisotropic film constructed from a polymer of a polymerizable liquid crystal composition according to claim 1.

11. An optical low pass filter comprising an optically anisotropic film according to claim 10 as a construction element.

* * * * *